US012536575B2

(12) United States Patent
Andoche et al.

(10) Patent No.: US 12,536,575 B2
(45) Date of Patent: Jan. 27, 2026

(54) APPARATUS FOR MACHINE LEARNING-BASED VISUAL EQUIPMENT SELECTION

(71) Applicant: ESSILOR INTERNATIONAL, Charenton-le-Pont (FR)

(72) Inventors: Julien Andoche, Charenton-le-Pont (FR); Estelle Netter, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 1106 days.

(21) Appl. No.: 17/607,518

(22) PCT Filed: Apr. 9, 2020

(86) PCT No.: PCT/EP2020/060263
§ 371 (c)(1),
(2) Date: Oct. 29, 2021

(87) PCT Pub. No.: WO2020/224915
PCT Pub. Date: Nov. 12, 2020

(65) Prior Publication Data
US 2022/0207331 A1    Jun. 30, 2022

(30) Foreign Application Priority Data
May 3, 2019  (EP) .................................. 19305568

(51) Int. Cl.
*G06N 3/04* (2023.01)
*G02C 13/00* (2006.01)
(Continued)

(52) U.S. Cl.
CPC ....... *G06Q 30/0631* (2013.01); *G02C 13/003* (2013.01); *G06N 3/048* (2023.01);
(Continued)

(58) Field of Classification Search
CPC ............. G06Q 30/0631; G06V 10/763; G06V 40/168; G06V 10/454; G06V 10/761;
(Continued)

(56) References Cited

U.S. PATENT DOCUMENTS 8,708,494 B1    4/2014  Surkov
2004/0174499 A1  9/2004  Toshima et al.
(Continued)

FOREIGN PATENT DOCUMENTS

CN    105469072 A    4/2016
CN    106910102 A    6/2017
(Continued)

OTHER PUBLICATIONS

Office Action, issued in Chinese Patent Application No. 202080032946.X dated Jul. 27, 2024.
(Continued)

*Primary Examiner* — David F Dunphy
(74) *Attorney, Agent, or Firm* — NIXON & VANDERHYE

(57) ABSTRACT

The present disclosure relates to determining visual equipment for a patient or user. In an embodiment, a machine learning-based approach considers the face of a user in context of a database of labeled faces and visual equipment, each of the labeled images reflected the aesthetic value of a proposed visual equipment relative to the face of the patient or user.

18 Claims, 56 Drawing Sheets

(51) Int. Cl.
  *G06N 3/048* (2023.01)
  *G06N 3/08* (2023.01)
  *G06N 3/084* (2023.01)
  *G06Q 30/0601* (2023.01)
  *G06V 10/44* (2022.01)
  *G06V 10/74* (2022.01)
  *G06V 10/762* (2022.01)
  *G06V 10/764* (2022.01)
  *G06V 10/774* (2022.01)
  *G06V 10/82* (2022.01)
  *G06V 40/16* (2022.01)

(52) U.S. Cl.
  CPC .......... *G06N 3/084* (2013.01); *G06V 10/454* (2022.01); *G06V 10/761* (2022.01); *G06V 10/763* (2022.01); *G06V 10/764* (2022.01); *G06V 10/774* (2022.01); *G06V 10/82* (2022.01); *G06V 40/168* (2022.01)

(58) Field of Classification Search
  CPC .... G06V 10/82; G06V 10/774; G06V 10/764; G06N 3/048; G06N 3/084; G02C 13/003
  See application file for complete search history.

(56) References Cited

U.S. PATENT DOCUMENTS

| | | | |
|---|---|---|---|
| 2013/0132898 | A1 | 5/2013 | Cuento |
| 2017/0169501 | A1 | 6/2017 | Xia |
| 2018/0268458 | A1* | 9/2018 | Popa ............... G06V 40/169 |
| 2019/0164210 | A1* | 5/2019 | Kornilov ........... G06V 40/165 |

FOREIGN PATENT DOCUMENTS

| | | |
|---|---|---|
| CN | 107862334 | 3/2018 |
| EP | 3 493 138 A1 | 6/2019 |
| EP | 3 660 728 | 6/2020 |
| JP | 2003075785 A | 3/2003 |
| TW | 201202989 | 1/2012 |
| TW | 201903673 A | 1/2019 |

OTHER PUBLICATIONS

Office Action issued in Europe Patent Application No. 19 305 568.8, dated Sep. 30, 2022.

Office Action, issued in Japanese Patent Application No. 2021-565083 dated Nov. 27, 2023.

Office Action, issued in Japanese Patent Application No. 2021-565083 dated Mar. 25, 2024.

Sugimoto et al., "3,000 employees and 60,000 images serve as deep learning teachers "Jins Brain" proposes glasses that suit you", Nikkei Big Data No. 34, Japan, Nikkei Business Publications, Dec. 10, 2016, p. 12.

Xiaoling Gu, et al., "iGlasses: A Novel Recommendation System for Best-fit Glasses", Proceedings of the 39th International ACM SIGIR Conference on Research and Development in Information Retrieval, SIGIR' 16, Jul. 21, 2016, pp. 1109-1112 (4 pages).

Sei-WO Winger Tseng, et al., "A female glasses fitting model based on neural network", Titanium Powder Metallurgy and Additive Manufacturing: 4th International Conference on Titanium Powder Metallurgy & Additive Manufacturing (PMTI 2017): Selected, Peer Reviewed Papers From the 4th International Conference on Powder Metallurgy of Tit, vol. 450, Sep. 8, 2010, pp. 530-533 (4 pages).

Extended European Search Report of EP Application No. 19305568.8 dated Oct. 16, 2019, 10 pages.

International Search Report for PCT/EP2020/060263 dated Jul. 7, 2020, 4 pages.

Written Opinion of the ISA for PCT/EP2020/060263 dated Jul. 7, 2020, 11 pages.

* cited by examiner

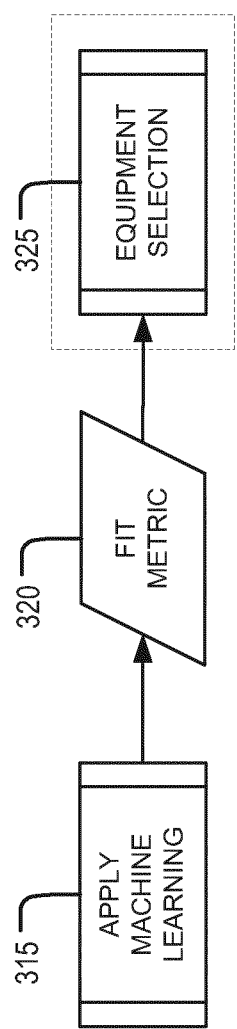

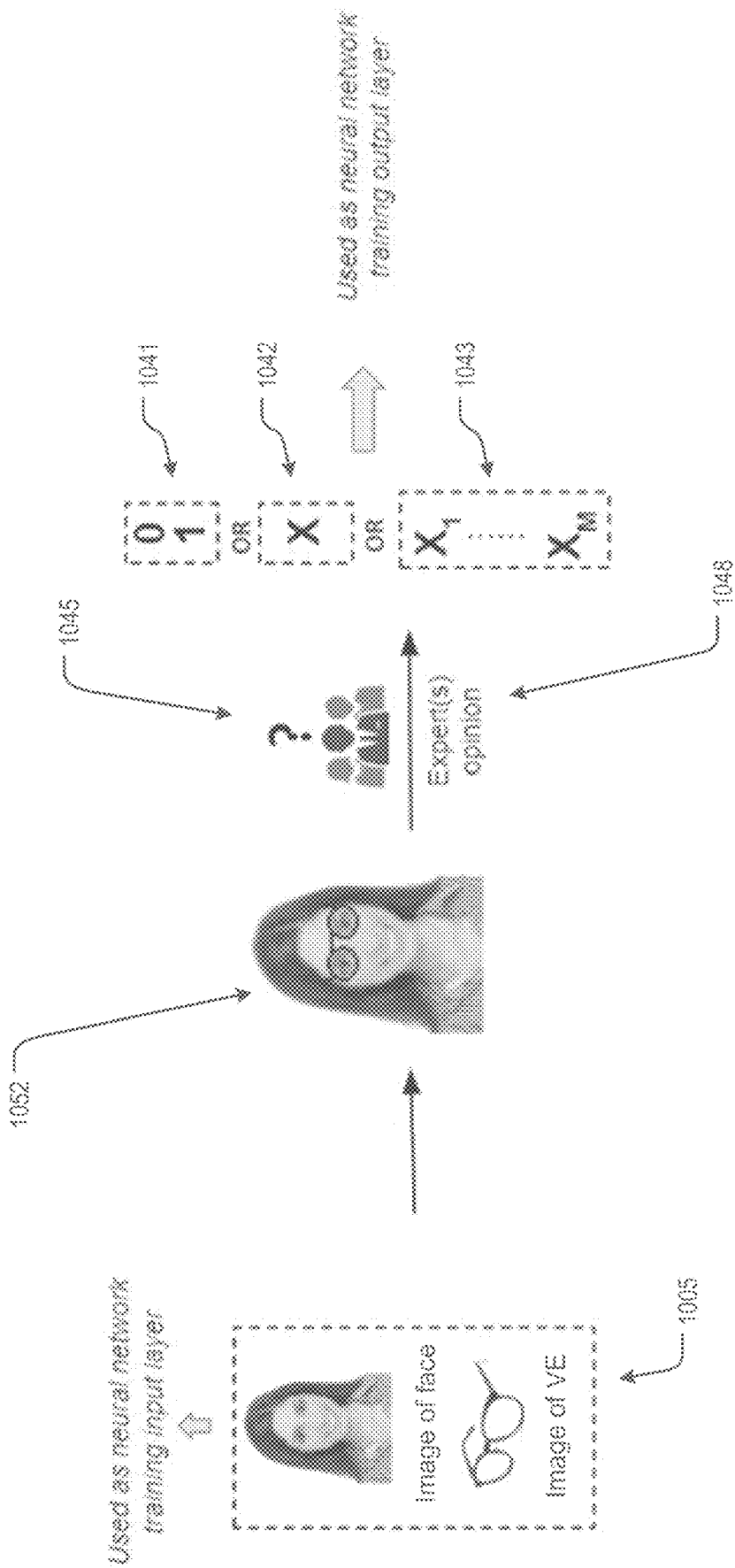

APPARATUS FOR MACHINE LEARNING-BASED VISUAL EQUIPMENT SELECTION

This application is the U.S. national phase of International Application No. PCT/EP2020/060263 filed Apr. 9, 2020 which designated the U.S. and claims priority to EP Patent Application No. 19305568.8 filed May 3, 2019, the entire contents of each of which are hereby incorporated by reference.

BACKGROUND

Field of the Disclosure

The present disclosure relates to eyewear and, specifically, to matching of visual equipment with patient faces.

Description of the Related Art

During the selection of new visual equipment, or eyewear, a patient is often left to self-reflection in determining the aesthetics of new eyewear on their face. At the same time, the patient may be grappling with their own opinion of the new eyewear on their face and the hypothetical opinions of third parties (e.g., friends, family, professionals, etc.) on the fit of the new eyewear on their face. Considering the aesthetic appeal together with the eyewear necessity of proper vision, the task of eyewear selection can be burdensome, with no effective way of confidently purchasing a new set of eyewear that the user, the user's doctor, and the user's friends are sure to be pleased with. The present disclosure provides a solution to this issue.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to an apparatus, method and computer-readable storage medium for determining fitted visual equipment.

According to an embodiment, the present disclosure is further related to an apparatus for determining a fitted visual equipment, comprising processing circuitry configured to receive at least one input, the at least one input including an image of a face of a person, apply a neural network to the at least one input, the neural network generating at least one fit metric of the at least one input, and determine, based upon the at least one fit metric generated by the neural network, the fitted visual equipment, wherein the at least one fit metric corresponds to a correlation synchronization between the face of the person and a visual equipment.

According to an embodiment, the present disclosure further relates to a method for determining a fitted visual equipment, comprising receiving, by processing circuitry, at least one input, the at least one input including an image of a face of a person, applying, by the processing circuitry, a neural network to the at least one input, the neural network generating at least one fit metric of the at least one input, and determining, by the processing circuitry, based upon the at least one fit metric generated by the neural network, the fitted visual equipment, wherein the neural network includes an implicit input, wherein the at least one fit metric corresponds to a correlation synchronization between the face of the person and a visual equipment.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a schematic of an aspect of an image preparation process, according to an exemplary embodiment of the present disclosure;

FIG. 10C is a schematic illustrating labeling of an input by a labeling group, according to an exemplary embodiment of the present disclosure;

DETAILED DESCRIPTION

Figure 1:
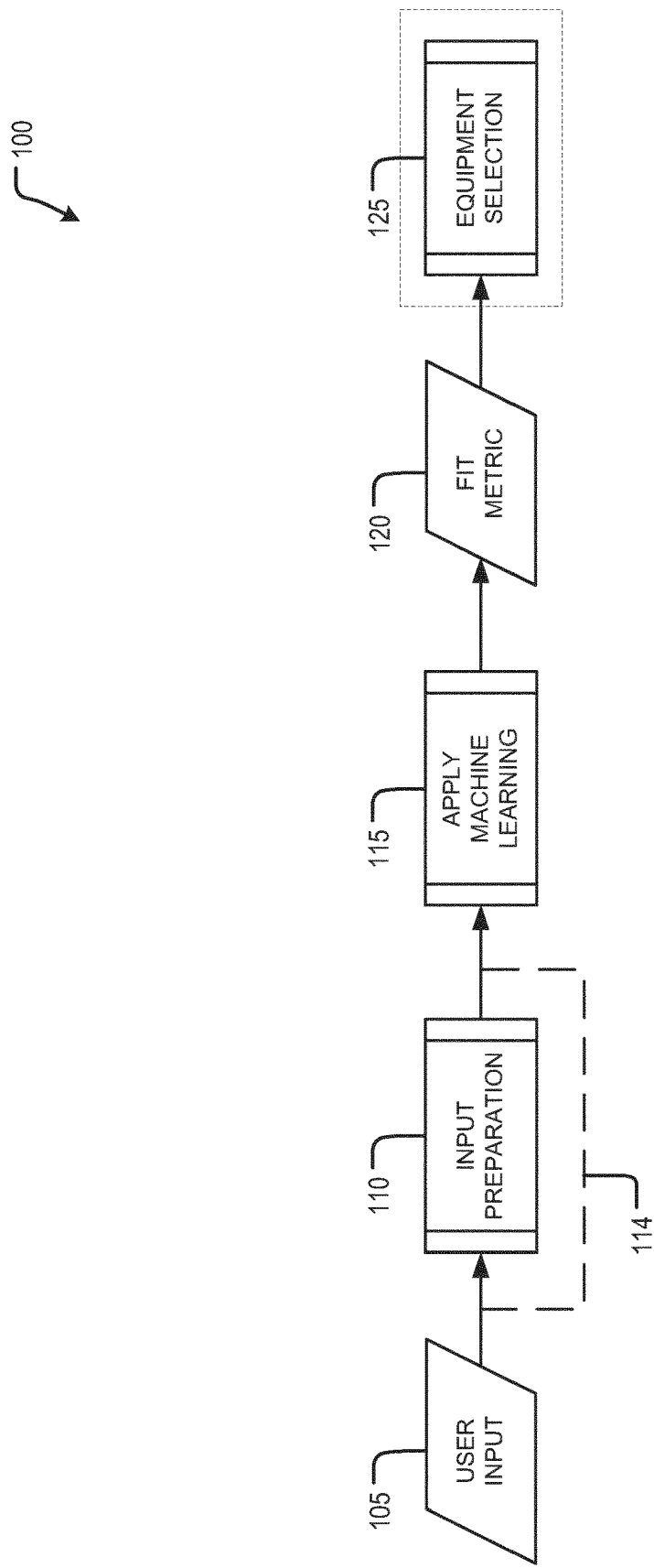
FIG. 1 is a flow diagram of an implementation of a machine learning-based visual equipment selection tool, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The terms "visual equipment", "eyeglass", "eyeglasses", and "visual equipments" may be used interchangeably to refer to an apparatus having both a frame and a lens. The term "visual equipment" may be used to refer to a single visual equipment while the term "visual equipments" may be used to refer to more than one visual equipment. Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Similarly, the terms "image of a face" and "image of a face of a person" are corresponding terms that may be used interchangeably. Thus, the appearances of such phrases or in various places throughout this specification are not necessarily all referring to the same embodiment. Furthermore, the particular features, structures, or characteristics may be combined in any suitable manner in one or more embodiments without limitation.

Today, patients or other users in search of visual equipments, or eyeglasses, are often left with little guidance as to what is both ophthalmologically appropriate and aesthetically pleasing. For some, cultural trends drive their decision making. For others, the opinion of friends and family is most important. For others still, who prioritize an ergonomic fit and visual acuity, the opinion of a trained vision professional is a necessity. Currently, users have access to approaches that provide some but not all of the above-described features. For instance, in one approach, a decision tree can be implemented to match the frame of visual equipment with morphological features detected from landmarks on the face of an individual, this match determining an ideal visual equipment. In another approach, users may be asked to answer questions regarding their own style, lifestyle, and personality, among others, in order to determine the user's tastes and habits. Such traits can then be used to propose, based on implementation of a decision tree or content-based filtering, an ideal visual equipment. An extension of the above, still another approach employs a user preferences model, performing analysis of a user's browsing history to determine visual equipment features, such as frames, that seem relevant to the user (e.g., content-based filtering) or the consumer profile the user is closest to (e.g., collaborative-based filtering).

The above-described approaches, while partially addressing the needs of a user, do not provide robust, end-to-end input to users when making visual equipment selections. To this end, the present disclosure describes a machine learning-based visual equipment selection tool for presenting a user with a fitted visual equipment selection based upon morphological and structural features, ophthalmological demands, and aesthetic appeal.

With reference now to the Figures, FIG. 1 is a generalized flow diagram of a machine learning-based visual equipment selection tool (ML-VEST) 100, according to an exemplary embodiment of the present disclosure. The ML-VEST 100 can include an input preparation process 110, a machine learning application process 115, and a visual equipment selection process 125. Initially, a user provides an input 105 to the ML-VEST 100O. Based on neural network training, the input 105 can be provided directly 114 to the machine learning application process 115 or can be provided to the input preparation process 110 where the input 105 is prepared according to specifications of a specific implementation of the machine learning application process 115. In an embodiment, the input 105 can be an image of the face of the user that requires preparation and, accordingly, is provided to the input preparation process 110. The prepared input, or prepared image, can then be passed to the machine learning application process 115. A fit metric 120 can be generated from the machine learning application process 115, wherein the prepared image, corresponding to the face of the user, is scored based on a 'fit' of a visual equipment, or eyeglasses, the fit being a correlative synchronization providing a metric quantifying the fit between the face of the user and the visual equipment. Based on the magnitude of the fit metric 120 scored for the visual equipment, or plurality thereof, the visual equipment selection process 125 may select the ideal eyeglasses for the face of the user that provided the input. In an embodiment, a user may provide an image of a face of the user and an image of visual equipment of interest. In processing the images, the ML-VEST 100 may generate a fit metric 120 that, when compared to a pre-determined threshold of the fit metric 120, indicates the visual equipment should be selected as the ideal visual equipment for the user. In an embodiment, the fit metric 120 may be associated with a confidence level that, when compared to a confidence level threshold, indicates whether the fit metric 120 is accurate. In another embodiment, a user may only provide an image of a face as an input and the ideal visual equipment, or fitted visual equipment, may be visual equipment selected from a database of a plurality of eyeglasses or may, for instance, be selected from a subset of eyeglasses pre-selected by a user or made available to a user. To this end, a fit metric 120 can be generated for each selected visual equipment, as described above, and a comparison of the generated fit metrics 120 can indicate the visual equipment to be selected as the ideal visual equipment. In turn, this ideal visual equipment can be recommended to the user, the ideal visual equipment reflecting the unique morphological characteristics of the user in context of the user's preferences regarding aesthetic appeal and visual acuity.

Figure 2A:
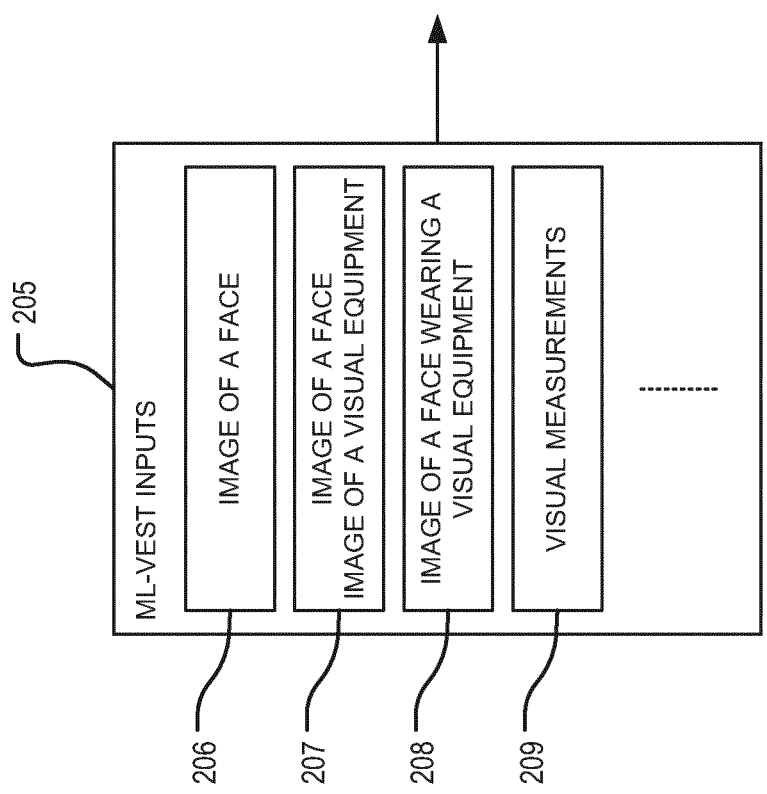
FIG. 2A is a schematic of an aspect of an image input process, according to an exemplary embodiment of the present disclosure.

FIG. 2A describes at least one input 205 that can be provided to the ML-VEST by the user. As described with reference to FIG. 1, the at least one input 205 can be provided to the input preparation process or can be provided directly to the machine learning application process. The at least one input 205 provided by the user can include, among others, an image of the face of the user 206, an image of the face of the user and, separately provided, an image of a visual equipment 207, an image of the face of the user wearing a visual equipment 208, and visual measurements corresponding to the user 209. The visual measurements can be standard ophthalmological measurements of visual acuity.

Figure 2B:
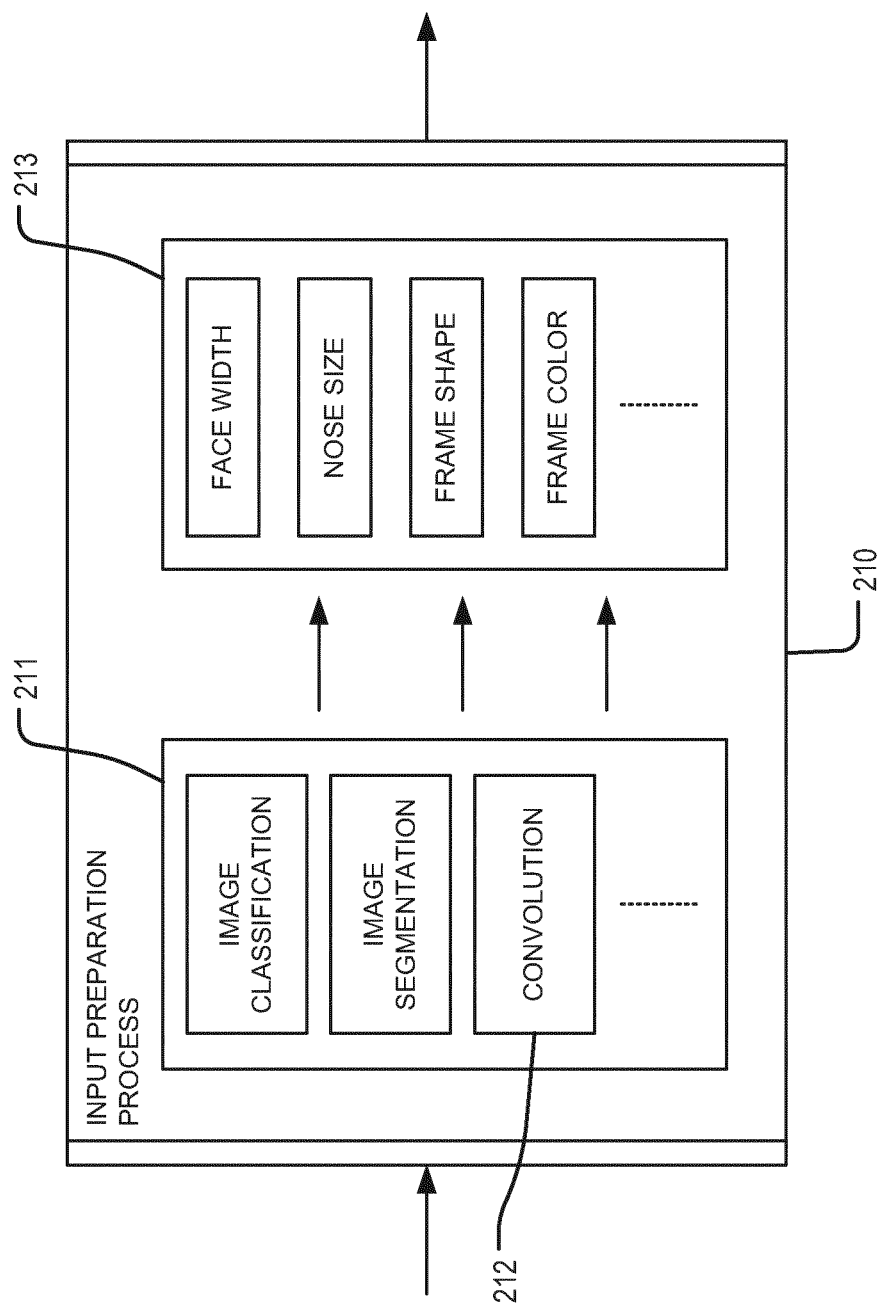
FIG. 2B is a schematic of an aspect of an image preparation process, according to an exemplary embodiment of the present disclosure.

When provided to the input preparation process, as shown in FIG. 2B, each of the above described at least one input can be prepared prior to being provided to the machine learning application process. Accordingly, FIG. 2B describes an input preparation process 210 that can be implemented on the received at least one input. In an embodiment, the input preparation process 210 described herein can be implemented on inputs provided by the user during application of the ML-VEST and inputs provided during training of the neural network of the ML-VEST.

From a high-level, as applied during application of the ML-VEST or training of the ML-VEST, the input preparation process 210 performs at least one input preparation function 211 and generates at least one input preparation output 213. As would be understood by one of ordinary skill in the art, the at least one input preparation function 211 and at least one input preparation output 213 can be selected such that similar processes are performed during application of the ML-VEST and during training of the neural network of the ML-VEST.

From a low-level, the at least one input preparation function 211, for example, can include image classification, image segmentation, and convolution 212, among others. Image segmentation can be performed to detect relevant characteristics of the at least one input during both training of the neural network of the ML-VEST and during application of the ML-VEST. Referred to as the at least one input preparation output 213, these relevant characteristics can be, for example, morphological features such as 'face width' and 'nose size' or can be visual equipment attributes such as 'frame shape' and 'frame color'. Additional morphological features include face shape, skin color, eye color, hair color, and the like. Such morphological features can be computed via image processing as described above (i.e. image segmentation/classification) or may be determined or measured manually on the input images, wherein manual measurement requires a calibration object to accurately calculate the dimensions of a feature. Additional visual equipment attributes can include lens width, lens height, bridge distance, temple length, and the like. Such visual equipment attributes can be computed via image processing, as described above (i.e. image segmentation/classification), or may be determined or measured manually on the input images, as above, wherein manual measurement requires a calibration object to accurately calculate the attributes. In some cases, visual equipment attributes can be accessed from a database containing the visual equipment attributes.

In an embodiment, and in addition to image segmentation and image classification, described above, a convolution 212 can be performed on the at least one input. The convolution 212 can include the use of a convolution filter and can expedite feature extraction. As will be described later, the convolution 212 may also be performed by a neural network of the ML-VEST, thereby obviating the input preparation process 210.

In an embodiment, the at least one input can be provided to the input preparation process 210 or can be provided to the machine learning application process directly. For instance, the at least one input can be visual measurements of a corresponding user. Provided by the user, the at least one input can include sphere and addition and can be provided to the neural network of the ML-VEST.

With reference to FIG. 3, following the input preparation process, if required, the prepared at least one input can be delivered to a machine learning application process 315 of the ML-VEST. Generally, the inputs to the machine learning application process can include the at least one input provided directly to the machine learning application process (e.g., image of a face and image of a visual equipment, image of a face, image of a face wearing a visual equipment) and the prepared at least one input (e.g., morphological features from an image of a face, visual equipment attributes from an image of a visual equipment). Considered together, several use cases of inputs a neural network of the ML-VEST can be considered: (1) morphological features and visual equipment attributes acquired from an image of a face and an image of a visual equipment or from an image of a face wearing a visual equipment; (2) an image of a face and visual equipment attributes; (3) morphological features and visual equipment attributes; (4) an image of a face and an image of a visual equipment; (5) morphological features, visual equipment attributes, and visual measurements; (6) an image of a face, visual equipment attributes, and visual measurements; (7) morphological features, an image of a visual equipment, and visual measurements; (8) an image of a face, an image of a visual equipment, and visual measurements; (9) morphological features; (10) an image of a face; (11) morphological features and visual measurements; (12) an image of a face and visual measurements.

Returning to FIG. 3, and based upon a selected use case (outlined above), machine learning can be applied to the prepared at least one input, wherein a fit metric 320 can be generated as an output of the machine learning application process 315. A detailed description of the neural network of the ML-VEST, for each use case, will be provided with reference to subsequent Figures. An evaluation of the magnitude of a single fit metric or a comparison of the magnitude of a plurality of fit metrics can then be used to select an ideal visual equipment 325 for the user.

Figure 4:
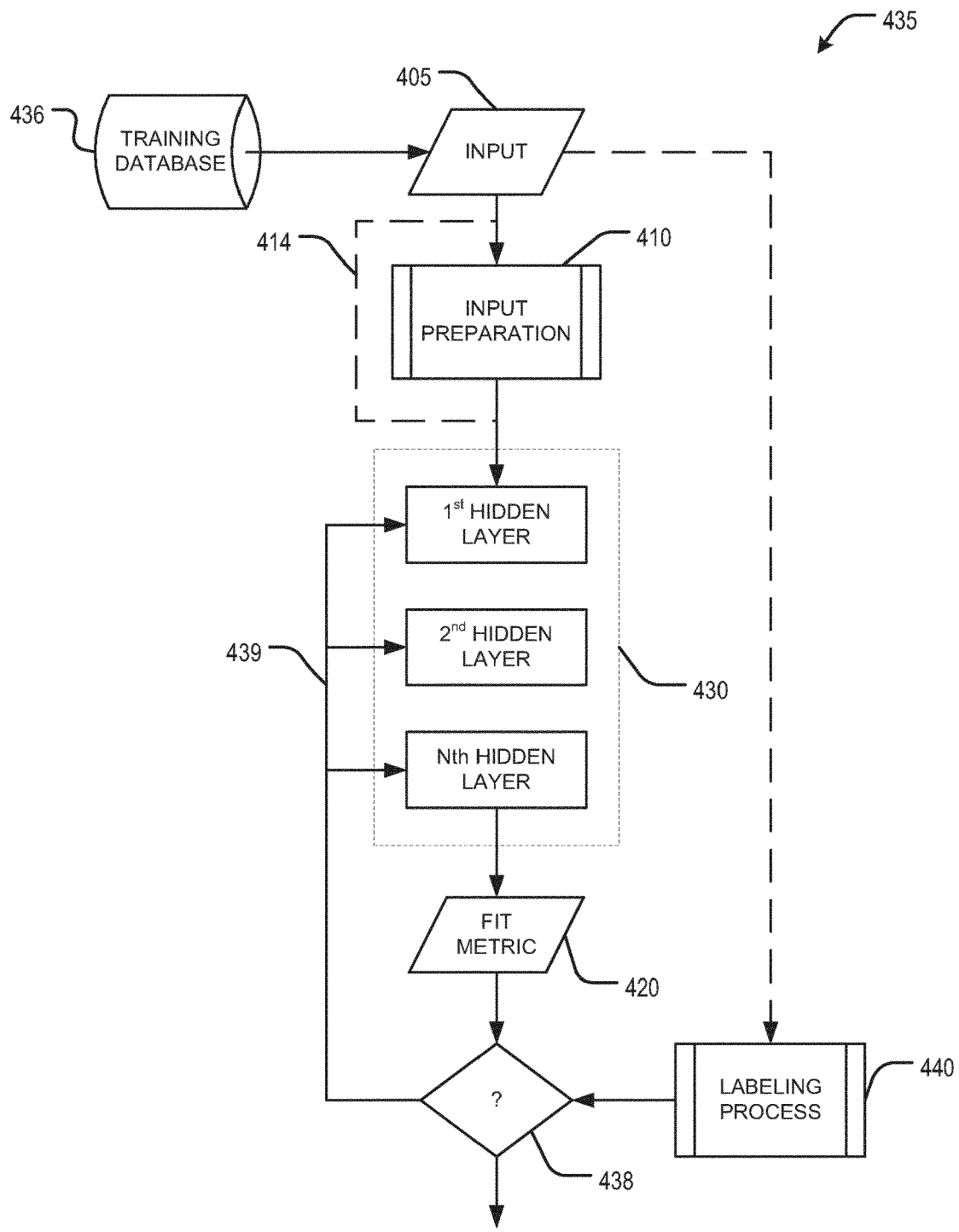
FIG. 4 is an aspect of a flow diagram of a training process of a neural network of a visual equipment selection tool, according to an exemplary embodiment of the present disclosure.

The type of fit metric 320 and resulting selected ideal visual equipment 325 can be based upon training of a neural network of the ML-VEST. Accordingly, FIG. 4A provides a flow diagram of training of a neural network used during a machine learning application process of a ML-VEST 435.

Generally, training includes providing identical inputs to the ML-VEST and to a group of labelers, the group of labelers scoring, during a labeling process 440, the fit of the inputs so as to generate training fit metric data, or 'ground truth' data. In order to train the neural network 430, a fit metric 420 generated by the neural network 430 of the ML-VEST can be compared with a training fit metric scored by a group of labelers during the labeling process 440. An error value 438 generated therebetween can be evaluated and parameters of the neural network 430 of the ML-VEST can be adjusted 439, accordingly, such that future fit metrics generated by the neural network 430 of the ML-VEST are increasingly accurate relative to the fit metric scored during the labeling process 440.

Specifically, training includes, initially, at least one input 405 being received from a training database 436. As alluded to in FIG. 2A, the training database 436 can be comprised of a plurality of inputs including images of faces, images of faces side-by-side with images of visual equipments, images of faces wearing visual equipment, and visual measurements corresponding to visual acuity of eyes of users. The plurality of inputs stored in the training database 436 are intended to be from an indistinct population of people and of a variety of visual equipments, allowing the ML-VEST to be able to robustly select an ideal visual equipment for a random user. It can be appreciated, however, that the plurality of inputs stored in the training database 436 can be any variety of inputs and can be tailored to a specific application. For instance, the plurality of inputs stored in the training database 436 can include, among others, images of faces of people from a population (or morphological features thereof), visual measurements corresponding to the images of the faces, and images of visual equipments (or visual equipment attributes thereof).

Figure 5A:
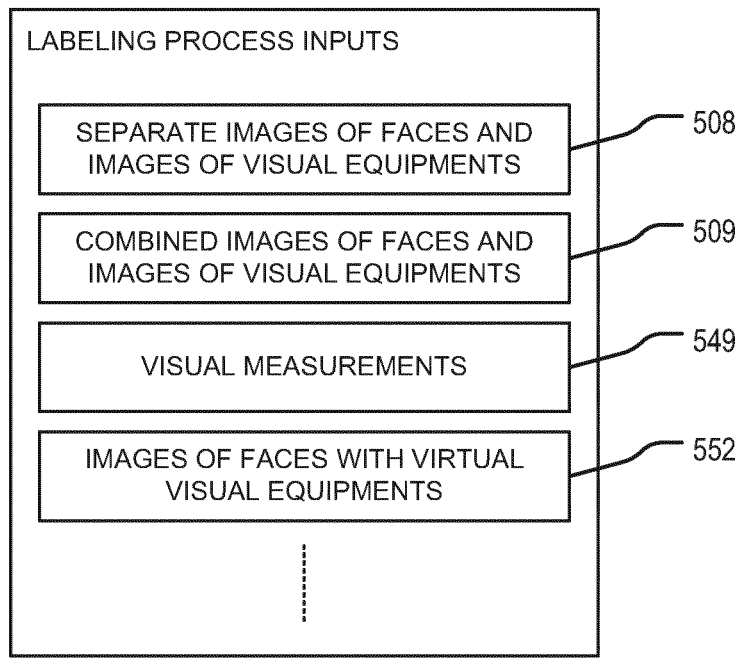
FIG. 5A is a schematic of inputs of a labeling process, according to an exemplary embodiment of the present disclosure.

The at least one input 405 from the plurality of inputs can be provided to the input preparation process 410, if desired, or directly to the neural network 430. Additionally, the at least one input 405 can be provided to the labeling process 440. In an embodiment, the at least one input 405 provided concurrently to the input preparation process 410 and the labeling process 440 can be a subset of the plurality of inputs stored in the training database, as shown in FIG. 5A. In an instance, the subset can include images of faces and images of visual equipments. Accordingly, a trained neural network 430 will be able to generate a fit metric 420 for any visual equipment. In another instance, the subset can include only images of faces. Rather than providing images of faces respective images of visual equipments, the images of faces are provided alongside a predefined list of visual equipments, the predefined list of visual equipments being an implicit input to the neural network 430. In training the neural network 430, an image of a face can be scored (i.e., labeled) against each visual equipment of the predefined list of visual equipments and an output of the neural network 430 can then be a list of matching scores of each visual equipment of the predefined list of visual equipments with the image of the face. In other words, the implicit inputs can be a selected subset, or predefined list, of images of visual equipments. The selected subset of visual equipments can be, as described in a use case, used to evaluate an image of a face, each visual equipment of the selected subset of visual equipments being given a fit score relative to the image of the face. It can be appreciated that the selection of inputs, including implicit inputs, of the plurality of inputs stored in the training database 436 can be based upon a specific implementation of the neural network 430 of the ML-VEST.

According to an embodiment, and as introduced above, the labeling process 440 can provide 'ground truth', or training, data upon which the neural network 430 can be trained and thereby learn how to accurately classify or predict a fit metric. In the context of the present disclosure, the labeling process 440 can comprise, among others, scoring and commenting on each of the plurality of images provided as the at least one input.

In an embodiment, a labeler may view, for instance, a face of a person from an input image side-by-side with an image of a visual equipment and provide scores and comments thereon. With reference to FIG. 5A, the inputs to the labeling process can include images of faces alongside images of visual equipments 508, images of faces wearing visual equipment 509, and visual measurements 549 corresponding to an image of a face, as described previously. In addition, the inputs to the labeling process can include images of faces wearing virtual visual equipment 552. Images of faces wearing virtual visual equipment 552, referred to as 'Virtual Try On Operation', provide a method for labelers to visualize a visual equipment on a face when an authentic image of a face wearing a specific visual equipment is not available. Generated within the labeling process, Virtual Try On Operation can be created by, first, deskewing an image of a visual equipment so that only a pattern of the visual equipment remains and, second, copying the pattern of the visual equipment onto an image of a face, thereby emulating an authentic image of the face wearing the visual equipment. The Virtual Try On Operation can then be evaluated and labeled by the labeler as normal.

Figure 5B:
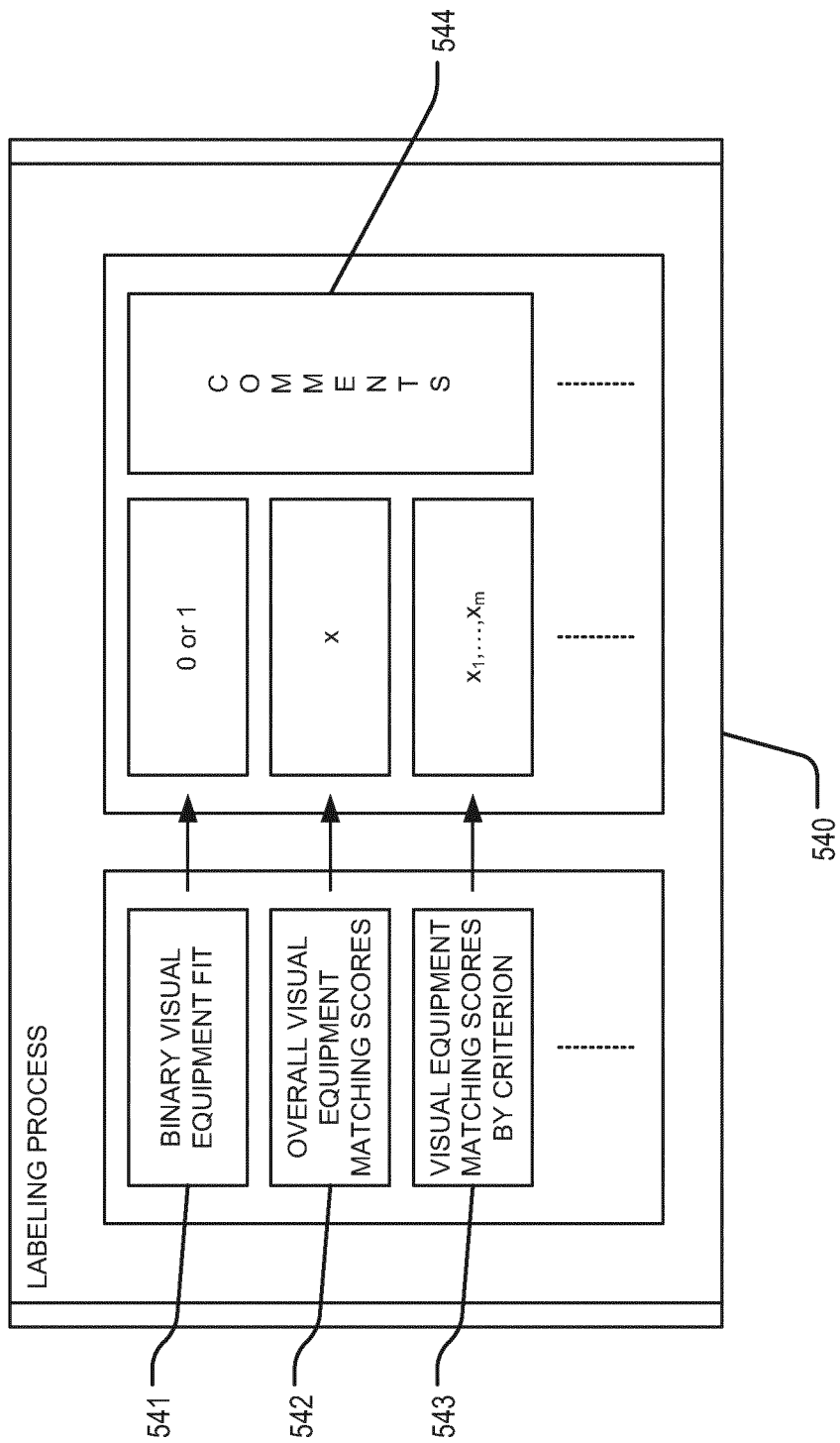
FIG. 5B is a schematic of a labeling process, according to an exemplary embodiment of the present disclosure.

In the instances introduced above, a labeler provides a label or a series of labels, or scores, that define the characteristics of the output layer of the neural network of the ML-VEST. For example, with reference to FIG. 5B, the labeling process 540 can include determining whether a visual equipment fits or does not fit a face, referred to as a binary visual equipment fit 541. The labeling process 540 can further include determining a matching score between the visual equipment and the face, referred to as an overall visual equipment matching score 542. Further still, the labeling process 540 can include determining a matching score of the visual equipment and the face for each criterion of a pre-defined criteria list, referred to as visual equipment matching by criterion 543. This pre-defined criteria list can include, for example, a matching score of the face width respective the frame width, a matching score of the face shape respective the frame shape, a matching score of the lower face shape respective the frame height, and a matching score of the skin color respective the frame color/decoration, among others. The above-described labels of the labeling process 540 can be represented as corresponding values. For instance, the binary visual equipment fit can be represented by a 0 or 1, the overall visual equipment matching scores 542 can be represented as a score between 0 and N (e.g. 2 stars out of 5 stars), and the visual equipment matching scores by criterion can be represented by, for each criterion, a score between 0 and N (e.g. 4 stars out of 5 stars). In addition to providing a label for each image according to the specific process of the labeling process 540, a labeler can provide comments 544 as to why a specific label was assigned, the comments 544 including, for example, phrases such as "this visual equipment is too large for this face width" or "this visual equipment is too dark for this skin color", among others. In an embodiment, the labeling process 540 can include, in addition to images of faces and images of visual equipments, visual measurements corresponding to the images of the faces, wherein a person with expertise in vision would be able to consider visual acuity when labeling.

It can be appreciated that the above-described labeling process can be iterative until all possible combinations of faces and visual equipments have been labeled. For instance, a label can be provided for each combination of a single image of a face with a plurality of images of visual equipments.

Returning now to FIG. 4A, and with an understanding that the labels of the labeling process 440 become the outputs of the neural network 430, the neural network 430 can be trained. A more thorough, yet general, description of training of a neural network is described with respect FIG. 14-16. As illustrated in FIG. 4A, the processed at least one input can be provided to the $1^{st}$ hidden layer, or input layer, of the neural network 430. In an example, the neural network 430 can be a fully connected neural network, allowing each fully connected layer of the neural network to learn from all combinations of the features, or outputs, of the previous layer. As discussed with regard to the input preparation process 410, the input layer of the neural network 430 may vary according to a use case. After passing the processed at least one input through N-hidden layers of the neural network 430, a fit metric 420 can be generated from the output layer. The generated fit metric 420 necessarily matches the label, or training fit metric, of the labeling process 440. Accordingly, the value of the fit metric 420 may be compared, at error determination 438, with the label, or training data, of the labeling process 440, to determine the accuracy of the output of the neural network 430. Based on the error determination 438, the training process 435 may proceed or may return to the $1^{st}$ hidden layer of the neural network 430 and the coefficients/weights of each of the hidden layers can be updated, based upon the error of the error determination 438. As shown, the training process 435 of the ML-VEST and the neural network 430, in particular, can continue until the error determination 438 satisfies a criterion. The criterion can be one of a variety of criterion including an error value or a number of iterations. Once the error of the fit metric and the training data have satisfied the criterion of the error determination 438, the neural network 430 is ready for implementation within the ML-VEST.

During implementation within the ML-VEST, the fit metric 420 can be one of a plurality of fit metrics 420 that describe an at least one input, the at least one input including an image of a face of a person and each visual equipment of a plurality of visual equipments of a visual equipment database and can be further output to a visual equipment selection process 425, shown in FIG. 4B. The visual equipment selection process 425 can acquire each of the plurality of fit metrics 420 and select the fitted visual equipment. In one instance, the fitted visual equipment maximizes a binary visual equipment fit, an overall visual equipment matching score, or a visual equipment matching score by criterion, with attendant comments, as prescribed by the training 435 of the neural network 430. In another instance, the fitted visual equipment can be determined by comparison of each of the binary visual equipment fit, overall visual equipment matching score, or visual equipment matching score by criterion, with attendant comments, to a pre-determined threshold.

Figure 6A:
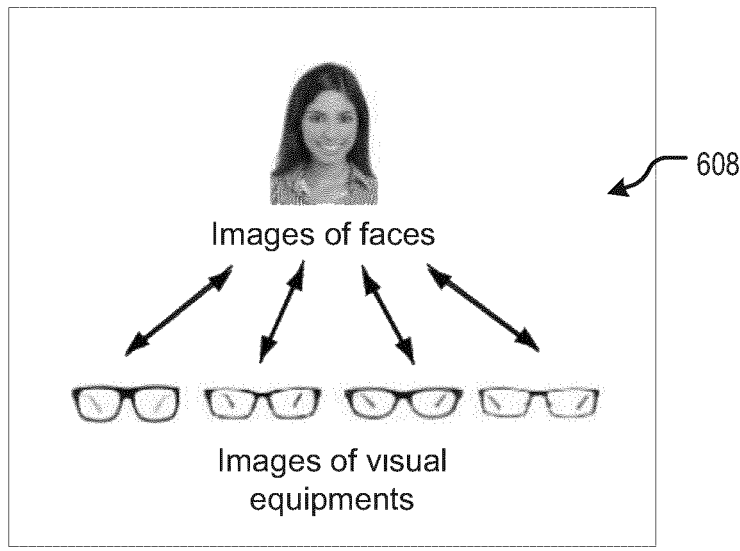
FIG. 6A is a graphic of inputs to a training process of a machine learning-based visual equipment selection tool, according to an exemplary embodiment of the present disclosure.
Figure 6B:
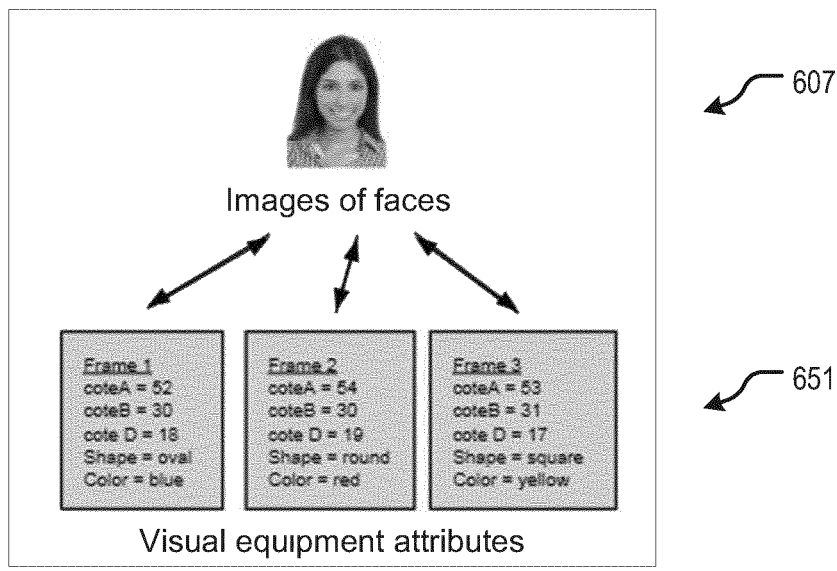
FIG. 6B is a graphic of inputs to a training process of a machine learning-based visual equipment selection tool, according to an exemplary embodiment of the present disclosure.
Figure 6C:
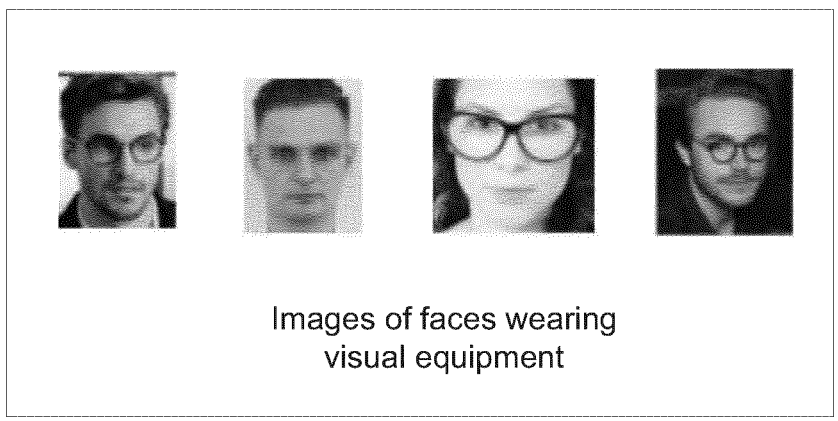
FIG. 6C is a graphic of inputs to a training process of a machine learning visual equipment selection tool, according to an exemplary embodiment of the present disclosure.
Figure 6D:
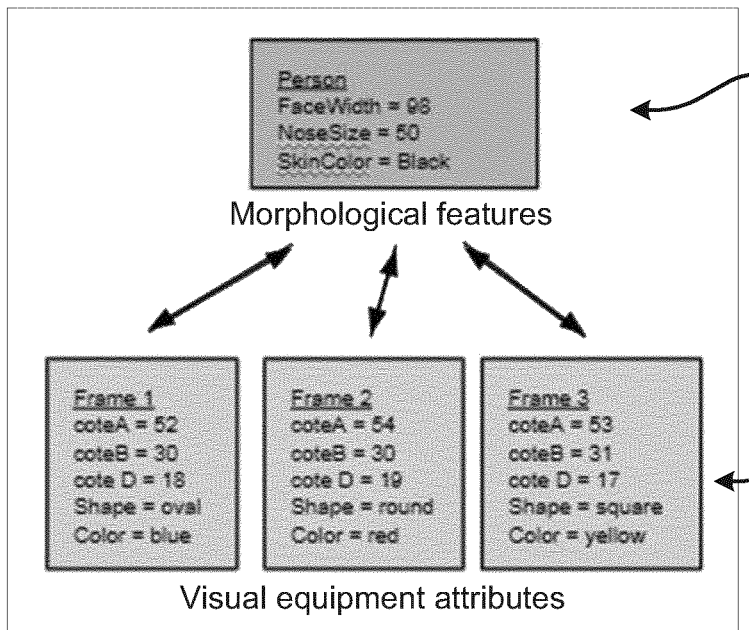
FIG. 6D is a graphic of inputs to a training process of a machine learning visual equipment selection tool, according to an exemplary embodiment of the present disclosure
Figure 6E:
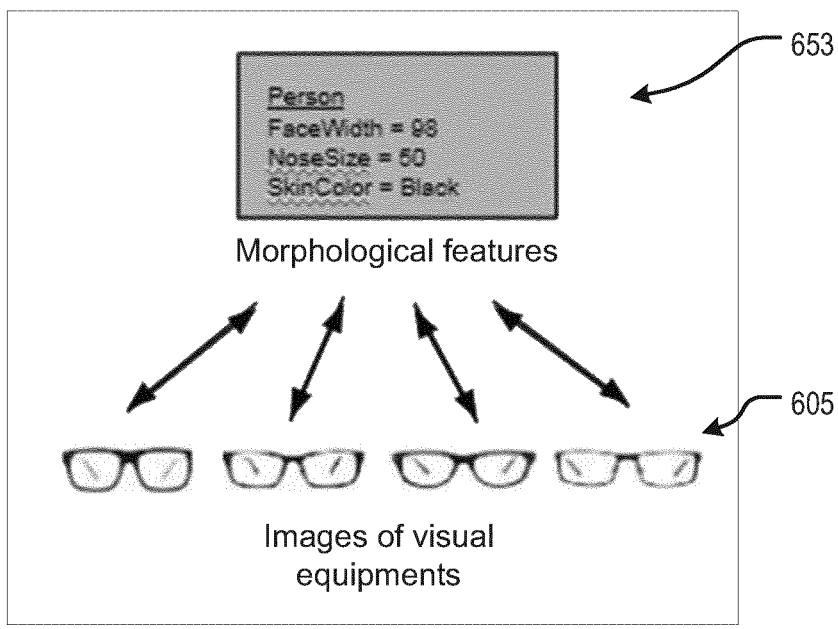
FIG. 6E is a graphic of inputs to a training process of a machine learning visual equipment selection tool, according to an exemplary embodiment of the present disclosure

FIGS. 6A-6E illustrate exemplary inputs to the ML-VEST. For instance, FIG. 6A describes a case wherein the at least one input of the training of the ML-VEST includes input images acquired from a training database, the input images containing images of faces of people and, separately, images of visual equipments 608. FIG. 6B illustrates inputs of the training of the ML-VEST wherein the at least one input includes images of faces of people 607 and visual equipment attributes 651, the visual equipment attributes 651 being similarly acquired from the training database. In view of FIG. 6A, FIG. 6C illustrates a case wherein the at least one input of the training of the ML-VEST includes images of faces of people wearing visual equipments 609. FIGS. 6D and 6E include, as an at least one input, morphological features of image of faces, the morphological features being stored in the training database. Referring to FIG. 6D, the at least one input of the ML-VEST can be morphological features 653 of images of faces and visual equipment attributes 651 of a plurality of visual equipments of the training database. As shown in FIG. 6E, the at least one input, acquired from the training database, can include morphological features 653 of images of faces and images of visual equipments 605.

Figure 7A:
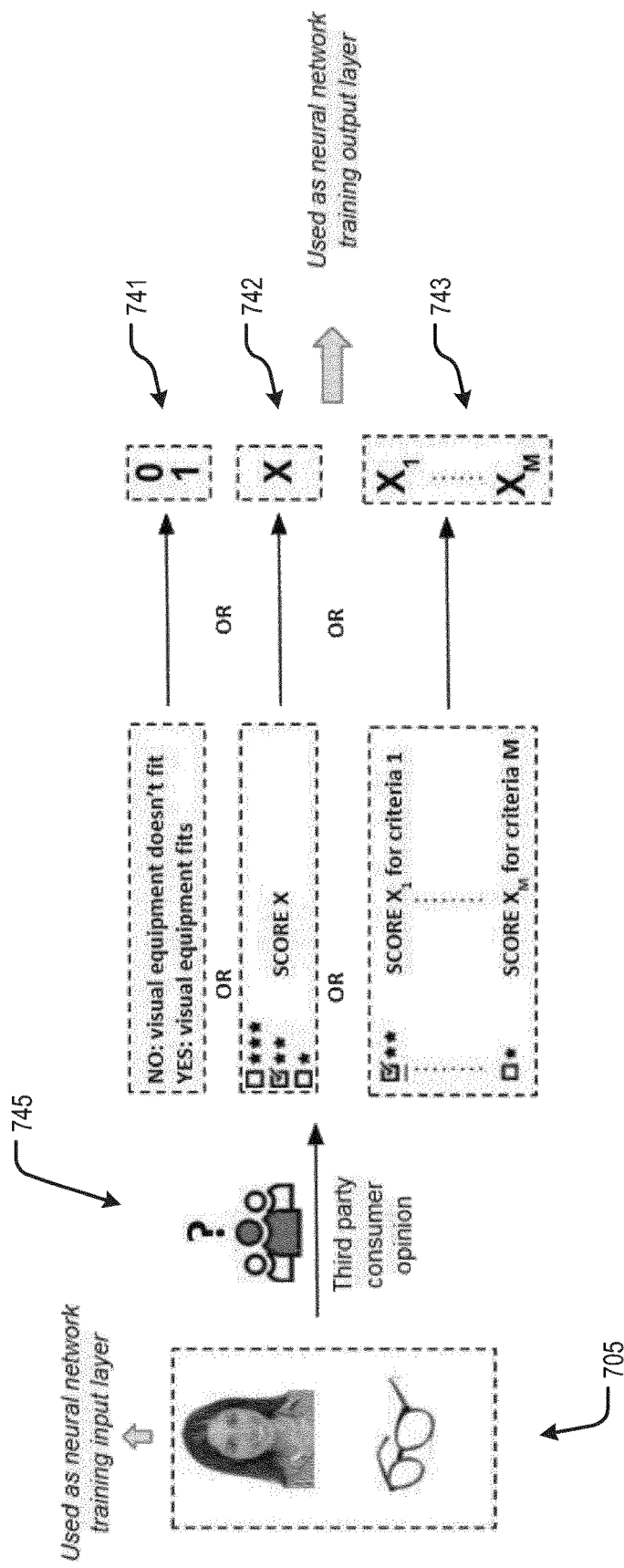
FIG. 7A is a schematic illustrating labeling of an input, according to an exemplary embodiment of the present disclosure.

FIG. 7A reflects a labeling process described in view of FIG. 5, wherein the at least one input 705 to the labeling process includes an image of a face of a person and, separately, an image of a visual equipment. The at least one input 705 of FIG. 7A, or processed at least one input in another embodiment, can be labeled by a labeler. In an embodiment, the labeler is one of a group of labelers 745. With respect to FIG. 7A, the group of labelers 745 can be a group of indistinct people. The labels of each of the group of indistinct people regarding the image of the face of the person with the visual equipment include, as described in FIG. 5, a binary visual equipment fit 741, an overall visual equipment matching score 742, and a visual equipment matching score by criterion 743. These labels, as determined by the group of labelers 745, can be deployed as 'ground truth', or training, data during training of the neural network of the ML-VEST and define the output layer of the neural network. The above described labeling process can be repeated for each combination of images of the face of people and visual equipments of the plurality of visual equipments of the training database.

Figure 7B:
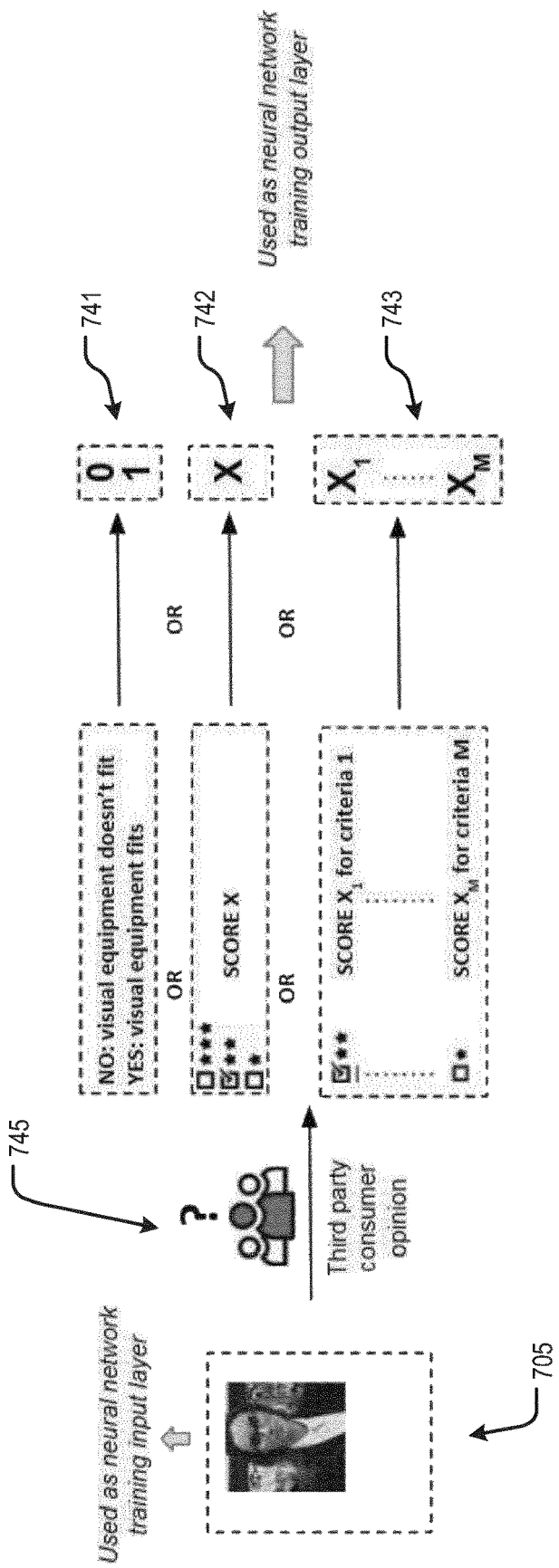
FIG. 7B is a schematic illustrating labeling of an input, according to an exemplary embodiment of the present disclosure.

FIG. 7B reflects a labeling process described in view of FIG. 5, wherein the at least one input 705 includes an image of a face of a person wearing a visual equipment. The at least one input 705 of FIG. 7B, or processed at least one input in another embodiment, can be labeled by a labeler. In an embodiment, the labeler is one of a group of labelers 745. With respect to FIG. 7B, the group of labelers 745 can be a group of indistinct people. The labels of each of the group of indistinct people regarding the image of the face of the person wearing the visual equipment includes, as described in FIG. 5, a binary visual equipment fit 741, an overall visual equipment matching score 742, and a visual equipment matching score by criterion 743. These labels, as determined by the group of labelers 745, can be deployed as 'ground truth', or training, data during training of the neural network of the ML-VEST and can define the output layer of the neural network. The above described labeling process can be repeated for each one of the images of the face of people wearing visual equipments of the plurality of images of the training database.

Figure 7C:
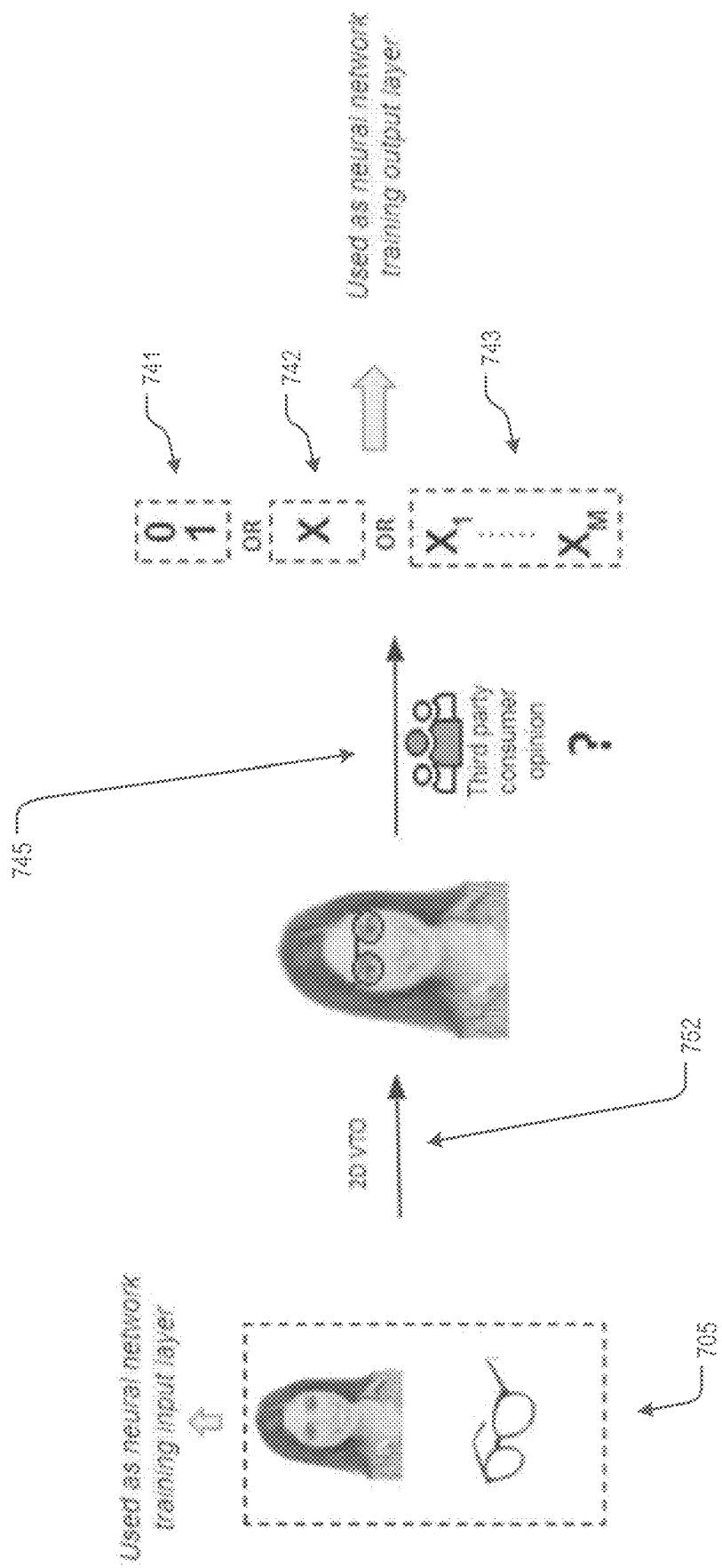
FIG. 7C is a schematic illustrating labeling of an input, according to an exemplary embodiment of the present disclosure.

FIG. 7C reflects a labeling process described in view of FIG. 5, wherein the at least one input 705 includes an image of a face of a person and an image of visual equipment. The at least one input 705 of FIG. 7B can be labeled by a labeler. In an embodiment, and in order to ease the task of the labeler, the at least one input 705 can be a processed at least one input. The processed at least one input can be a Virtual Try On Operation 752, or 2D VTO, wherein the image of the face and the image of the visual equipment are manipulated such that the face can appear to be wearing the visual equipment. The group of labelers 745, providing fit scores respective to the processed at least one input, can be a group of indistinct people. The labels of each of the group of indistinct people regarding the Virtual Try On Operation 752 of the image of the face of the person "wearing" the visual equipment includes, as described in FIG. 5, a binary visual equipment fit 741, an overall visual equipment matching score 742, and a visual equipment matching score by criterion 743. These labels, as determined by the group of labelers 745, can be deployed as 'ground truth', or training, data during training of the neural network of the ML-VEST and can define the output layer of the neural network. The above described labeling process can be repeated for a Virtual Try On Operation 752 of each one of the images of the faces of people "wearing" visual equipments of the plurality of images of the training database.

Figure 7D:
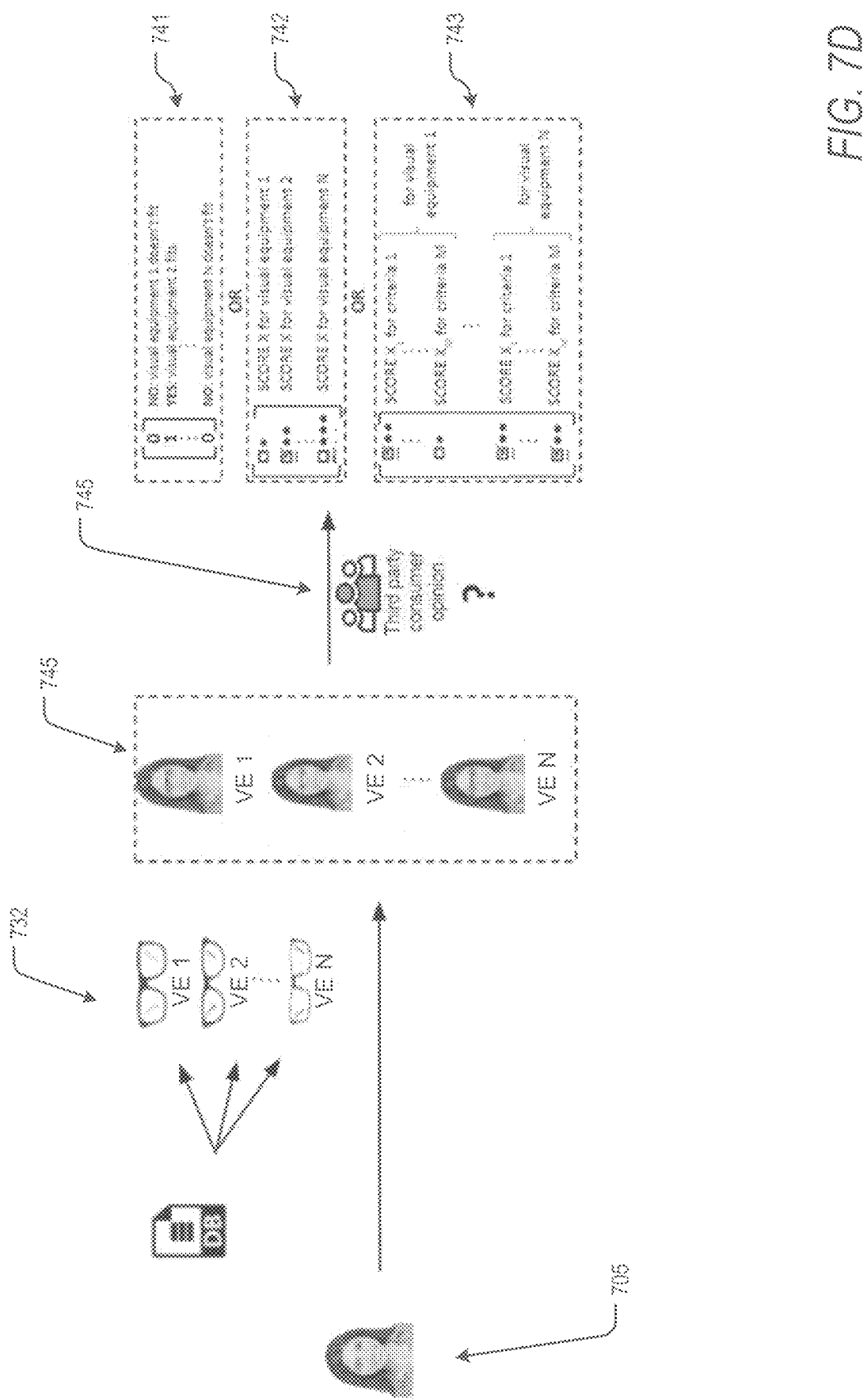
FIG. 7D is a schematic illustrating labeling of an input, according to an exemplary embodiment of the present disclosure.

FIG. 7D reflects a labeling process described in view of FIG. 5, wherein the at least one input 705 includes an image of a face of a person. The at least one input 705 of FIG. 7B can be labeled by a labeler in view of, for example, a Virtual Try On Operation 752 of a visual equipment of a subset 732 of images of visual equipments selected from the training database. The group of labelers 745, providing fit scores respective to the Virtual Try On Operation 752, can be a group of indistinct people. The labels of each of the group of indistinct people regarding the Virtual Try On Operation 752 of the image of the face of the person "wearing" the visual equipment of the subset includes, as described in FIG. 5, a binary visual equipment fit 741, an overall visual equipment matching score 742, and a visual equipment matching score by criterion 743. These labels, as determined by the group of labelers 745, can be deployed as 'ground truth', or training, data during training of the neural network of the ML-VEST and can define the output layer of the neural network. In an example, the above-described labeling process is repeated for a Virtual Try On Operation 752 of each one of the images of the faces of people "wearing" visual equipments of the subset of images of visual equipments of the training database, from Visual Equipment 1, or VE 1, to VE 2 and up to VE N.

Figure 8A:
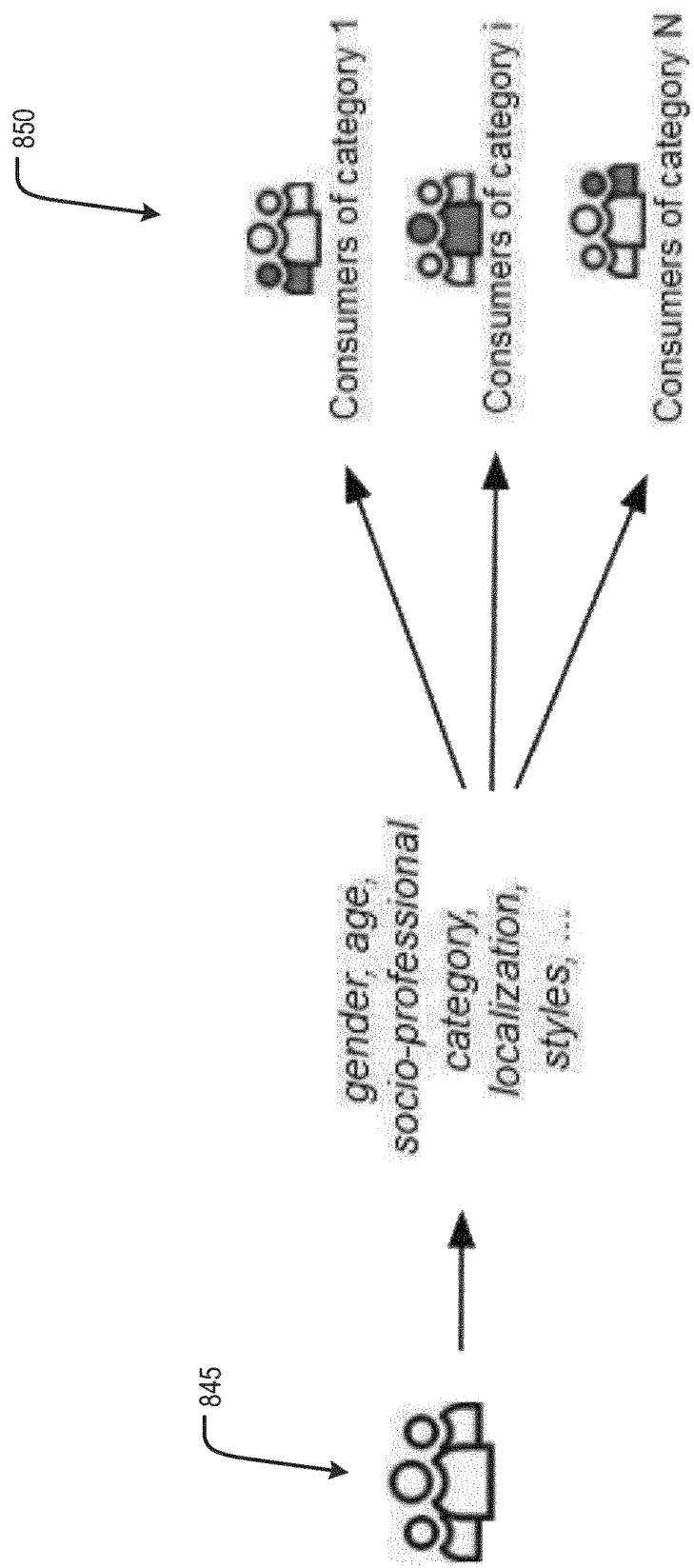
FIG. 8A is a schematic illustrating a plurality of labeling groups, according to an exemplary embodiment of the present disclosure.

According to an embodiment, the group of labelers of the labeling process can, as described in FIG. 8A, comprise subgroups with related traits. For instance, a group of labelers 845 may include a plurality of categories of labelers 850, each category of the plurality of categories of labelers 850 being linked by a common trait. In one category of labelers, each of the labelers are commonly defined as a group of consumers such as, for example, gender, age, socio-professional category, localization, and style, among others. These labelers can further be defined as combination of groups of consumers such as, for example, 'frequent flier man in his fifties', 'workaholic woman with kids in her forties', and the like. Accordingly, applying each of the plurality of categories of labelers 850 to the training process of FIG. 4A, the neural network can be trained such that that output of the neural network reflects the opinions of a group of people, defined as described above. For instance, a neural network trained on the opinions of a category of labelers defined as 'single female professional in her 20s' will accordingly generate a fit metric indicative of the opinion of such a category of labelers. During implementation of the ML-VEST, a desired category of labelers 850 may be pre-selected by a user to provide a specific opinion of interest.

It can be appreciated that, by changing the category of labelers of the group of labelers, the ML-VEST can be adjusted according to the desires of a user. For instance, a user may desire to know what visual equipment may look best on their face according to the opinion of men in their local area. In another instance, the user may desire to know what visual equipment may look best on their face according to the opinion of celebrities. In any case, the ML-VEST, and the group of labelers therein, may be adjusted mutatis mutandis, in order to achieve an outcome reflecting a desired opinion.

Figure 8B:
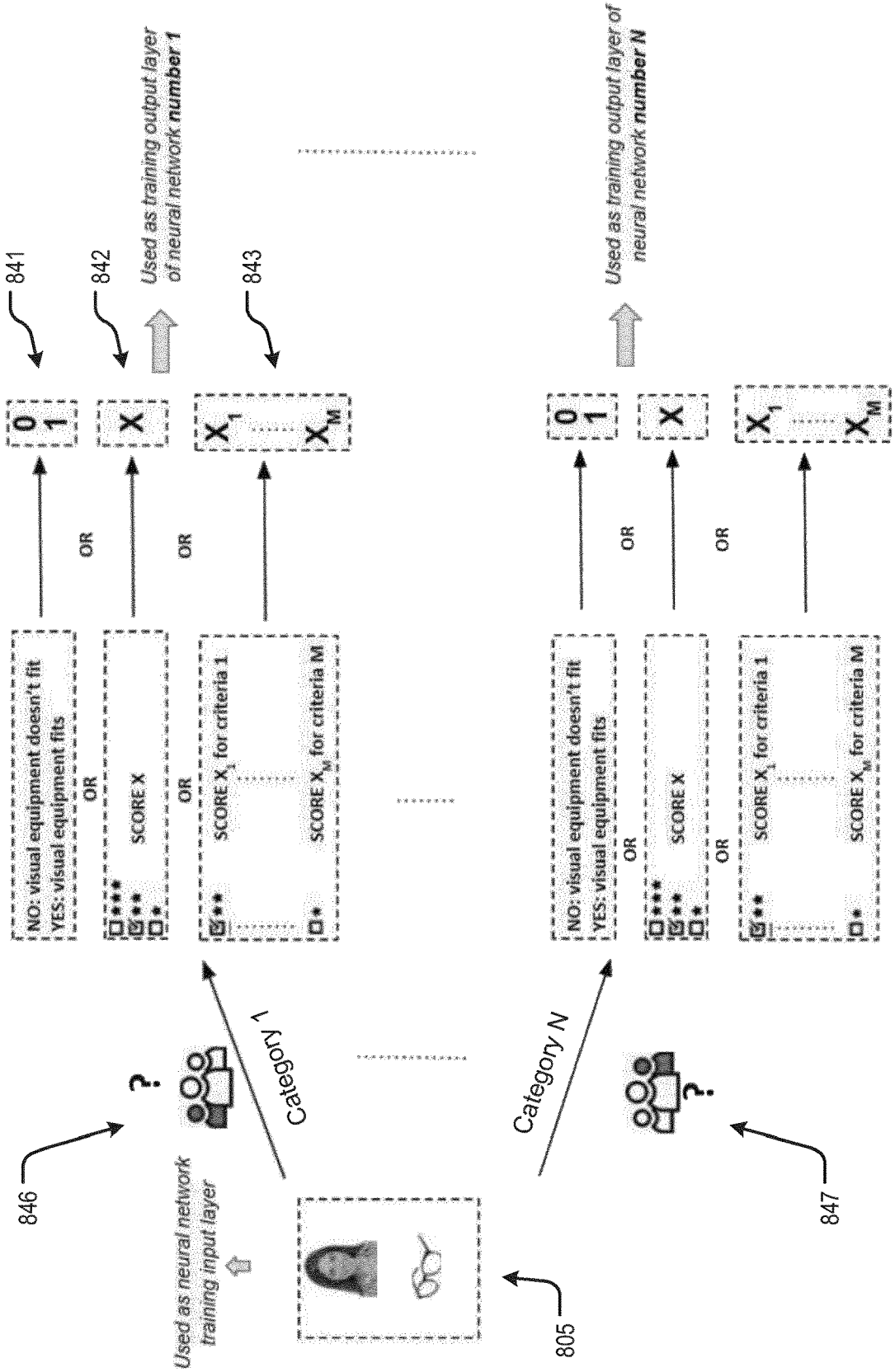
FIG. 8B is a schematic illustrating labeling of an input by a plurality of labeling groups, according to an exemplary embodiment of the present disclosure.

To this end, FIG. 8B reflects a labeling process described in view of FIG. 5, wherein the group of labelers can be one of a plurality of categories of labelers, and such that the at least one input 805 can include an image of a face displayed side-by-side with an image of visual equipment. The at least one input 805 of FIG. 8B, or processed at least one input in another embodiment, can be labeled by a group of labelers. The group of labelers can be a first category of labelers 846, and may be as many as N categories of labelers 847, wherein each category reflects a specific group of people defined by, for instance, classic consumer segmentation criteria (described in FIG. 8A). The labels of each of the first category of labelers 846, and up to the Nth category of labelers 847, regarding the side by side display of the image of the face and the image of the visual equipment includes, as described in FIG. 5, a binary visual equipment fit 841, an overall visual equipment matching score 842, and a visual equipment matching score by criterion 843. These labels, as determined by the categories of labelers, can be deployed as 'ground truth', or training, data during training of the neural network of the ML-VEST and can define the output layer of the neural network. In an example, the above-described labeling process is repeated for each combination of images of faces and images of visual equipments of the plurality of visual equipments of the training database.

Figure 8C:
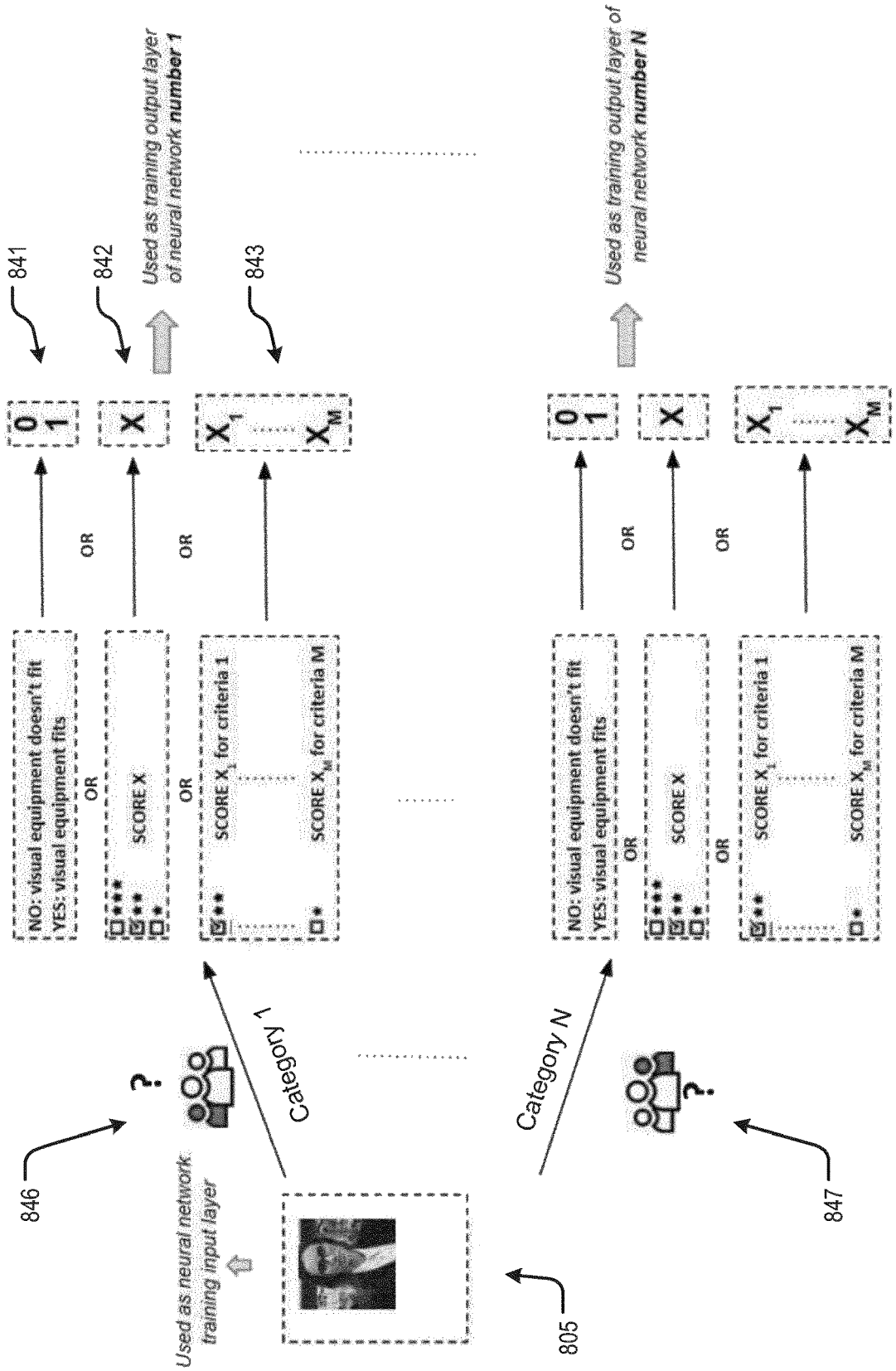
FIG. 8C is a schematic illustrating labeling of an input by a plurality of labeling groups, according to an exemplary embodiment of the present disclosure.

FIG. 8C reflects a labeling process described in view of FIG. 5, wherein the group of labelers can be one of a plurality of categories of labelers, and such that the at least one input 805 can include an image of a face wearing visual equipment. The at least one input 805 of FIG. 8C, or processed at least one input in another embodiment, can be labeled by a group of labelers. The group of labelers can be a first category of labelers 846, and may be as many as N categories of labelers 847, wherein each category reflects a specific group of people defined by, for instance, classic consumer segmentation criteria (described in FIG. 8A). The labels of each of the first category of labelers 846, and up to the Nth category of labelers 847, regarding the image of the face wearing the visual equipment includes, as described in FIG. 5, a binary visual equipment fit 841, an overall visual equipment matching score 842, and a visual equipment matching score by criterion 843. These labels, as determined by the categories of labelers, can be deployed as 'ground truth', or training, data during training of the neural network of the ML-VEST and can define the output layers of the neural network. In an example, the above-described labeling process is repeated for each combination of images of the face and visual equipment of the plurality of visual equipments of the training database.

Figure 8D:
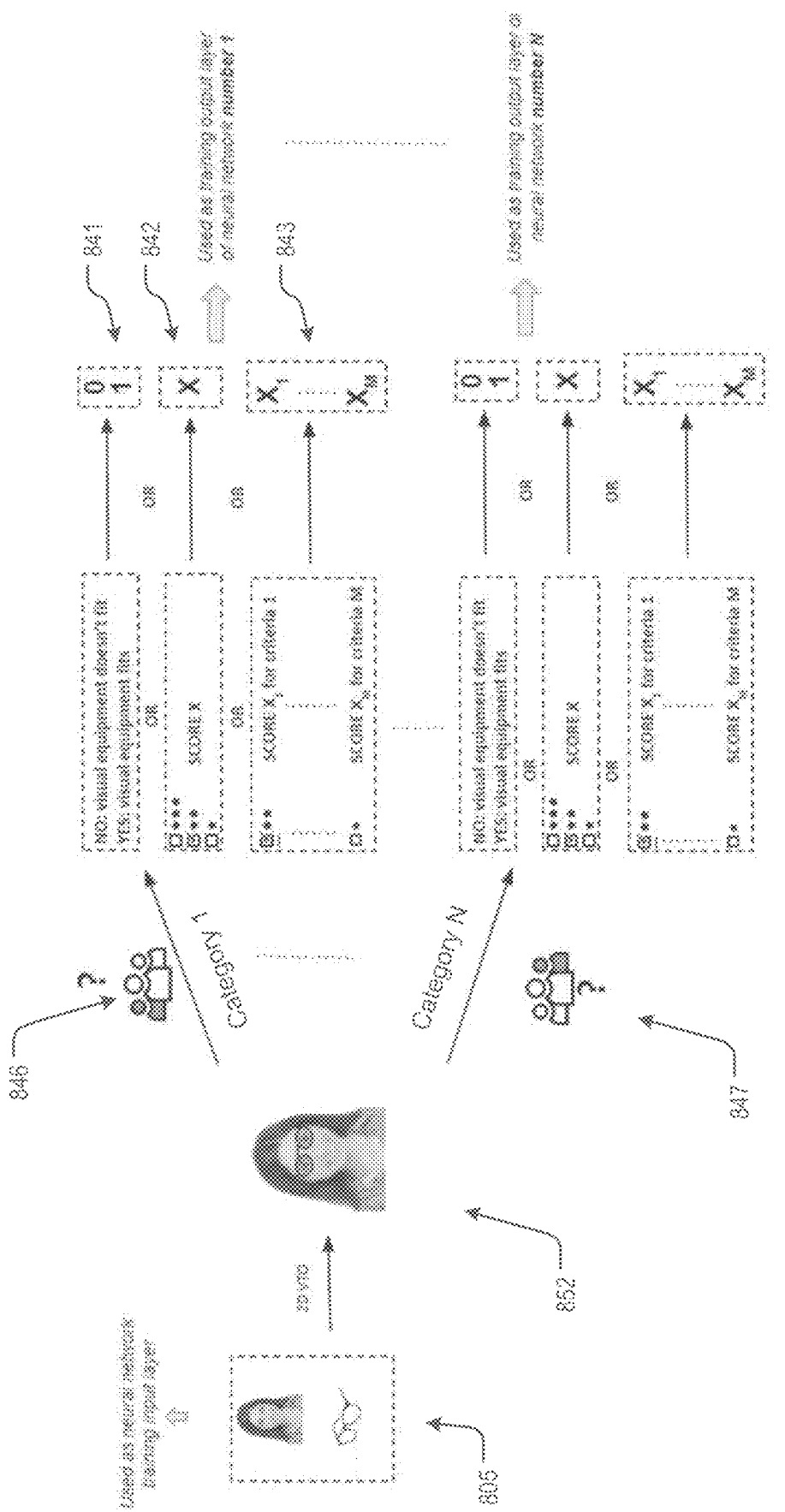
FIG. 8D is a schematic illustrating labeling of an input by a plurality of labeling groups, according to an exemplary embodiment of the present disclosure.

In view of FIG. 7C, FIG. 8D reflects a labeling wherein the group of labelers can be one of a plurality of categories of labelers, and such that the at least one input 805 can include an image of a face side by side with an image of visual equipment. The at least one input 805 of FIG. 8D, or processed at least one input in another embodiment, can be labeled by a group of labelers. In an embodiment, and in order to ease the task of the labeler, the at least one input 805 can be a processed at least one input. The processed at least one input can be a Virtual Try On Operation 852, wherein the image of the face and the image of the visual equipment are manipulated such that the face appears to be wearing the visual equipment. The group of labelers can be a first category of labelers 846, and may be as many as N categories of labelers 847, wherein each category reflects a specific group of people defined by, for instance, classic consumer segmentation criteria (described in FIG. 8A). The labels of each of the first category of labelers 846, and up to the Nth category of labelers 847, regarding the Virtual Try On Operation 852 includes, as described in FIG. 5, a binary visual equipment fit 841, an overall visual equipment matching score 842, and a visual equipment matching score by criterion 843. These labels, as determined by the categories of labelers, can be deployed as 'ground truth', or training, data during training of the neural network of the ML-VEST and can define the output layers of the neural network. In an example, the above described labeling process is repeated for a Virtual Try On Operation 852 of each combination of images of faces "wearing" visual equipments of the plurality of visual equipments of the training database.

Figure 8E:
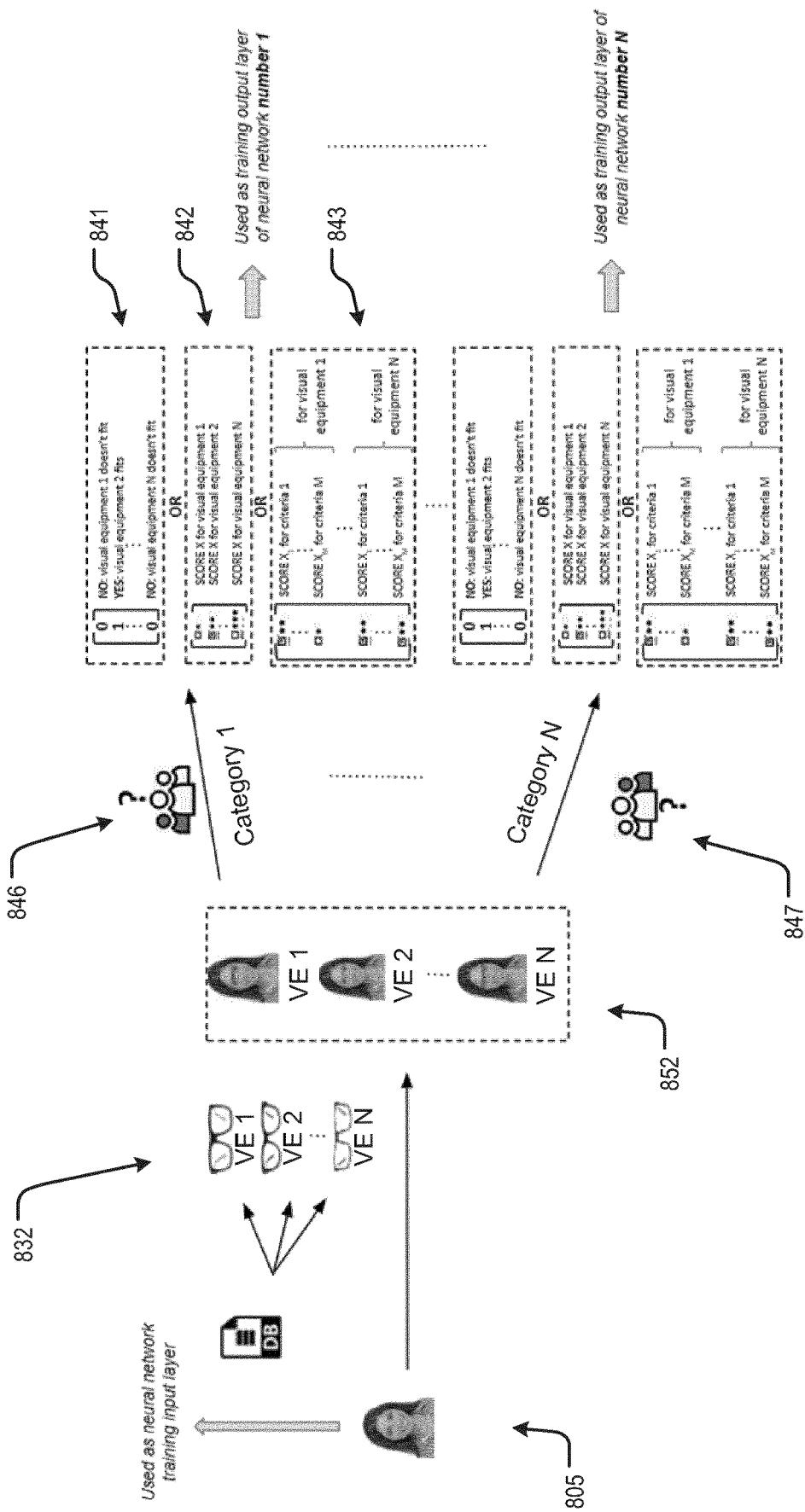
FIG. 8E is a schematic illustrating labeling of an input by a plurality of labeling groups, according to an exemplary embodiment of the present disclosure.

In view of FIG. 7D, FIG. 8E reflects a labeling wherein the group of labelers can be one of a plurality of categories of labelers, and such that the at least one input 805 can include an image of a face of a person. In an embodiment, and in order to ease the task of the labeler, the at least one input 805 can be a Virtual Try On Operation 852, wherein the image of the face and an image of visual equipment of a subset 832 of images of visual equipments selected from the training database are manipulated and combined so that the face appears to be 'wearing' the visual equipment. The group of labelers can be a first category of labelers 846, and may be as many as N categories of labelers 847, wherein each category reflects a specific group of people defined by, for instance, classic consumer segmentation criteria (described in FIG. 8A). The labels of each of the first category of labelers 846, and up to the Nth category of labelers 847, regarding the Virtual Try On Operation 852 of the image of the face "wearing" the visual equipment of the subset includes, as described in FIG. 5, a binary visual equipment fit 841, an overall visual equipment matching score 842, and a visual equipment matching score by criterion 843. These labels, as determined by the categories of labelers, can be deployed as 'ground truth', or training, data during training of the neural network of the ML-VEST and can define the output layers of the neural network. The above described labeling process can be repeated for a Virtual Try On Operation 852 of each one of the images of the faces of people "wearing" visual equipment of the subset of images of visual equipments of the training database, from Visual Equipment 1, or VE 1, to VE 2 and up to VE N.

Figure 9A:
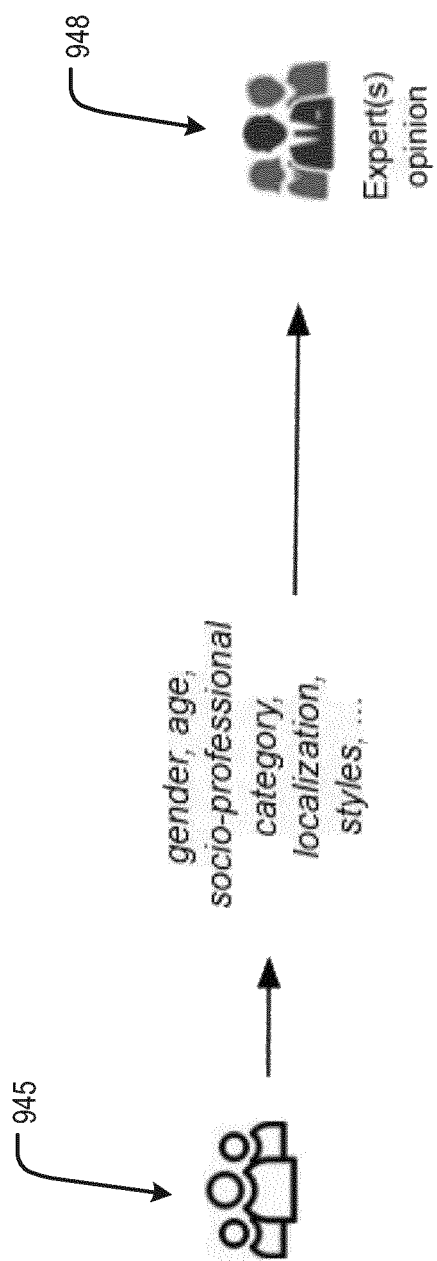
FIG. 9A is a schematic illustrating a labeling group, according to an exemplary embodiment of the present disclosure.

According to an embodiment, and with reference to FIG. 9A, a group of labelers 945 may comprise a plurality of categories of labelers, one of the plurality of categories of labelers being a category of expert labelers 948. Said category of expert labelers 948 can be heterogeneous or can be divided into subcategories of expert labelers. For instance, the category of expert labelers 948 can include eye care professionals, beauticians, and physiognomists, among others. In another instance, eye care professionals, beauticians, physognomists, and the like, can comprise subcategories and can provide profession-specific labels to the combinations of faces and visual equipments.

Figure 9B:
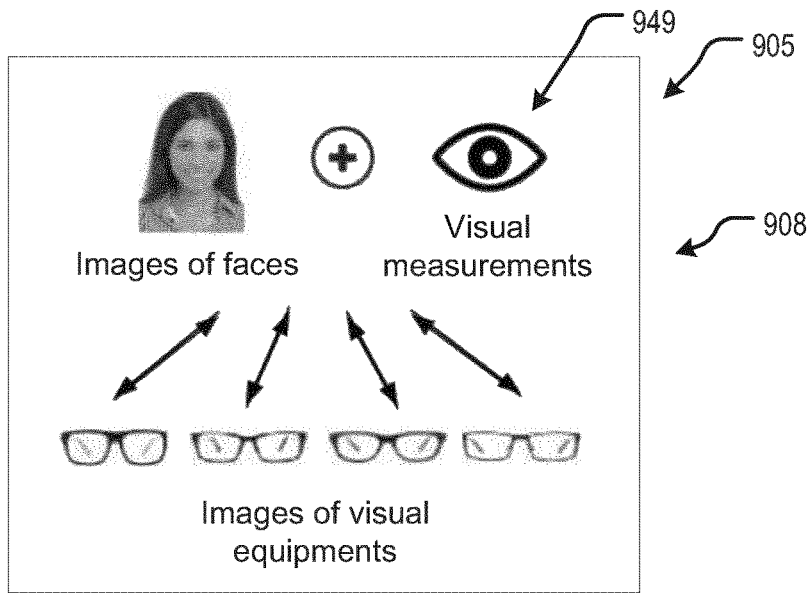
FIG. 9B is a graphic of inputs to a training process of a machine learning-based visual equipment selection tool, according to an exemplary embodiment of the present disclosure.
Figure 9C:
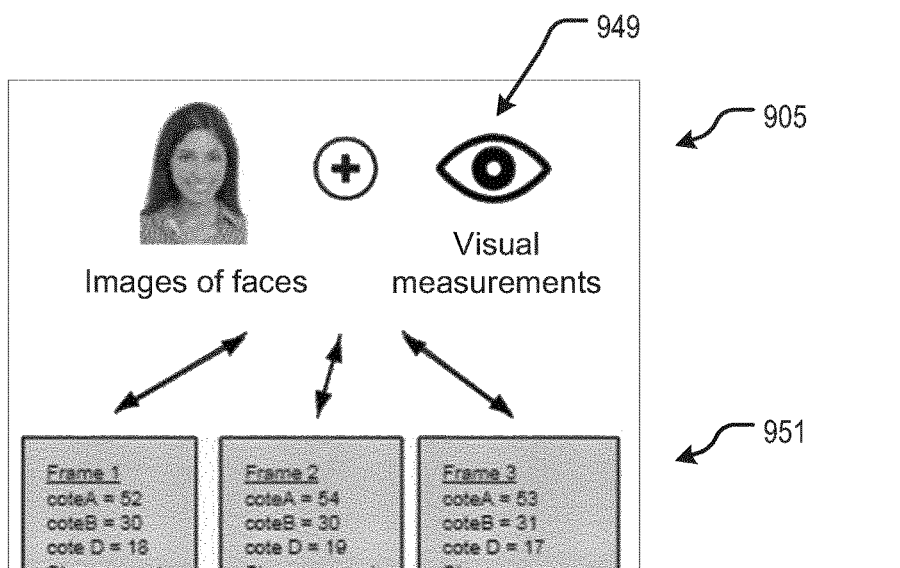
FIG. 9C is a graphic of inputs to a training process of a machine learning-based visual equipment selection tool, according to an exemplary embodiment of the present disclosure.
Figure 9D:
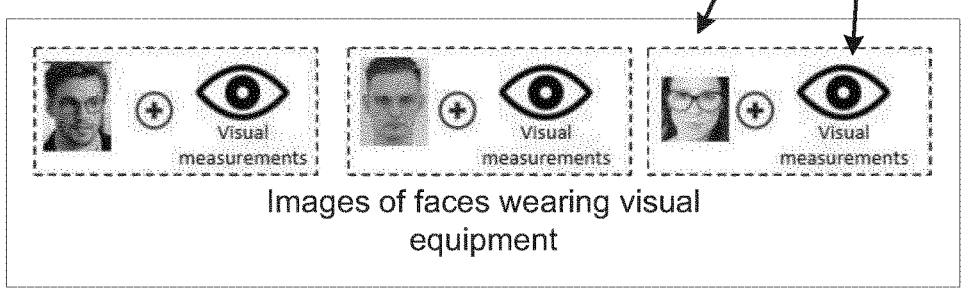
FIG. 9D is a graphic of inputs to a training process of a machine learning-based visual equipment selection tool, according to an exemplary embodiment of the present disclosure.
Figure 9E:
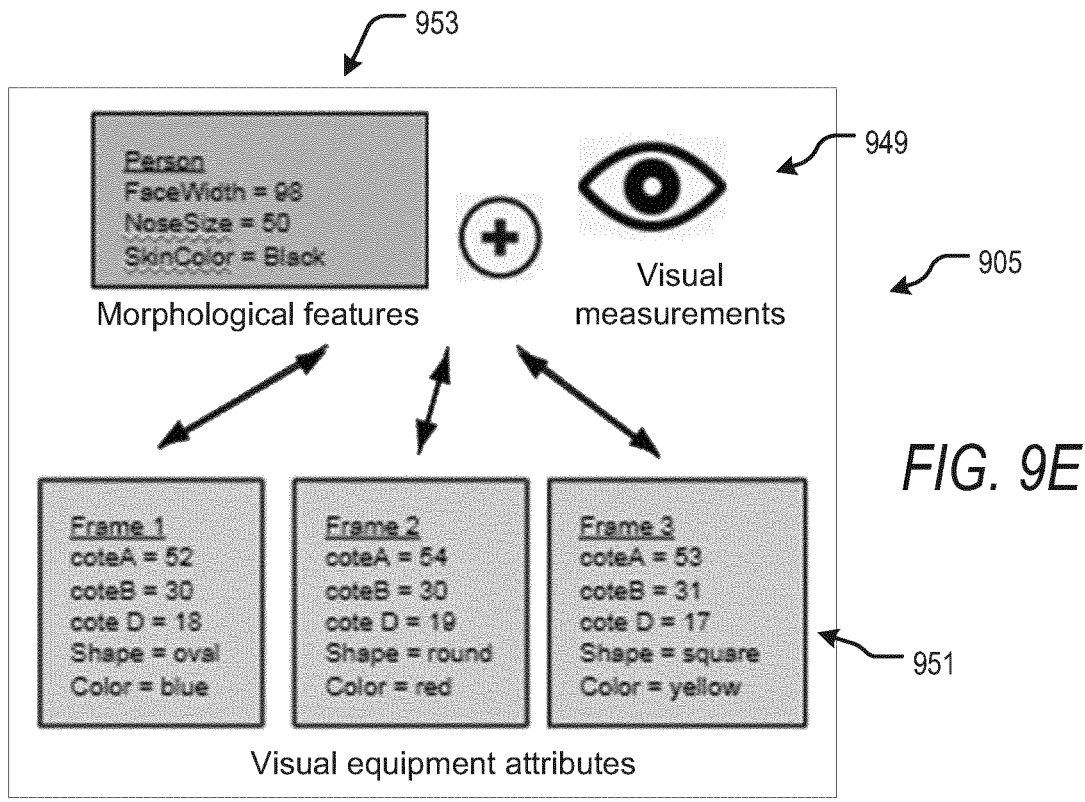
FIG. 9E is a graphic of inputs to a training process of a machine learning-based visual equipment selection tool, according to an exemplary embodiment of the present disclosure.
Figure 9F:
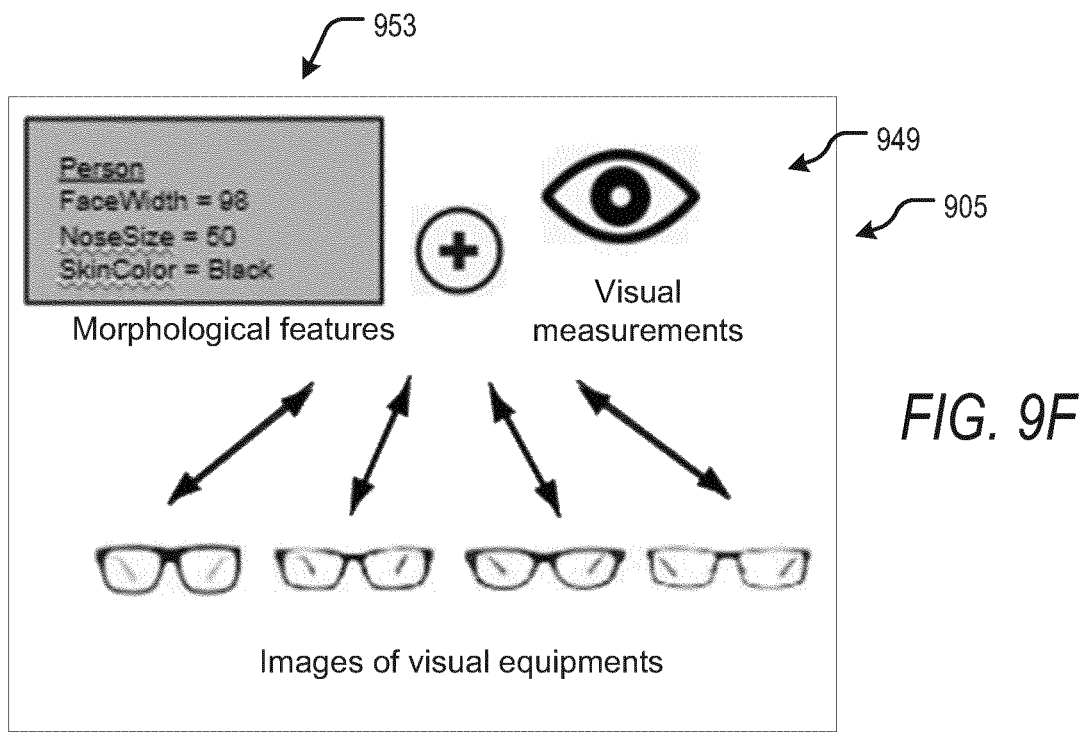
FIG. 9F is a graphic of inputs to a training process of a machine learning-based visual equipment selection tool, according to an exemplary embodiment of the present disclosure

To this end, as shown in the exemplary at least one input and processed at least one input of FIG. 9B-9F, including an expert labeler category of labelers allows for additional characteristics of the at least one input to be defined and considered during labeling. For instance, FIG. 9B describes a case wherein the at least one input 905 of the training of the ML-VEST, the at least one input 905 being acquired from a training database, contain images of faces and, separately, images of visual equipments 908. Moreover, due to the instance of the expert labelers being eye care professionals, the images of the faces of the at least one input can be further associated with visual measurements 949 such as, for instance, medical prescription and pupillary distance, among others. Similarly, FIG. 9C illustrates at least one input 905 of the training of the ML-VEST including images of faces and visual equipment attributes 951, the visual equipment attributes 951 being determined from an input preparation process substantially similar to that described for FIG. 3. Moreover, as with FIG. 9B, the faces of the people of the at least one input 905 can be associated with visual measurements 949 such as those described above. In view of FIG. 9B, FIG. 9D illustrates a case wherein the at least one input 905 of the training of the ML-VEST includes images of faces wearing visual equipments 909. Moreover, the at least one input 905 of FIG. 9D can be further associated with visual measurements 949, as described above. Referring to FIG. 9E, the at least one input 905 of the ML-VEST can include morphological features 953 of images of faces and visual equipment attributes 951 of a plurality of visual equipments of the training database. Moreover, the morphological features 953 of the images of the faces can be associated with visual measurements 949, such as those described above. Referring to FIG. 9F, the at least one input 905 of the ML-VEST can include morphological features 953 of images of faces and images of visual equipments of the training database. Moreover, the morphological features 953 of the images of the faces can be associated with visual measurements 949, such as those described above.

Figure 10A:
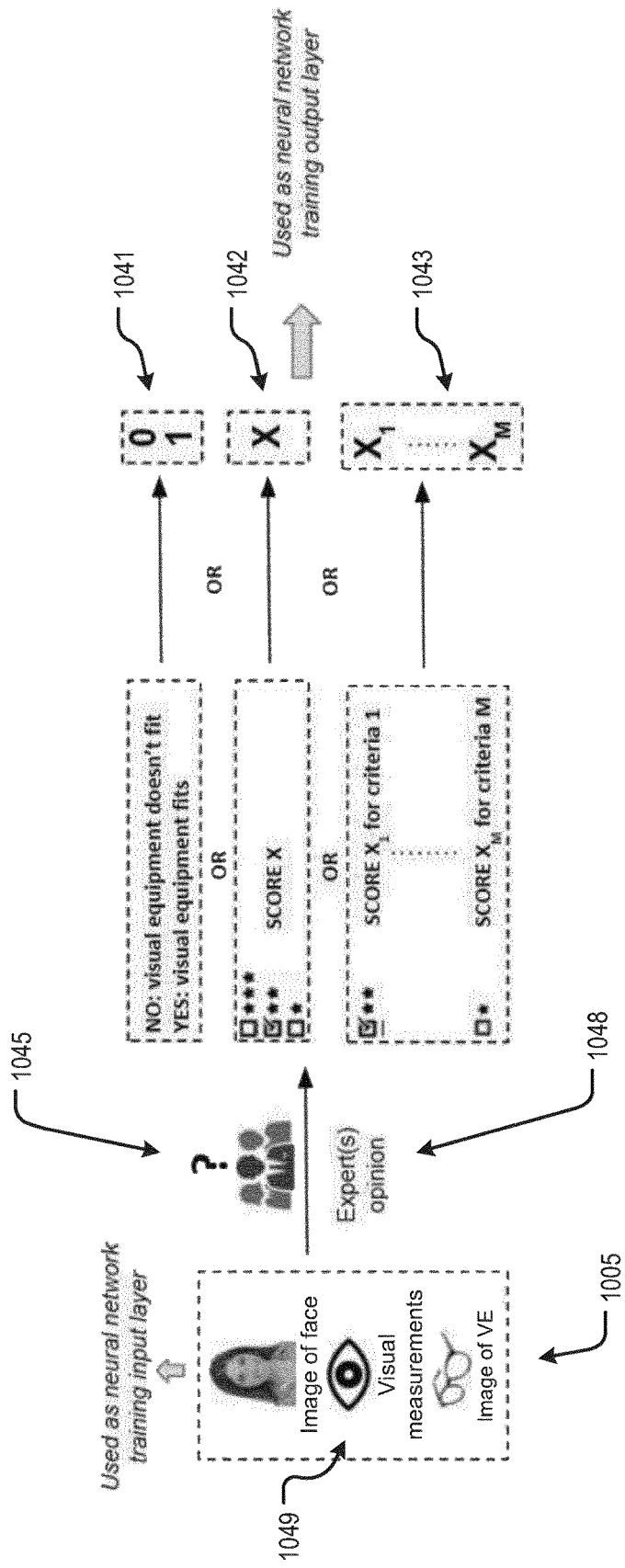
FIG. 10A is a schematic illustrating labeling of an input by a labeling group, according to an exemplary embodiment of the present disclosure.

FIG. 10A reflects a labeling process described in view of FIG. 5, wherein the at least one input 1005 comprises an image of a face and, separately, an image of a visual equipment. Additionally, as FIG. 10A employs a group of labelers 1045 that are expert labelers 1048 and may be eye care professionals, in an example, the at least one input 1005 can include visual measurements 1049 associated with the image of the face. As alluded to, the at least one input 1005 of FIG. 10A, or processed at least one input in another embodiment, can be labeled by the category of expert labelers 1048 of the group of labelers 1045. The labels of each of the category of expert labelers 1048 can include, as described in FIG. 5, a binary visual equipment fit 1041, an overall visual equipment matching score 1042, and a visual equipment matching score by criterion 1043. Additionally, these labels may include commentary as to the fit of the visual equipment and, in the case of an eye care professional, commentary directed to and in context of the visual measurements 1049. These labels, as determined by the category of expert labelers 1048, can be deployed as 'ground truth', or training, data during training of the neural network of the ML-VEST and can define the output layer of the neural network. In an example, the above-described labeling process is repeated for each combination of images of faces and visual equipments of the plurality of visual equipments of the training database.

Figure 10B:
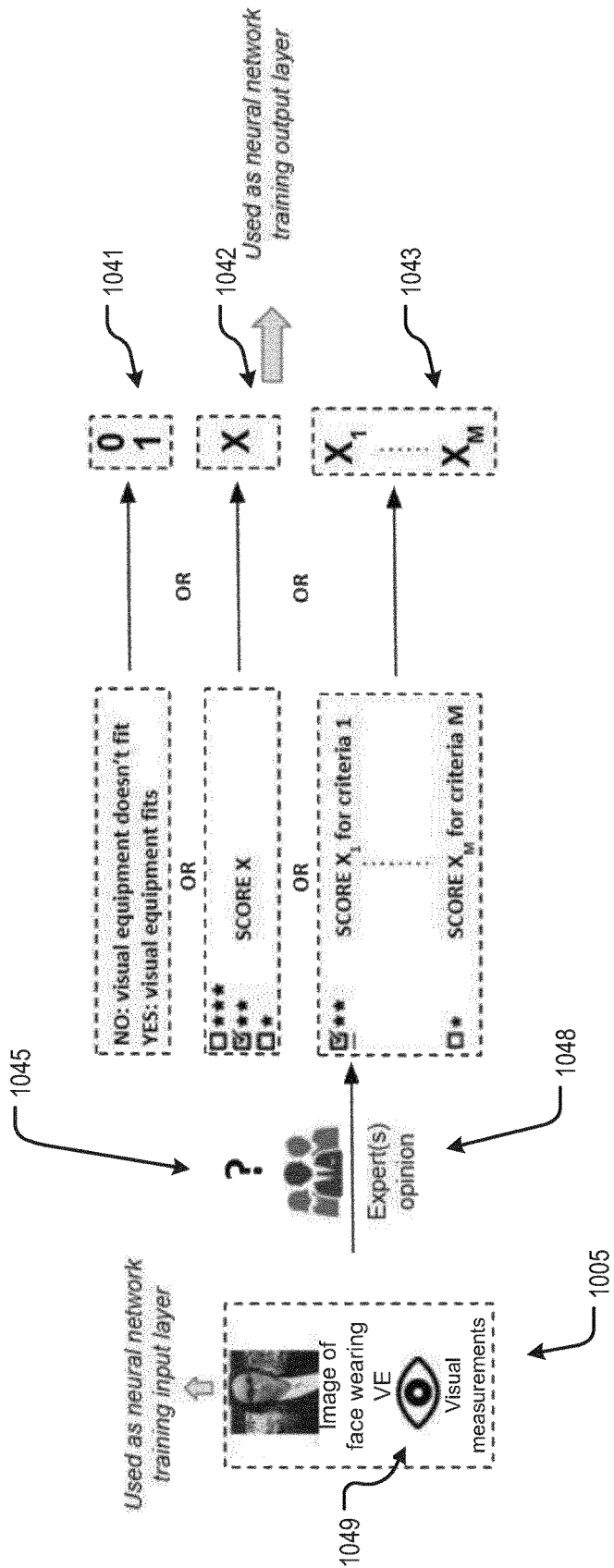
FIG. 10B is a schematic illustrating labeling of an input by a labeling group, according to an exemplary embodiment of the present disclosure.

FIG. 10B reflects a labeling process described in view of FIG. 5, wherein the at least one input 1005 comprises an image of a face wearing visual equipment. Additionally, as FIG. 10B employs a group of labelers 1049 that are expert labelers 1048 and may be eye care professionals, in an example, the at least one input 1005 can include visual measurements 1049 associated with the image of the face wearing visual equipment. As alluded to, the at least one input 1005 of FIG. 10B, or processed at least one input in another embodiment, can be labeled by the category of expert labelers 1048 of the group of labelers 1045. The labels of each of the category of expert labelers 1048 can include, as described in FIG. 5, a binary visual equipment fit 1041, an overall visual equipment matching score 1042, and a visual equipment matching score by criterion 1043. Additionally, these labels may include commentary as to the fit of the visual equipment and, in the case of an eye care professional, commentary directed to and in context of the visual measurements 1049. These labels, as determined by the category of expert labelers 1048, can be deployed as 'ground truth', or training, data during training of the neural network of the ML-VEST and define the output layer of the neural network. The above described labeling process can be repeated for each one of the images of faces wearing visual equipments of the plurality of images of the training database.

FIG. 10C reflects a labeling process described in view of FIG. 5, wherein the at least one input 1005 comprises an image of a face and, separately, an image of visual equipment. The at least one input 1005 of FIG. 10C, or processed at least one input in another embodiment, can be labeled by a group of labelers 1045, the group of labelers 1045 being expert labelers 1048. In an embodiment, and in order to ease the task of the labeler, the at least one input 1005 can be a processed at least one input. The processed at least one input can be a Virtual Try On Operation 1052, wherein the image of the face and the image of the visual equipment are manipulated such that the face appears to be wearing the visual equipment. The labels of the category of expert labelers 1048 can include, as described in FIG. 5, a binary visual equipment fit 1041, an overall visual equipment matching score 1042, and a visual equipment matching score by criterion 1043. These labels, as determined by the category of expert labelers 1048, can be deployed as 'ground truth', or training, data during training of the neural network of the ML-VEST and can define the output layers of the neural network. The above described labeling process can be repeated for a Virtual Try On Operation 852 of each combination of images of faces "wearing" visual equipments of the plurality of visual equipments of the training database.

Figure 10D:
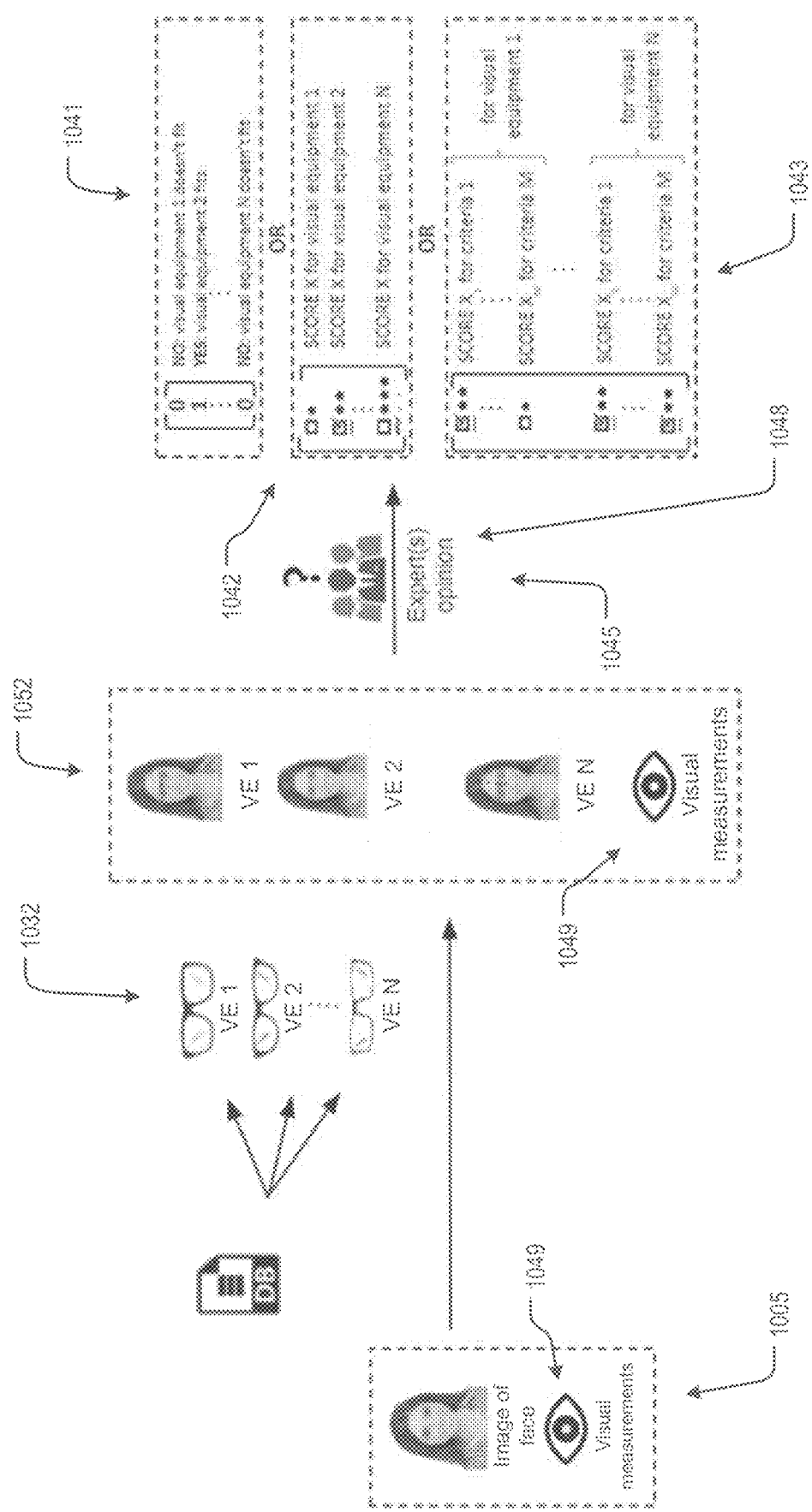
FIG. 10D is a schematic illustrating labeling of an input by a labeling group, according to an exemplary embodiment of the present disclosure.

FIG. 10D reflects a labeling process described in view of FIG. 5, wherein the at least one input 10005 comprises an image of a face and visual measurements 1049 associated with the image of the face. In an embodiment, and in order to ease the task of the labeler, the at least one input 1005 can be a processed at least one input, the processed at least one input being a Virtual Try On Operation 1052, wherein the image of the face and an image of visual equipment of a subset 1032 of images of visual equipments selected from the training database are manipulated and combined so that the face appears to be 'wearing' the visual equipment. The labels of the category of expert labelers 1048 can include, as described in FIG. 5, a binary visual equipment fit 1041, an overall visual equipment matching score 1042, and a visual equipment matching score by criterion 1043. These labels, as determined by the category of expert labelers 1048, can be deployed as 'ground truth', or training, data during training of the neural network of the ML-VEST and can define the output layers of the neural network. In an example, the above-described labeling process is repeated for a Virtual Try On Operation 1052 of each one of the images of the faces of people "wearing" visual equipment of the subset of images of visual equipments of the training database, from Visual Equipment 1, or VE 1, to VE 2, and up to VE N.

Figure 11A:
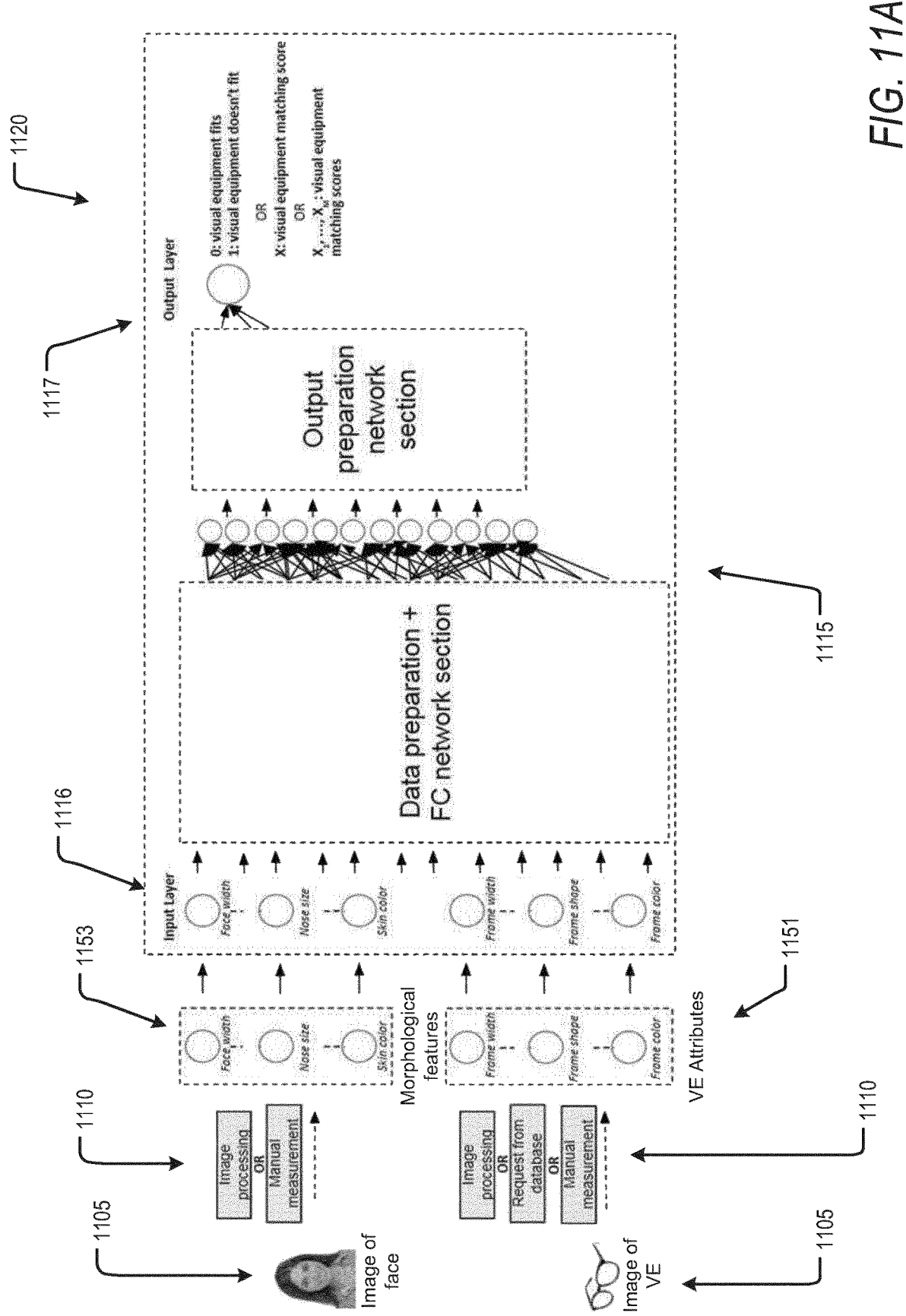
FIG. 11A is a schematic of a neural network of a machine learning-based visual equipment selection tool, wherein the inputs are morphological features and visual equipment attributes, according to an exemplary embodiment of the present disclosure.

Each of the above described labeling schemes of the labeling process can be implemented within the training process of the ML-VEST as introduced in FIG. 4A. Specifically, and with reference to the use cases described with respect to FIG. 3, implementation of the ML-VEST may proceed as illustrated in FIG. 11A through FIG. 11R. It can be appreciated that, where appropriate in the Specification and the Drawings, 'Visual Equipment' has been abbreviated to 'VE', and this may be done interchangeably.

With reference to FIG. 11A, an exemplary embodiment of Case (1), at least one input 1105 may be passed to an input preparation process 1110 prior to being input to a neural network 1115. The at least one input 1105 may comprise an image of a face and an image of visual equipment, the image of visual equipment being provided alongside the image of the face or being selected from a plurality of visual equipments of a database. The input preparation process 1110 may comprise, according to an embodiment, image processing or manual measurement to derive morphological features 1153 from the image of the face and visual equipment attributes 1151 of the image of the visual equipment, respectively. Additionally, the visual equipment attributes 1151 may be obtained by a request from the database. The processed at least one input can be delivered to an input layer 1116 of the neural network 1115, where the neural network 1115 is applied thereto. The structure of the neural network 1115 can include data preparation (including homogenization, normalization, etc.) and a fully-connected neural network and/or a convolutional+fully-connected neural network. As defined by the group of labelers during the labeling process, an output layer 1117 of the neural network 1115 reflects a prediction of the neural network 1115 as to a label. This prediction can be a fit metric 1120 generated by the neural network 1115 for the combination of the at least one input 1105.

Figure 11B:
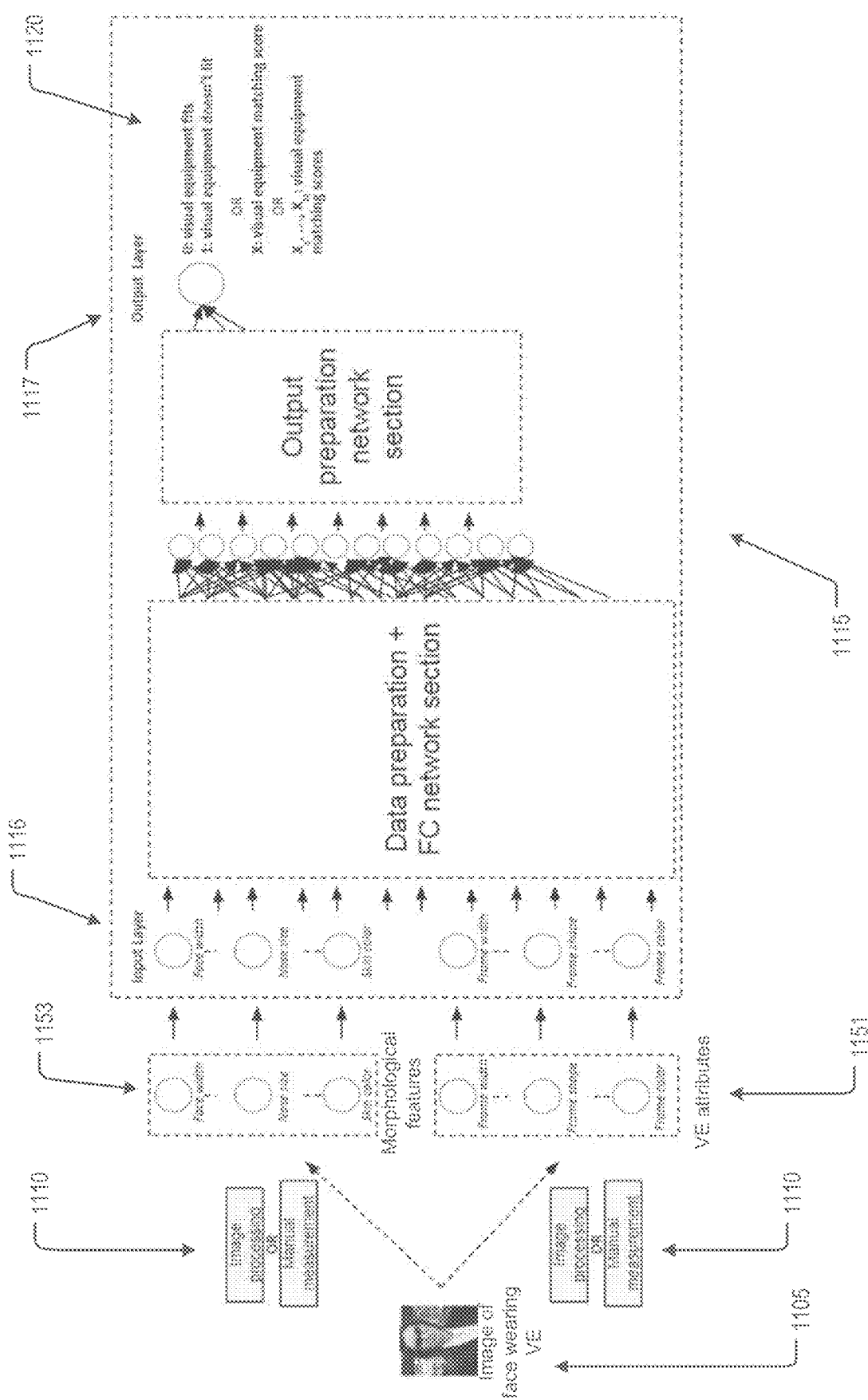
FIG. 11B is a schematic of a neural network of a machine learning-based visual equipment selection tool, wherein the inputs are morphological features and visual equipment attributes, according to an exemplary embodiment of the present disclosure.

Similar to the above, with reference now to FIG. 11B, an exemplary embodiment of Case (1), at least one input 1105 may be passed to an input preparation process 1110 prior to being input to a neural network 1115. The at least one input 1105 may comprise an image of a face wearing visual equipment. The input preparation process 1110 may comprise, according to an embodiment, image processing or manual measurement to derive morphological features 1153 and visual equipment attributes 1151 of the image of the face and the image of the visual equipment, respectively. The processed at least one input can be delivered to an input layer 1116 of the neural network 1115, where the neural network 1115 is applied thereto. As defined by the group of labelers, an output layer 1117 reflects a prediction of the neural network 1115 as to a label. This prediction is a fit metric 1120 generated by the neural network 1115 for each combination of the at least one input 1105.

Figure 11C:
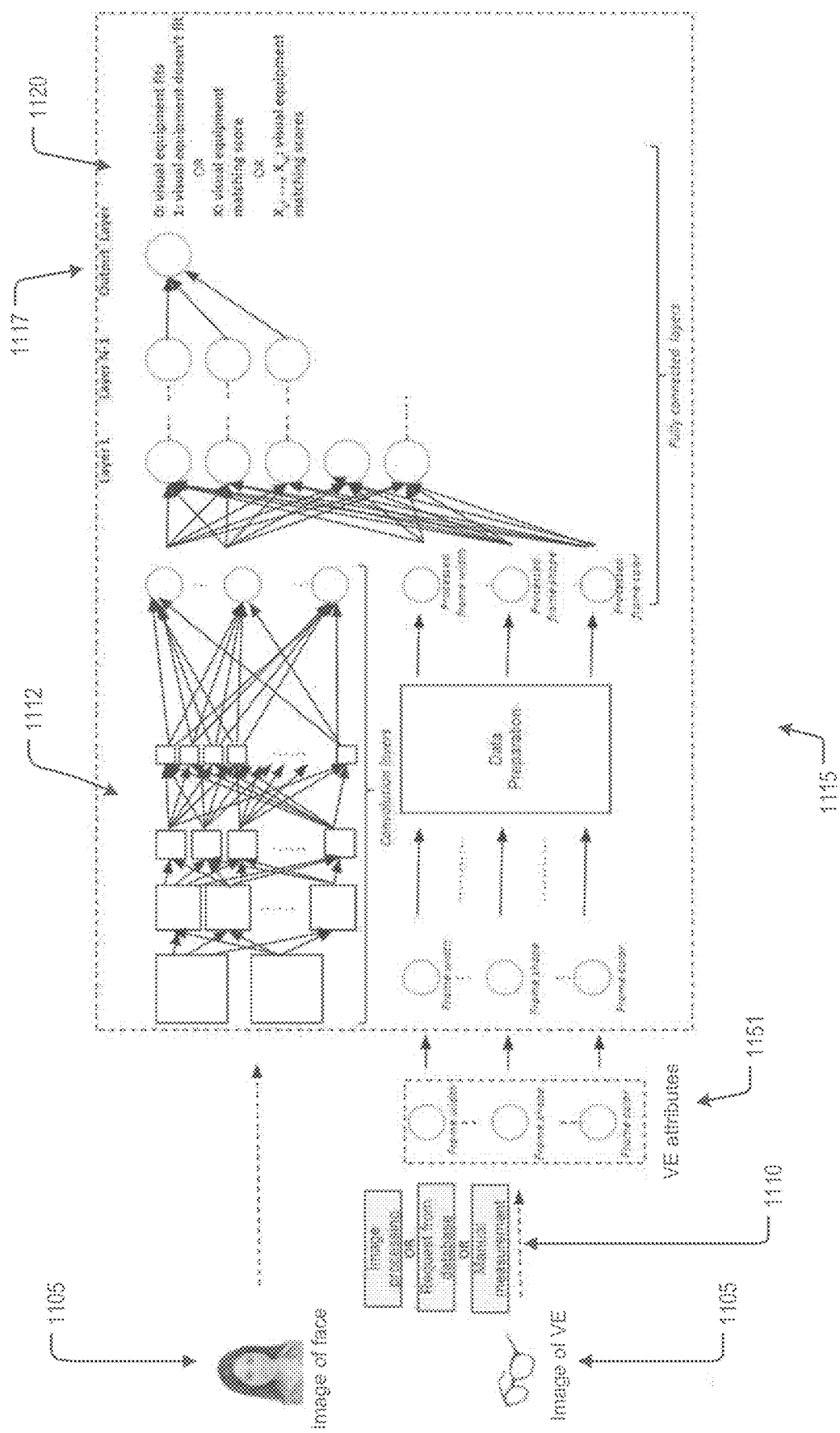
FIG. 11C is a schematic of a neural network of a machine learning-based visual equipment selection tool, wherein the inputs are facial images and visual equipment attributes, according to an exemplary embodiment of the present disclosure.

FIG. 11C, an exemplary embodiment of Case (2), provides a schematic of an ML-VEST wherein at least one input 1105 comprises an image of a face and an image of visual equipment, the image of visual equipment being provided alongside the image of the face or selected from a plurality of visual equipments of a database. The image of the face can be passed directly to a neural network 1115. As before, the image of the visual equipment can be passed to an input preparation process 1110 prior to being delivered to the neural network 1115. The structure of the neural network 1115 can include data preparation (including homogenization, normalization, etc.) and a fully-connected neural network and/or a convolutional+fully-connected neural network. To that end, the image of the visual equipment can be prepared via image processing and manual measurement in order to generate visual equipment attributes 1151. Additionally, said visual equipment attributes 1151 can be acquired via request from the database. Unlike previous embodiments, the input preparation process 1110 as applied to the image of the face may be external to or integral with the neural network 1115. For example, a convolutional neural network 1112 may be applied to the image of the face in order to perform feature extraction and prepare the image for input to an input layer of the neural network 1115 (where it meets the processed at least one input of the image of the visual equipment). Having prepared both of the at least one input 1105, the processed at least one input can be delivered to the input layer of the neural network 1115, where the neural network 1115 is applied thereto. As indicated by the group of labelers, an output layer 1117 reflects a prediction of the neural network 1115 as to a label. This prediction is a fit metric 1120, generated by the neural network 1115 for each combination of the at least one input 1105.

Figure 11D:
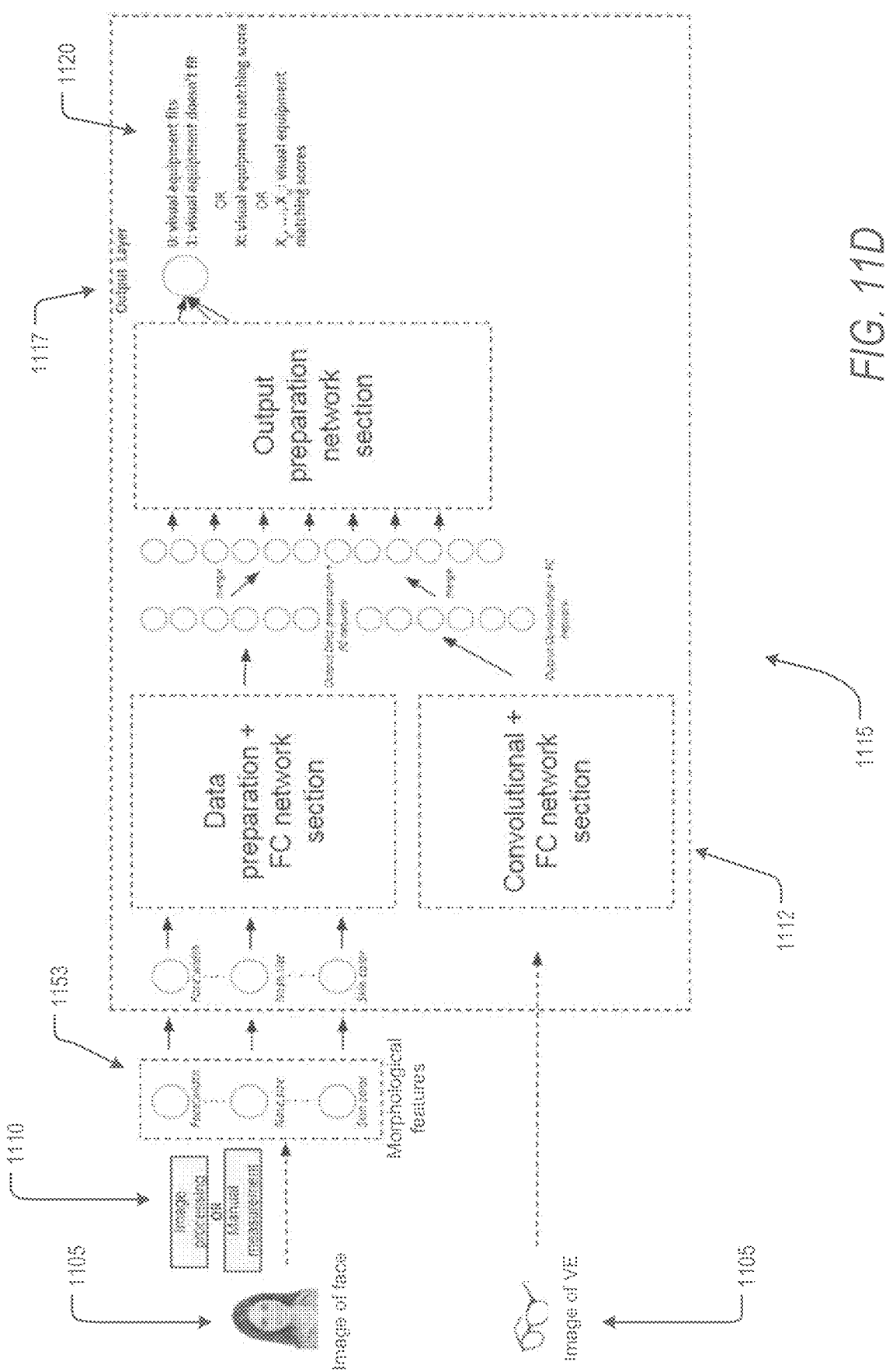
FIG. 11D is a schematic of a neural network of a machine learning-based visual equipment selection tool, wherein the inputs are morphological features and visual equipment images, according to an exemplary embodiment of the present disclosure.

FIG. 11D, an exemplary embodiment of Case (3), provides a schematic of an ML-VEST wherein at least one input 1105 comprises an image of a face and an image of visual equipment, the image of visual equipment being provided alongside the image of the face or selected from a plurality of visual equipments of a database. The image of the visual equipment can be passed directly to a neural network 1115. As before, the image of the face can be passed to an input preparation process 1110 prior to being delivered to the neural network 1115. To that end, the image of the face can be prepared via image processing and manual measurement in order to generate morphological features 1153. Unlike previous embodiments, the input preparation process 1110 as applied to the image of the visual equipment may be external to or integral with the neural network 1115. For example, a convolutional neural network 1112 may be applied to the image of the visual equipment in order to perform feature extraction and prepare the image for input to an input layer of the neural network 1115 (where it meets the processed input image of the face). Having prepared both of the at least one input 1105, the processed at least one input can be delivered to the input layer of the neural network 1115, where the neural network 1115 is applied thereto. The structure of the neural network 1115 can include data preparation (including homogenization, normalization, etc.) and a fully-connected neural network and/or a convolutional+fully-connected neural network. As defined by the group of labelers, an output layer 1117 reflects a prediction of the neural network 1115 as to a label. This prediction is a fit metric 1120, generated by the neural network 1115 for each combination of the at least one input 1105.

Figure 11E:
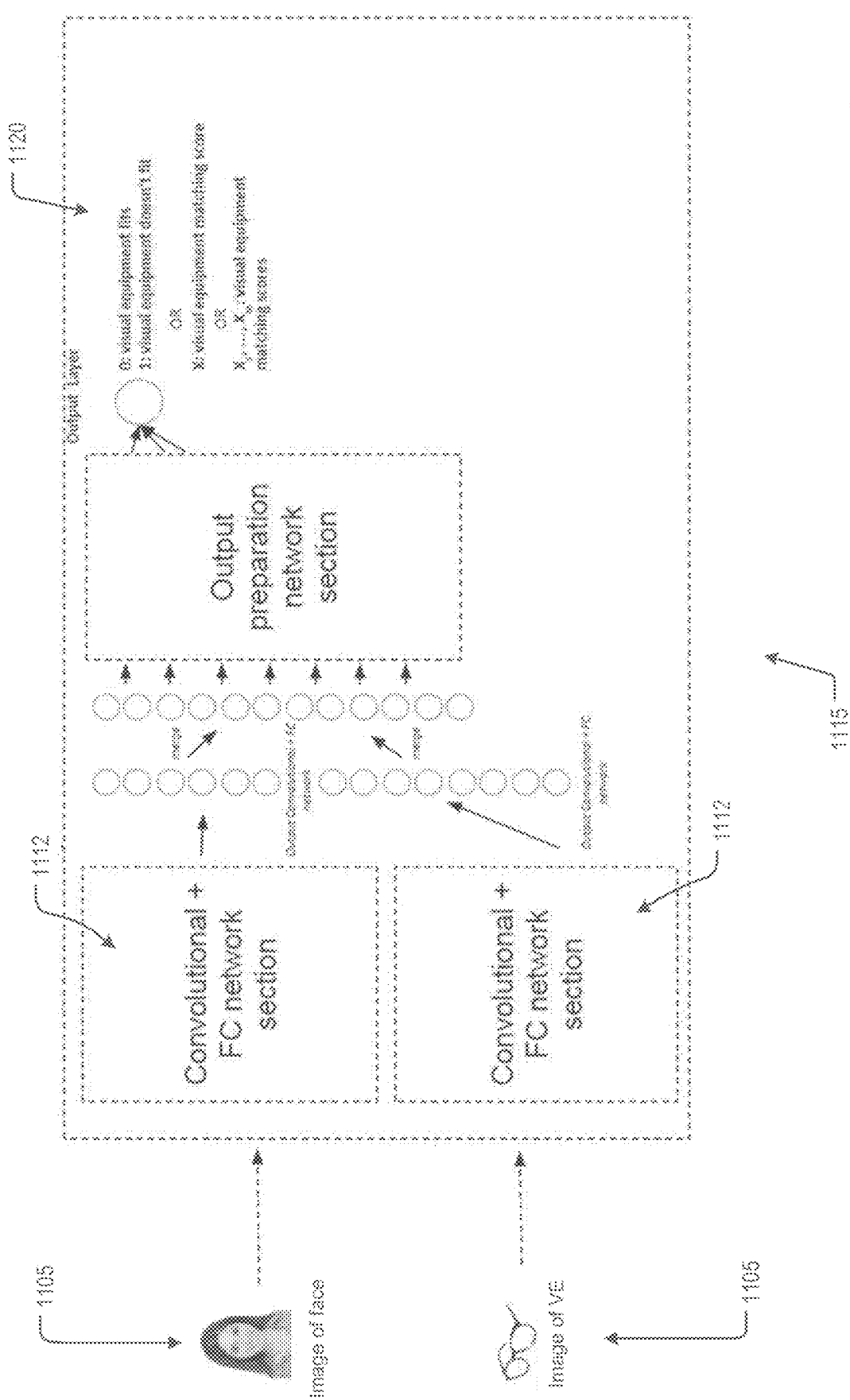
FIG. 11E is a schematic of a neural network of a machine learning-based visual equipment selection tool, wherein the inputs are facial images and visual equipment images, according to an exemplary embodiment of the present disclosure.

FIG. 11E, an exemplary embodiment of Case (4), provides a schematic of an ML-VEST wherein at least one input 1105 comprises an image of a face and an image of visual equipment, the image of visual equipment being provided alongside the image of the face or selected from a plurality of visual equipments of a database. The at least one input 1105 can be passed directly to a neural network 1115, wherein a convolution is performed. As above, the input preparation process 1110 as applied to the at least one input may be external to or integral with the neural network 1115. For example, a convolutional neural network 1112 may be applied to the at least one input 1105, including the image of the visual equipment and the image of the face, in order to perform feature extraction and prepare the images for input to an input layer of the neural network 1115. Having prepared both of the at least one input 1105 by convolution, the processed at least one input can be delivered to the input layer of the neural network 1115, where the neural network 1115 is applied thereto. The structure of the neural network 1115 can include data preparation (including homogenization, normalization, etc.) and a fully-connected neural network and/or a convolutional+fully-connected neural network. As indicated by the group of labelers, the output layer reflects a prediction of the neural network 1115 as to a label. This prediction is a fit metric 1120, generated by the neural network 1115 for each combination of the at least one input 1105.

Figure 11F:
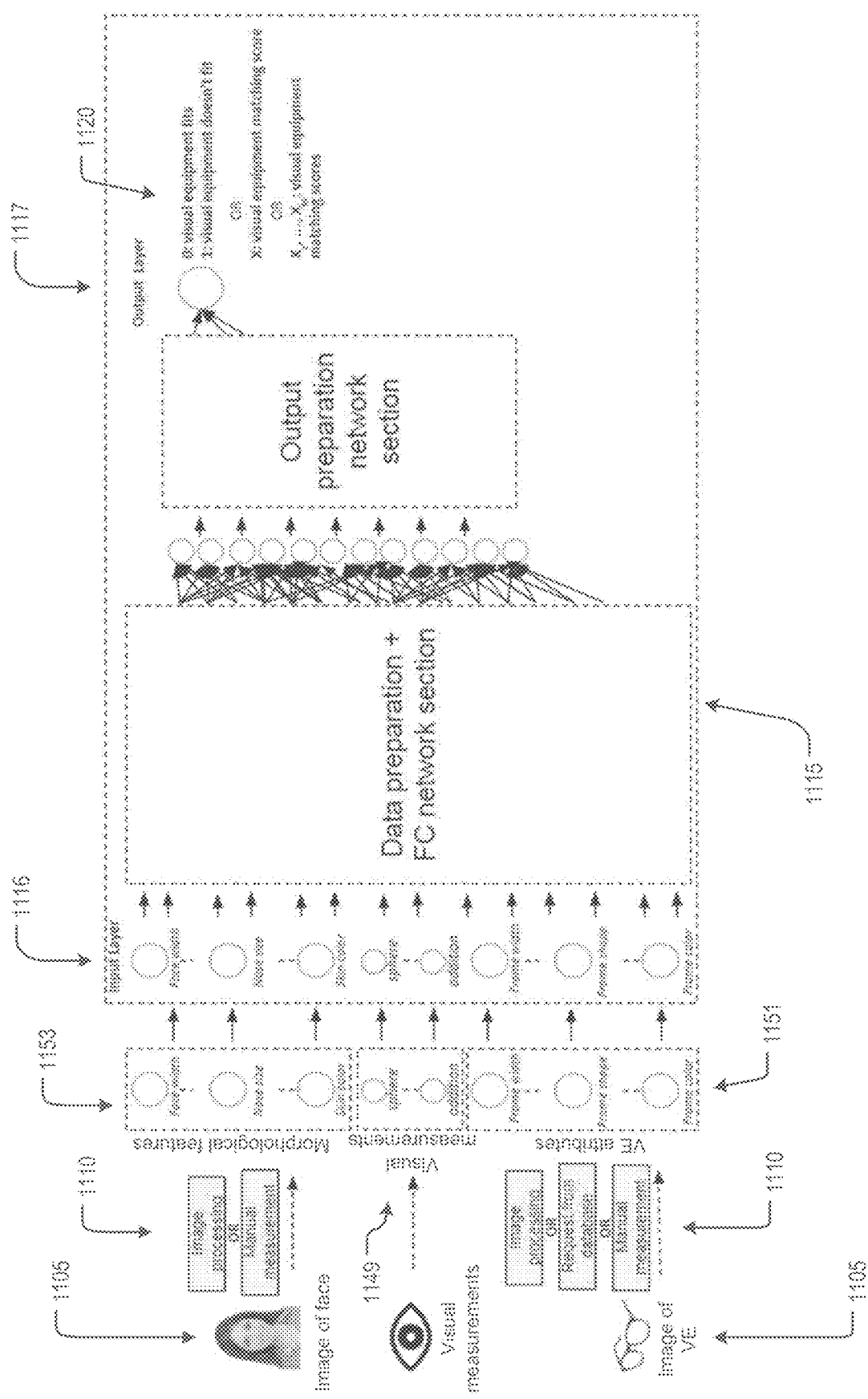
FIG. 11F is a schematic of a neural network of a machine learning-based visual equipment selection tool, wherein the inputs are morphological features, visual measurements and visual equipment attributes, according to an exemplary embodiment of the present disclosure.

With reference to FIG. 11F, an exemplary embodiment of Case (5), and in view of FIG. 11A, at least one input 1105 may be passed to an input preparation process 1110 prior to being input to a neural network 1115. The at least one input 1105 may comprise an image of a face and an image of visual equipment, the image of visual equipment being provided alongside the image of the face or selected from a plurality of visual equipments of a database. In addition, the at least one input 1105 may include visual measurements 1149 corresponding to the image of the face. The input preparation process 1110 may comprise, according to an embodiment, image processing or manual measurement to derive morphological features 1153 from the image of the face and visual equipment attributes 1151 of the image of the visual equipment, respectively. Additionally, the visual equipment attributes 1151 may be obtained by a request from the database. The processed at least one input can be delivered to an input layer 1116 of the neural network 1115, where the neural network 1115 is applied thereto. As defined by the group of labelers during the labeling process, an output layer 1117 of the neural network 1115 reflects a prediction of the neural network 1115 as to a label. In an example, the group of labelers can be expert labelers. This prediction can be a fit metric 1120 generated by the neural network 1115 for the combination of the at least one input 1105.

Figure 11G:
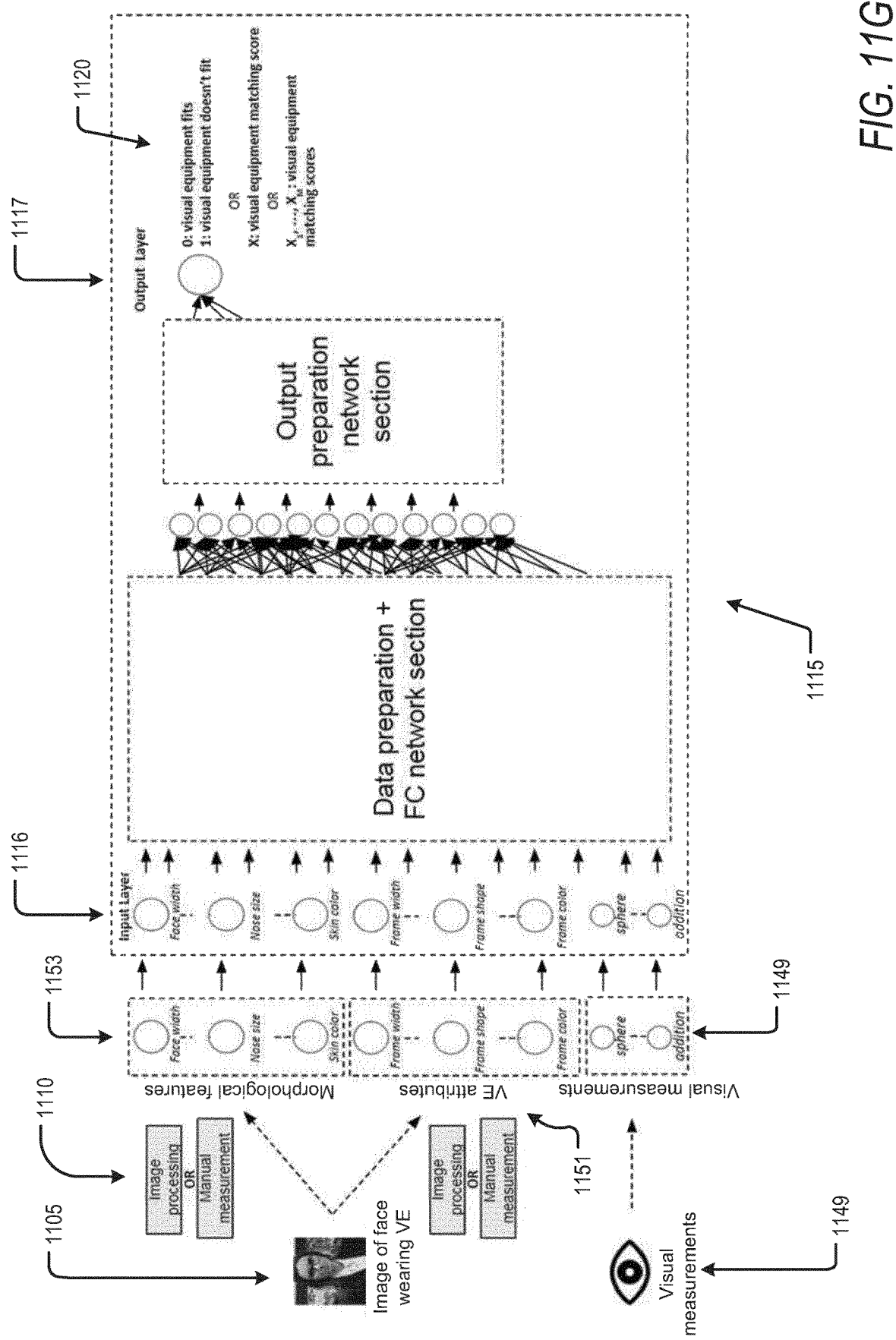
FIG. 11G is a schematic of a neural network of a machine learning-based visual equipment selection tool, wherein the inputs are morphological features, visual measurements and visual equipment attributes, according to an exemplary embodiment of the present disclosure.

With reference now to FIG. 11G, an exemplary embodiment of Case (5), and in view of FIG. 11B, at least one input 1105 may be passed to an input preparation process 1110 prior to being input to a neural network 1115. The at least one input 1105 may comprise an image of a face wearing visual equipment. Additionally, the at least one input 1105 can include visual measurements 1149 corresponding to the image of the face wearing visual equipment. The input preparation process 1110 may include, according to an embodiment, image processing or manual measurement to derive morphological features 1153 and visual equipment attributes 1151 of the image of the face and the image of the visual equipment, respectively. The processed at least one input, with the visual measurements 1149, can be delivered to an input layer 1116 of the neural network 1115, where the neural network 1115 is applied thereto. As defined by the group of labelers, expert labelers, in an embodiment, an output layer 1117 reflects a prediction of the neural network 1115 as to a label. This prediction is a fit metric 1120 generated by the neural network 1115 for each combination of the at least one input 1105.

Figure 11H:
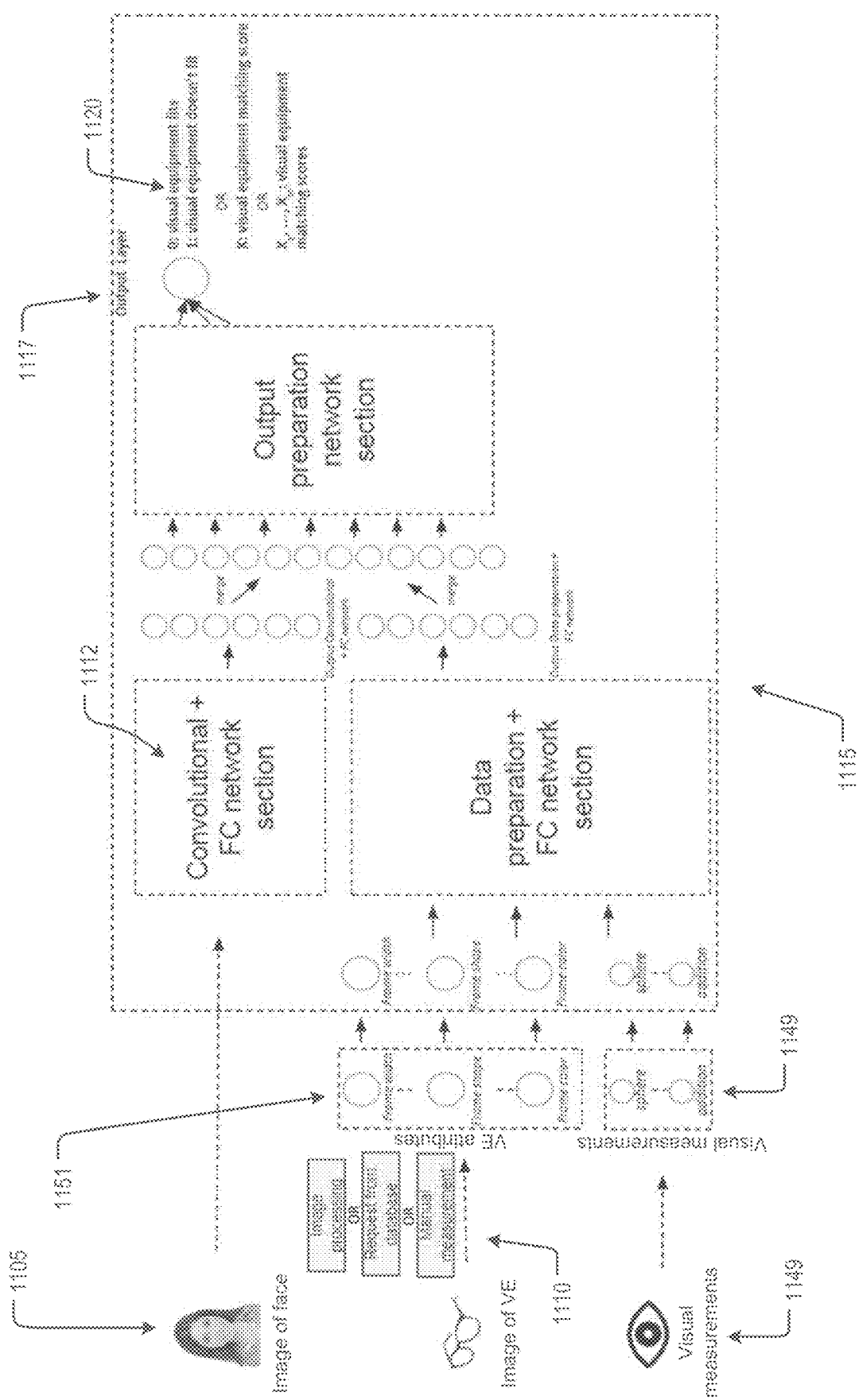
FIG. 11H is a schematic of a neural network of a machine learning-based visual equipment selection tool, wherein the inputs are facial images, visual measurements and visual equipment attributes, according to an exemplary embodiment of the present disclosure.

FIG. 11H, an exemplary embodiment of Case (6), in view of FIG. 11C, provides a schematic of an ML-VEST wherein an at least one input 1105 comprises an image of a face and an image of visual equipment, the image of visual equipment being provided alongside the image of the face or selected from a plurality of visual equipments of a database. The image of the face of the person having can be passed directly to a neural network 1115. In addition, the at least one input 1105 includes visual measurements 1149 corresponding to the image of the face. As before, the image of the visual equipment can be passed to an input preparation process 1110 prior to being delivered to the neural network 1115. To that end, the image of the visual equipment can be prepared via image processing and manual measurement in order to generate visual equipment attributes 1151. Additionally, said visual equipment attributes 1151 can be acquired via request from a database. Unlike previous embodiments, the input preparation process 1110 as applied to the image of the face may be external to or integral with the neural network 1115. For example, a convolutional neural network 1112 may be applied to the image of the face in order to perform feature extraction and prepare the image for input to an input layer of the neural network 1115 (where it meets the processed at least one input of the image of the visual equipment). Having prepared both of the at least one input 1105, the processed at least one input, with the visual measurements 1149, can be delivered to the input layer of the neural network 1115, where the neural network 1115 is applied thereto. As indicated by the group of labelers, expert labelers, in an embodiment, an output layer 1117 reflects a prediction of the neural network 1115 as to a label. This prediction is a fit metric 1120, generated by the neural network 1115 for each combination of the at least one input 1105.

Figure 11I:
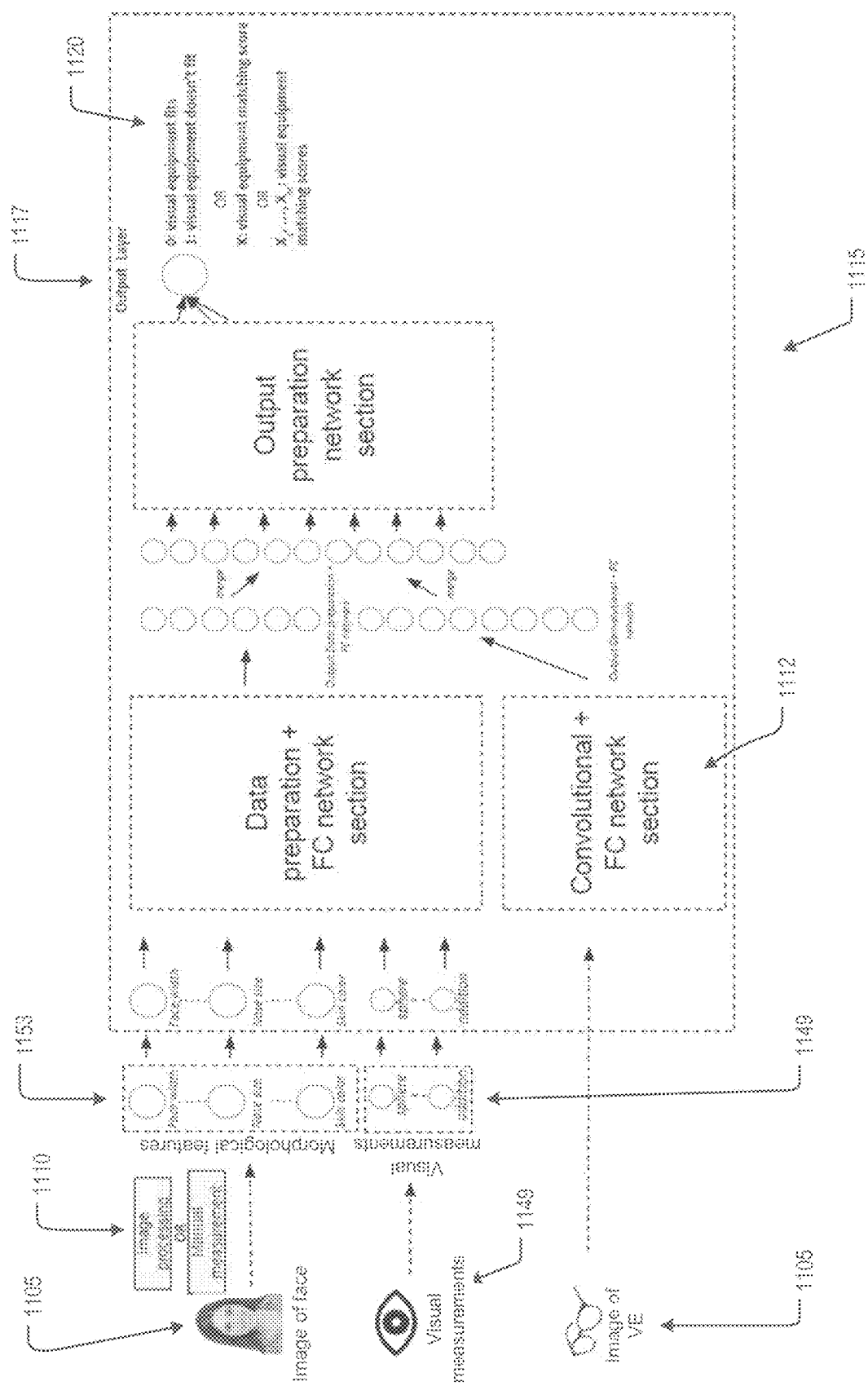
FIG. 11I is a schematic of a neural network of a machine learning-based visual equipment selection tool, wherein the inputs are morphological features, visual measurements and visual equipment images, according to an exemplary embodiment of the present disclosure.

In view of FIG. 11D, FIG. 11I, an exemplary embodiment of Case (7), provides a schematic of an ML-VEST wherein at least one input 1105 includes an image of a face and an image of visual equipment, the image of visual equipment being provided alongside the image of the face or selected from a plurality of visual equipments of a database. The image of the visual equipment may be passed directly to a neural network 1115. In addition, the at least one input 1105 includes visual measurements 1149 corresponding to the image of the face. As before, the image of the face can be passed to an input preparation process 1110 prior to being delivered to the neural network 1115. To that end, the image of the face can be prepared via image processing and manual measurement in order to generate morphological features 1153. Unlike previous embodiments, the input preparation process 1110 as applied to the image of the visual equipment may be external to or integral with the neural network 1115. For example, a convolutional neural network 1112 may be applied to the image of the visual equipment in order to perform feature extraction and prepare the image for input to an input layer of the neural network 1115 (where it meets the processed input image of the face). Having prepared both of the at least one input 1105, the processed at least one input, with the visual measurements, can be delivered to the input layer of the neural network 1115, where the neural network 1115 is applied thereto. As defined by the group of labelers, expert labelers, in an embodiment, an output layer 1117 reflects a prediction of the neural network 1115 as to a label. This prediction is a fit metric 1120, generated by the neural network 1115 for each combination of the at least one input 1105.

Figure 11J:
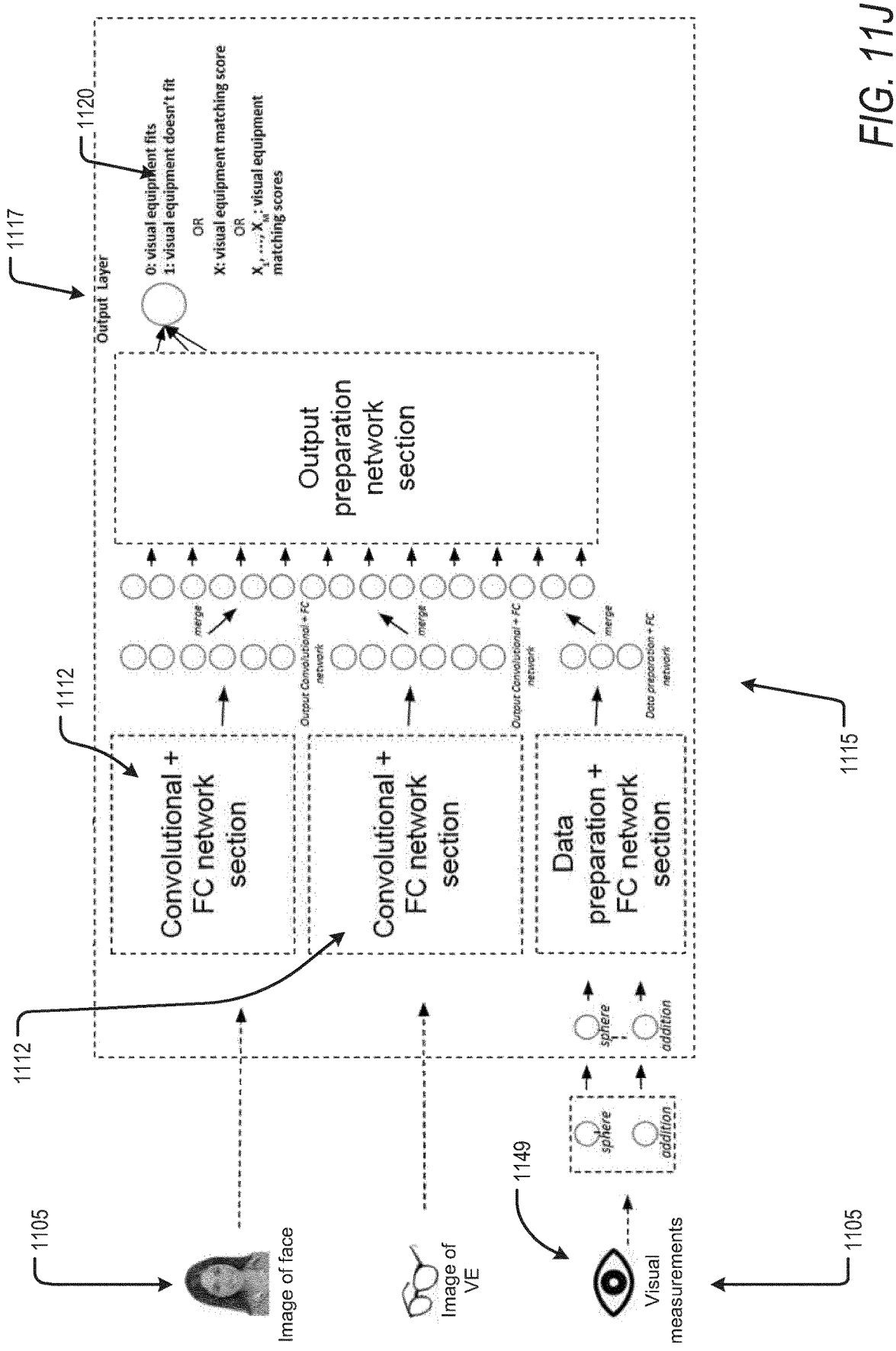
FIG. 11J is a schematic of a neural network of a machine learning-based visual equipment selection tool, wherein the inputs are facial images, visual measurements and visual equipment images, according to an exemplary embodiment of the present disclosure.

FIG. 11J, an exemplary embodiment of Case (8), in view of FIG. 11E, provides a schematic of an ML-VEST wherein at least one input 1105 comprises an image of a face and an image of visual equipment, the image of visual equipment being provided alongside the image of the face or selected from a plurality of visual equipments of a database. The at least one input 1105 may be passed directly to a neural network 1115, wherein a convolution is performed. In addition, the at least one input 1105 can include visual measurements 1149 corresponding to the image of the face. As above, the input preparation process 1110 as applied to the at least one input 1105 may be external to or integral with the neural network 1115. For example, a convolutional neural network 1112 may be applied to the at least one input 1105, including the image of the visual equipment and the image of the face, in order to perform feature extraction and prepare the images for input to an input layer of the neural network 1115. Having prepared both of the at least one input 1105 by convolution, the processed at least one input, with the visual measurements 1149, can be delivered to the input layer of the neural network 1115, where the neural network 1115 is applied thereto. As indicated by the group of labelers, expert labelers, in an embodiment, an output layer 1117 reflects a prediction of the neural network 1115 as to a label. This prediction is a fit metric 1120, generated by the neural network 1115 for each combination of the at least one input 1105.

Figure 11K:
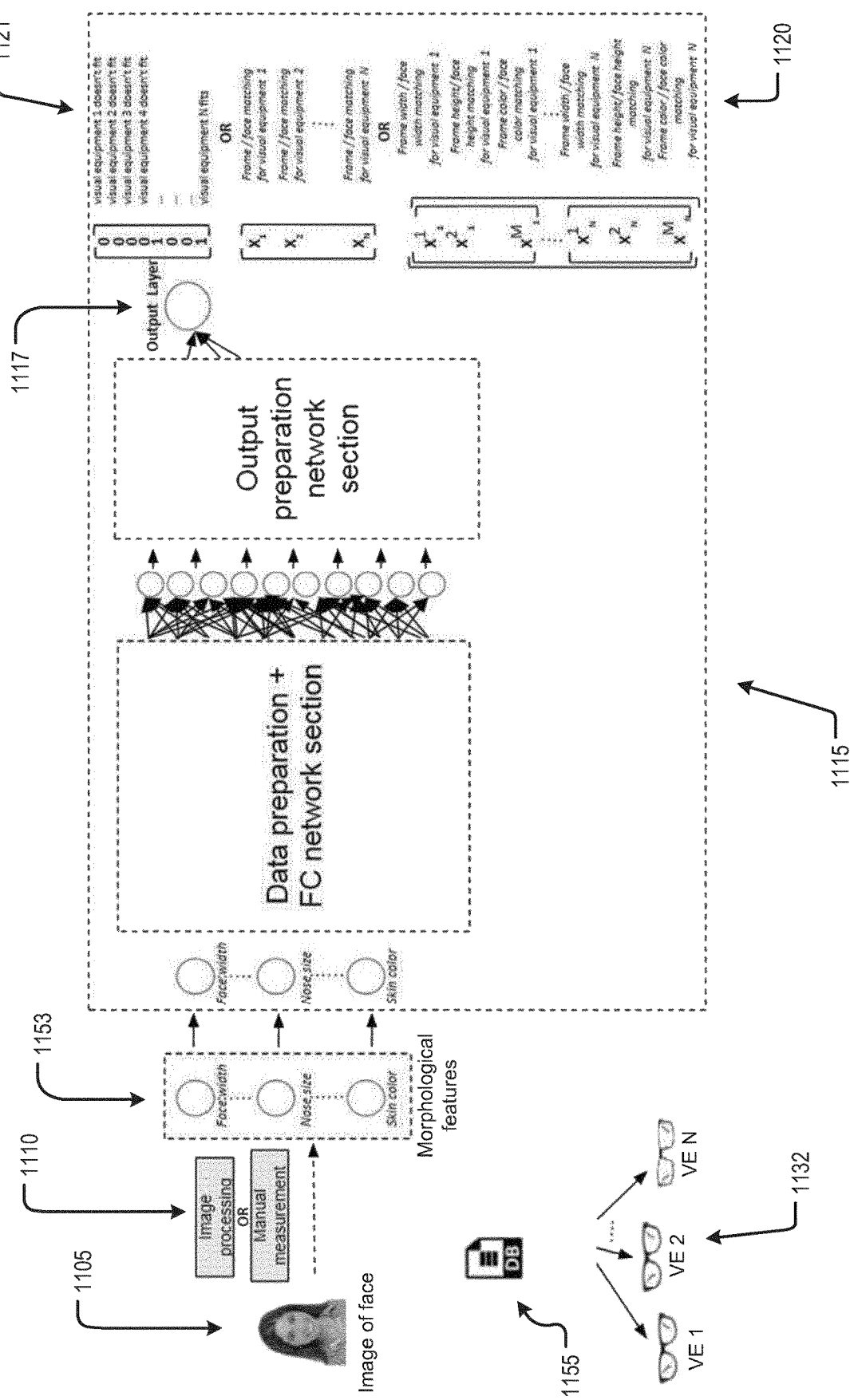
FIG. 11K is a schematic of a neural network of a machine learning-based visual equipment selection tool, wherein the inputs are morphological features, according to an exemplary embodiment of the present disclosure.

FIG. 11K, in view of FIG. 8E, reflects a schematic of an ML-VEST wherein at least one input 1105 comprises an image of a face. In such a process, reflective of Case (9), the at least one input 1105 can be passed through a neural network 1115 having an architecture that permits the at least one input 1105 to be evaluated against each visual equipment of a subset of images of visual equipments 1132. In an embodiment, the at least one input 1105 can be passed to an input preparation process 1110 prior to being delivered to the neural network 1115. To that end, the image of the face can be prepared via image processing and manual measurement in order to generate morphological features 1153.

Unlike previous embodiments, the subset of images of visual equipments 1132, acquired from a database 1155, are not provided to the neural network 1115 as an at least one input 1105. Instead, the neural network 1115 is applied to the at least one input 1105, the neural network 1115 being trained based upon, in part, the subset of images of visual equipments 1132. According to an embodiment, and in the context of training the neural network 1115, a pre-treatment of each image of visual equipment of the subset of images of visual equipments 1132 from the database 1155 is required.

For each visual equipment i of the subset of images of visual equipments 1132 from the database 1155, and in view of morphological features j derived for each image of a face, a statistical fit score can be calculated. The statistical fit score can include a percentage of labelers $p_{ji}$ who gave (1) the same binary score to the image of the visual equipment i respective to morphological features j (case binary score 0 or 1), (2) the same matching score respective to morphological features j in the subset of images of visual equipments 1132 from the database 1155 (case matching score between 0-N), or (3) the same matching score or had the same ranking by each item of a determined criteria list for the image of the visual equipment i respective to morphological features j in the subset of images of visual equipments 1132 from the database 1155 (case matching score between 0-N of each item). For each situation above, the following vectors associated with the percentage $p_{ji}$ for given morphological features j can be obtained. One vector can be a vector of N binary values {0,1}, each binary value corresponding to fit of the morphological features j of the image of the face with an image i of the subset of images of visual equipments 1132. A second vector can be a vector of integer values between 0 and X, wherein each integer value corresponds to a matching score of an image i of the subset of of images of visual equipments 1132 to the image of the face. A third vector can be a vector of N lists l of M integer values between 0 and X, each integer value of each list l corresponding to a matching score of the image i of the subset of images of visual equipments 1132 relative to an image of a face for each rule of a set of M matching rules. Training, in view of the pre-treatment described above, can then begin. The at least one input to the training can be morphological features and the neural network can be configured as a combination neural network having convolutional layers and fully-connected layers. In addition, an activation function can be any kind of standard activation function associated with $p_{ji}$ weights, including Rectified Linear Units (ReLU). An associated vector containing the matching information can be referred to as a target vector. Neural network training can be done on the entire target vector or successfully on a component of the target vector that specifically trains select neurons.

Returning now to FIG. 11K, an output layer 1117 of the neural network 1115 reflects a prediction of the neural network 1115 as to a fit metric 1120. The fit metric 1120 can be a matching score 1121 and can be one of the above-described vectors. Specifically, the matching score 1121 can be (1) a vector of N binary values {0,1}, each binary value corresponding to fit of the morphological features j of the image of the face with an image i of the subset of N images of visual equipments 1132, (2) a vector of integer values between 0 and X, wherein each integer value corresponds to a matching score 1121 of an image i of the subset of images of visual equipments 1132 to the image of the face, or (3) a vector of N lists l of M integer values between 0 and X, each integer value of each list l corresponding to a matching score 1121 of the image i of the subset of N images of visual equipments 1132 relative to an image of a face for each rule of a set of M matching rules. In an embodiment, the matching score 1121 prediction can be generated by the neural network 1115 for each combination of the at least one input 1105 and the subset of images of visual equipments 1132 from the database 1155, the database 1155 including "VE 1", "VE 2", and successive images of visual equipments up to "VE N". In an embodiment, the database 1155 can be a preselected subset of images of visual equipments available at a retailer or a preselected subset of images of visual equipments previously determined to be appropriate for certain characteristics associated with a user.

Figure 11L:
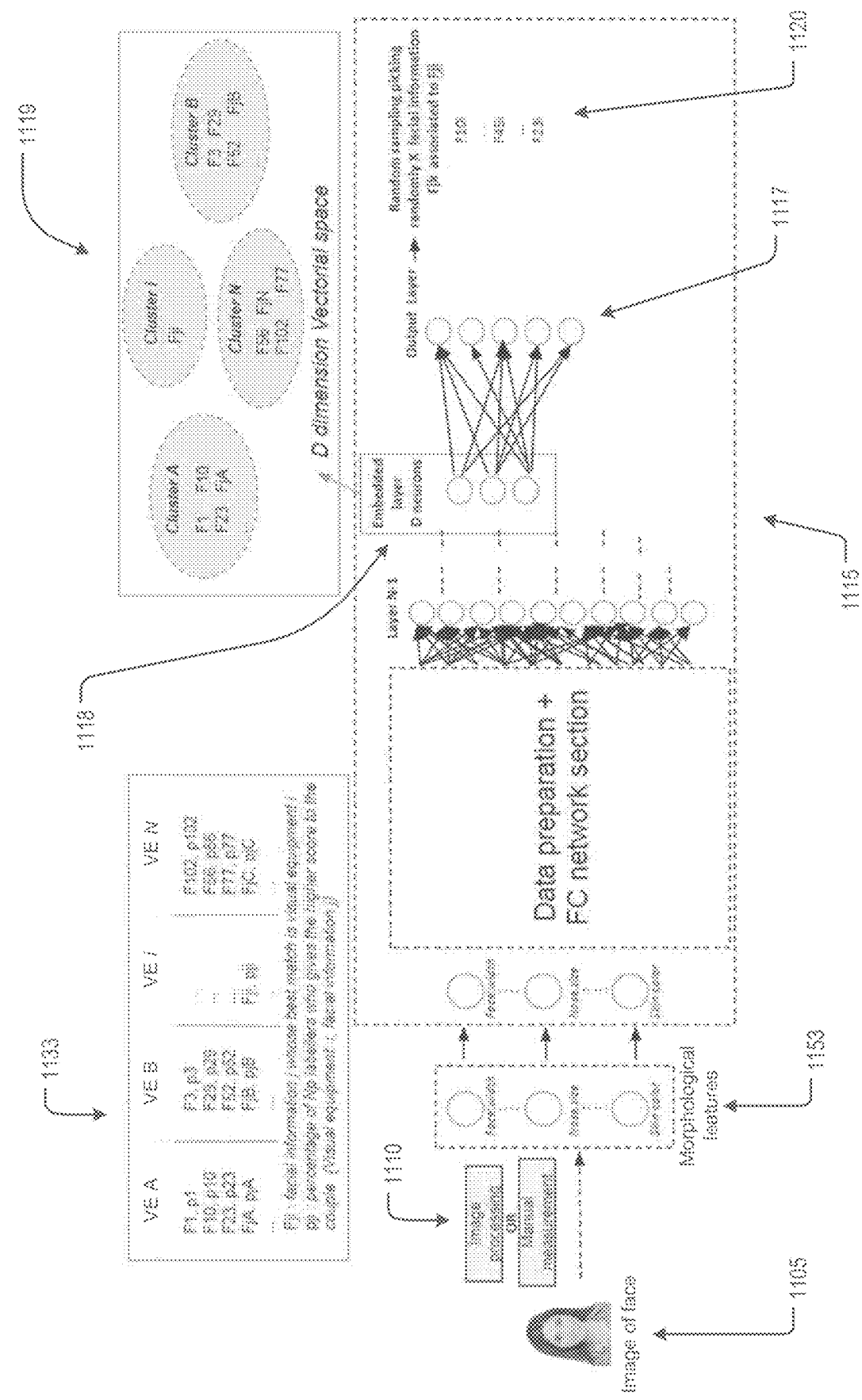
FIG. 11L is a schematic of a neural network of a machine learning-based visual equipment selection tool, wherein the inputs are morphological features, according to an exemplary embodiment of the present disclosure.

FIG. 11L, in view of FIG. 8E, reflects a schematic of an ML-VEST wherein at least one input 1105 comprises an image of a face. In such a process, reflective of Case (9), the at least one input 1105 can be passed through a neural network 1115 having an architecture that permits the at least one input 1105 to be evaluated in view of morphological features and corresponding visual equipment attributes associated with each visual equipment of a subset of images of visual equipments. In an embodiment, the at least one input 1105 can be passed to an input preparation process 1110 prior to being delivered to the neural network 1115. To that end, the image of the face can be prepared via image processing and manual measurement in order to generate morphological features 1153. Unlike previous embodiments, a visual equipment or visual equipment attributes associated with each visual equipment of the subset of images of visual equipments are not provided to the neural network 1115 as an at least one input 1105. Instead, the neural network 1115 is applied to the at least one input 1105, the neural network 1115 being trained based upon, in part, morphological features and corresponding visual equipment attributes associated with each visual equipment of the subset of images of visual equipments. According to an embodiment, and in the context of training the neural network 1115, a pre-treatment 1133 of each image of visual equipment of the subset of images of visual equipments from the database, in view morphological features of images of faces, is required. The pre-treatment 1133 includes coordinate information defining $F_{ji}$, the morphological features j whose best match is visual equipment i, or VE i, and $p_{ji}$, the percentage of Np labelers who give a highest score to a coordinate couple {visual equipment i, morphological features j}.

To this end, for each image of a visual equipment i of the subset of images of visual equipments, and in view of the morphological features of the image of the face, a statistical fit score can be calculated. The statistical fit score can include a percentage of labelers $p_{ji}$ (1) who associate the visual equipment i to morphological features j (binary scoring of 1), (2) who gave the same matching score or had the same ranking for the visual equipment i of the subset of images of visual equipments respective to the morphological features j of the image of the face (case matching score between 0-N), or (3) who gave the same matching score or had the same ranking by each item of a determined criteria list for the visual equipment i of the subset of images of visual equipments respective to the facial information j (case matching score between 0-N of each item). For simplicity, it can be assumed that the incomplete datasets are ignored and only cases where a labeler gave a matching score (between 0-N) of each visual equipment i from the subset of images of visual equipments respective to morphological features j. Moreover, for each entry of morphological features j, only the visual equipment attributes with the highest score for each labeler are preserved. In view of the above, a matrix that associates each visual equipment i of the subset of images of visual equipments with all morphological features $F_{ji}$ can be obtained. The morphological features $F_{ji}$ can include the best match by a percentage $p_{ji}$ of labelers.

Training, in view of the pre-treatment described above, can then begin. The at least one input to the training can be morphological features and visual measurements and the neural network can be configured as a combination neural network having convolutional layers and fully-connected layers. The fully-connected layers are configured for an embedding. An embedded layer 1118, a fully-connected layer of D neurons, contains vectorial representation of morphological features in the vectorial space regarding each visual equipment i, determined during pre-treatment. Contained within the embedded layer 1118, each cluster i of the vectorial space of D dimension 1119 represents a visual equipment and each morphological feature can be represented by a D-vector coordinate.

During training, random sampling can be implemented so as to randomly select a specific number of couples of morphological features, the coupled of morphological features being defined as $\{F_{ki}, F_{li}\}$. As an exemplary couple, $F_{ki}$ and $F_{li}$ are determined to be a good match respect to the visual equipment i having respective percentage $p_{ki}$ and $p_{li}$. Backpropagation can then be considered so as to minimize the difference between the two activation functions $f(F_{ki},p_{ki})$ and $f(F_{li},p_{li})$ where $f$ is the activation function. As an exemplary couple, $F_{ki}$ and $F_{li}$ are determined to be a bad match respect to the visual equipment i having respective percentage $p_{ki}$ and $p_{li}$. Backpropagation can then be considered so as to maximize the difference between the two activation functions $f(F_{ki},p_{ki})$ and $f(F_{li}, p_{li})$ where $f$ is the activation function.

Returning now to FIG. 11L, an output layer 1117 of the neural network 1115 reflects a prediction of the neural network 1115 as to a fit metric 1120. The fit metric 1120 can be a coordinate of morphological features $F_{ij}$ in the dimension vectorial space 1119. Post treatment of the coordinate of morphological features $F_{ij}$ can include (1) calculating the barycenter of each cluster i in the D-dimension vectorial space 1119 and (2) calculating the distance between the output coordinates and the barycenter of each cluster i, thereby generating a vector containing a ranking of a visual equipment (barycenter of each cluster i) from the closest to the output coordinate to the furthest. In an embodiment, the prediction of the coordinate of morphological features $F_{ij}$ can be generated by the neural network 1115 for each the at least one input 1105 considered in view of the morphological features and corresponding visual equipment attributes of the subset of images of visual equipments from the database upon which the neural network 1115 was trained. In an embodiment, the database can be a preselected subset of images of visual equipments available at a retailer or a preselected subset of images of visual equipments previously determined to be appropriate for certain characteristics associated with a user.

Figure 11M:
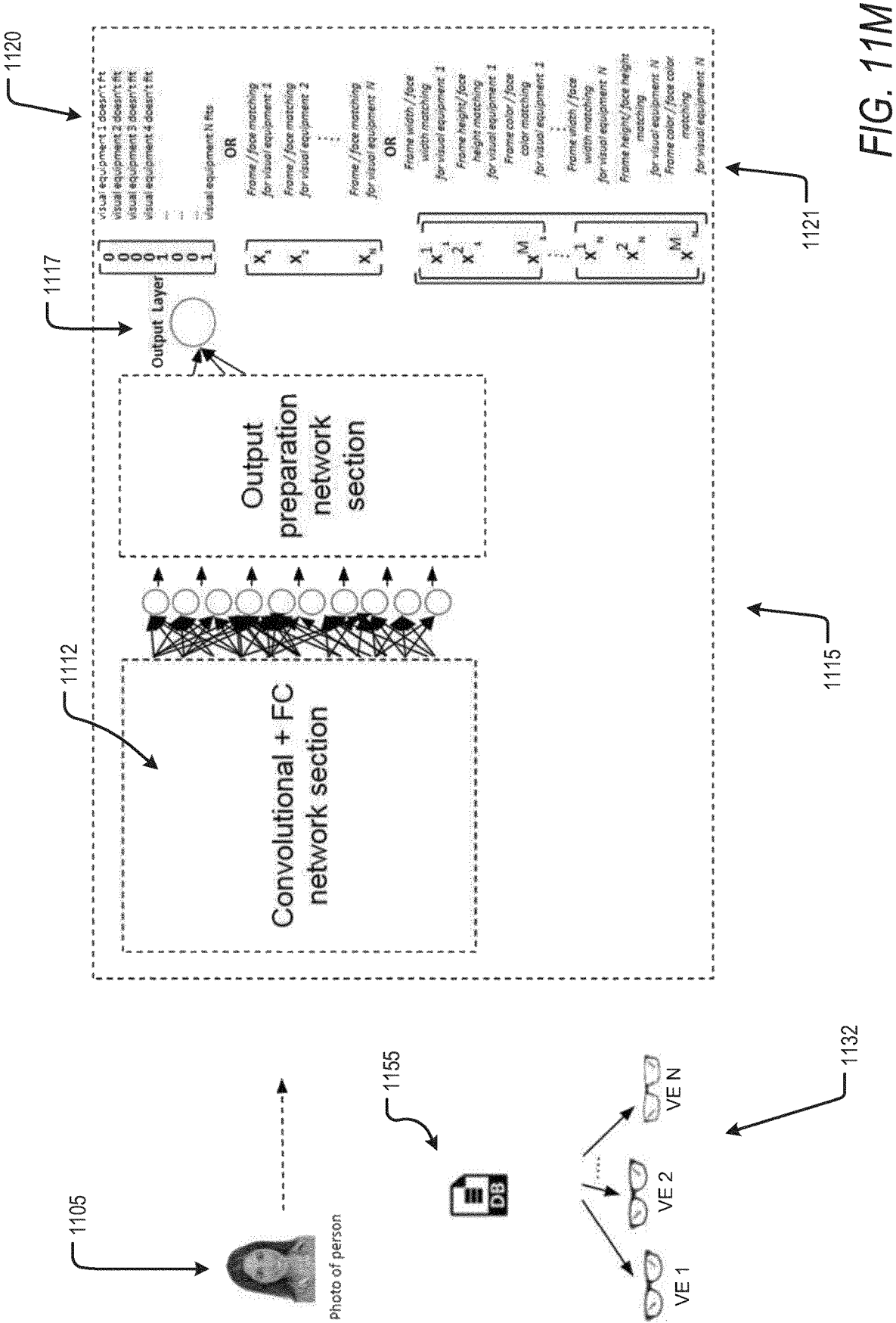
FIG. 11M is a schematic of a neural network of a machine learning-based visual equipment selection tool, wherein the inputs are morphological features, according to an exemplary embodiment of the present disclosure.

FIG. 11M reflects a schematic of an ML-VEST wherein at least one input 1105 comprises an image of a face. In such a process, reflective of Case (10), the at least one input 1105 can be passed through a neural network 1115 having an architecture that permits the at least one input 1105 to be evaluated against each visual equipment of a subset of images of visual equipments 1132. In an embodiment, the at least one input 1105 can be passed directly to a neural network 1115, wherein a convolution is performed. The convolution can be performed by, for example, a convolutional neural network 1112 applied to the at least one input 1105, including image of the face, in order to perform feature extraction and prepare the image of the face for input to an input layer of the neural network 1115.

Unlike previous embodiments, a subset of images of visual equipments 1132, acquired from a database 1155, are not provided to the neural network 1115 as an at least one input 1105. Instead, the neural network 1115 is applied to the at least one input 1105, the neural network 1115 being trained based upon, in part, the subset of images of visual equipments 1132. According to an embodiment, and in the context of training the neural network 1115, a pre-treatment of each image of visual equipment of the subset of images of visual equipments 1132 from the database 1155 is required.

For each visual equipment i of the subset of images of visual equipments 1132 from the database 1155, and in view of morphological features j derived for each image of a face, a statistical fit score can be calculated. The statistical fit score can include a percentage of labelers $p_{ji}$ who gave (1) the same binary score to the image of the visual equipment i respective to morphological features j (case binary score 0 or 1), (2) the same matching score respective to morphological features j in the subset of images of visual equipments 1132 from the database 1155 (case matching score between 0-N), or (3) the same matching score or had the same ranking by each item of a determined criteria list for the image of the visual equipment i respective to morphological features j in the subset of images of visual equipments 1132 from the database 1155 (case matching score between 0-N of each item). For each situation above, the following vectors associated with the percentage $p_{ji}$ for given morphological features j can be obtained. One vector can be a vector of N binary values {0,1}, each binary value corresponding to fit of the morphological features j of the image of the face with an image i of the subset of images of visual equipments 1132. A second vector can be a vector of integer values between 0 and X, wherein each integer value corresponds to a matching score of an image i of the subset of N images of visual equipments 1132 to the image of the face. A third vector can be a vector of N lists l of M integer values between 0 and X, each integer value of each list l corresponding to a matching score of the image i of the subset of N images of visual equipments 1132 relative to an image of a face for each rule of a set of M matching rules. Training, in view of the pre-treatment described above, can then begin. The at least one input to the training can be morphological features and the neural network can be configured as a combination neural network having convolutional layers and fully-connected layers. In addition, an activation function can be any kind of standard activation function associated with $p_{ji}$ weights, including Rectified Linear Units (ReLU). An associated vector containing the matching information can be referred to as a target vector. Neural network training can be done on the entire target vector or successfully on a component of the target vector that specifically trains select neurons.

Returning now to FIG. 11M, an output layer 1117 of the neural network 1115 reflects a prediction of the neural network 1115 as to a fit metric 1120. The fit metric 1120 can be a matching score 1121 and can be one of the above-described vectors. Specifically, the matching score 1121 can be (1) a vector of N binary values {0,1}, each binary value corresponding to fit of the morphological features j of the image of the face with an image i of the subset of images of visual equipments 1132, (2) a vector of integer values between 0 and X, wherein each integer value corresponds to a matching score 1121 of an image i of the subset of images of visual equipment 1132 to the image of the face, or (3) a vector of N lists l of M integer values between 0 and X, each integer value of each list l corresponding to a matching score 1121 of the image i of the subset of images of visual equipments 1132 relative to an image of a face for each rule of a set of M matching rules. In an embodiment, the matching score 1121 prediction can be generated by the neural network 1115 for each combination of the at least one input 1105 and the subset of images of visual equipments 1132 from the database 1155, the database 1155 including "VE 1", "VE 2", and successive images of visual equipments up to "VE N". In an embodiment, the database 1155 can be a preselected subset of images of visual equipments available at a retailer or a preselected subset of images of visual equipments previously determined to be appropriate for certain characteristics associated with a user.

Figure 11N:
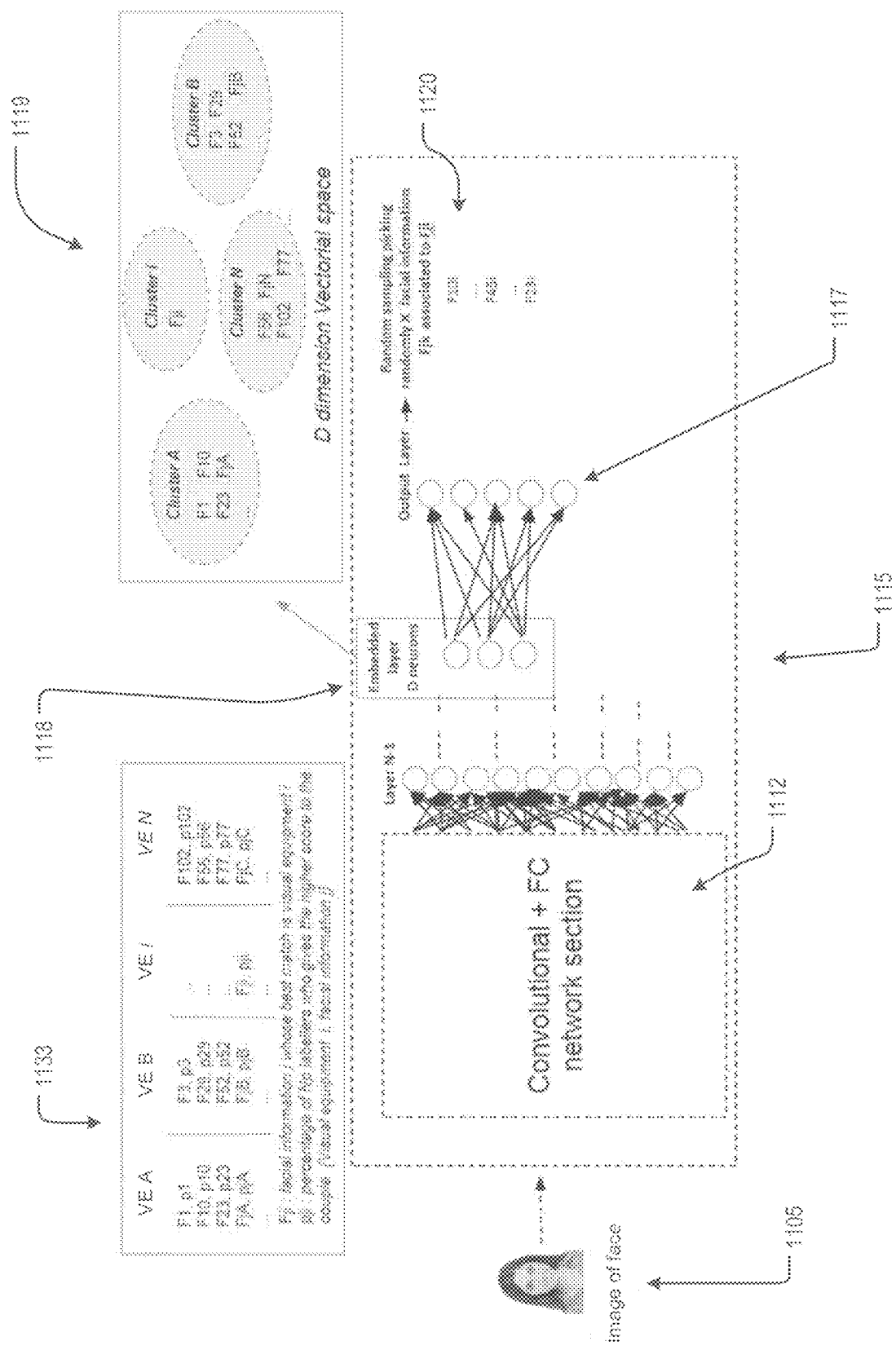
FIG. 11N is a schematic of a neural network of a machine learning-based visual equipment selection tool, wherein the inputs are morphological features, according to an exemplary embodiment of the present disclosure.

FIG. 11N reflects a schematic of an ML-VEST wherein at least one input 1105 comprises an image of a face. In such a process, reflective of Case (10), the at least one input 1105 can be passed through a neural network 1115 having an architecture that permits the at least one input 1105 to be evaluated against morphological features and corresponding visual equipment attributes associated with each visual equipment of a subset of images of visual equipments. In an embodiment, the at least one input 1105 can be passed directly to a neural network 1115, wherein a convolution is performed. The convolution can be performed by, for example, a convolutional neural network 1112 applied to the at least one input 1105, including an image of the face, in order to perform feature extraction and prepare the image of the face for input to an input layer of the neural network 1115.

Unlike previous embodiments, the visual equipment attributes, and corresponding morphological features, associated with each visual equipment of the subset of images of visual equipments are not provided to the neural network 1115 as an at least one input 1105. Instead, the neural network 1115 is applied to the at least one input 1105, the neural network 1115 being trained based upon, in part, the morphological features and corresponding visual equipment attributes associated with each visual equipment of the subset of images of visual equipments. According to an embodiment, and in the context of training the neural network 1115, a pre-treatment 1133 of each image of visual equipment of the subset of images of visual equipments from the database, in view of morphological features of images of faces, is required. The pre-treatment 1133 includes coordinate information defining $F_{ji}$, the facial images j whose best match is visual equipment i, and $p_{ji}$, the percentage of Np labelers who give a highest score to a coordinate couple {visual equipment i, facial images j}.

To this end, for each image of a visual equipment i of the subset of images of visual equipments, and in view of the facial images 1105 of the image of the face, a statistical fit score can be calculated. The statistical fit score can include a percentage of labelers $p_{ji}$ (1) who associate the visual equipment i to facial images j (binary scoring of 1), (2) who gave the same matching score or had the same ranking for the visual equipment i of the subset of images of visual equipments respective to the facial images j of the image of the face (case matching score between 0-N), or (3) who gave the same matching score or had the same ranking by each item of a determined criteria list for the visual equipment i of the subset of images of visual equipments respective to the facial images j (case matching score between 0-N of each item). For simplicity, it can be assumed that the incomplete datasets are ignored and only cases where a labeler gave a matching score (between 0-N) of each visual equipment i from the subset of images of visual equipments respective to facial images j. Moreover, for each entry of facial images j, only the visual equipment attributes with the highest score for each labeler are preserved. In view of the above, a matrix that associates each visual equipment i of the subset of images of visual equipments with all facial images $F_{ji}$ can be obtained. The matrix $F_{ji}$ can include the best match by a percentage $p_{ji}$ of labelers.

Training, in view of the pre-treatment described above, can then begin. The at least one input to the training can be facial images and visual measurements and the neural network can be configured as a combination neural network having convolutional layers and fully-connected layers. The fully-connected layers are configured for an embedding. An embedded layer 1118, a fully-connected layer of D neurons, contains vectorial representation of facial images in the vectorial space regarding each visual equipment i, determined during pre-treatment. Contained within the embedded layer 1118, each cluster i of the vectorial space of D dimension 1119 represents a visual equipment and each facial images can be represented by a D-vector coordinate.

During training, random sampling can be implemented so as to randomly select a specific number of couples of facial images, the coupled of morphological features being defined as $\{F_{ki}, F_{li}\}$. As an exemplary couple, $F_{ki}$ and $F_{li}$ are determined to be a good match respect to the visual equipment i having respective percentage $p_{ki}$ and $p_{li}$. Backpropagation can then be considered so as to minimize the difference between the two activation functions $f(F_{ki}, p_{ki})$ and $f(F_{li}, p_{li})$ where $f$ is the activation function. As an exemplary couple, $F_{ki}$ and $F_{li}$ are determined to be a bad match respect to the visual equipment i having respective percentage $p_{ki}$ and $p_{li}$. Backpropagation can then be considered so as to maximize the difference between the two activation functions $f(F_{ki}, p_{ki})$ and $f(F_{li}, p_{li})$ where $f$ is the activation function.

Returning now to FIG. 11N, an output layer 1117 of the neural network 1115 reflects a prediction of the neural network 1115 as to a fit metric 1120. The fit metric 1120 can be a coordinate of facial images $F_{ij}$ in the dimension vectorial space 1119. Post treatment of the coordinate of facial images $F_{ij}$ can include (1) calculating the barycenter of each cluster i in the D-dimension vectorial space 1119 and (2) calculating the distance between the output coordinates and the barycenter of each cluster i, thereby generating a vector containing a ranking of a visual equipment (barycenter of each cluster i) from the closest to the output coordinate to the furthest. In an embodiment, the prediction of the coordinate of facial images $F_{ij}$ can be generated by the neural network 1115 for each of the at least one input 1105 in view of the morphological features and visual equipment attributes associated with each image of the subset of images of visual equipments from the database. In an embodiment, the database can be a preselected subset of images of visual equipments available at a retailer or a preselected subset of images of visual equipments previously determined to be appropriate for certain characteristics associated with a user.

Figure 11O:
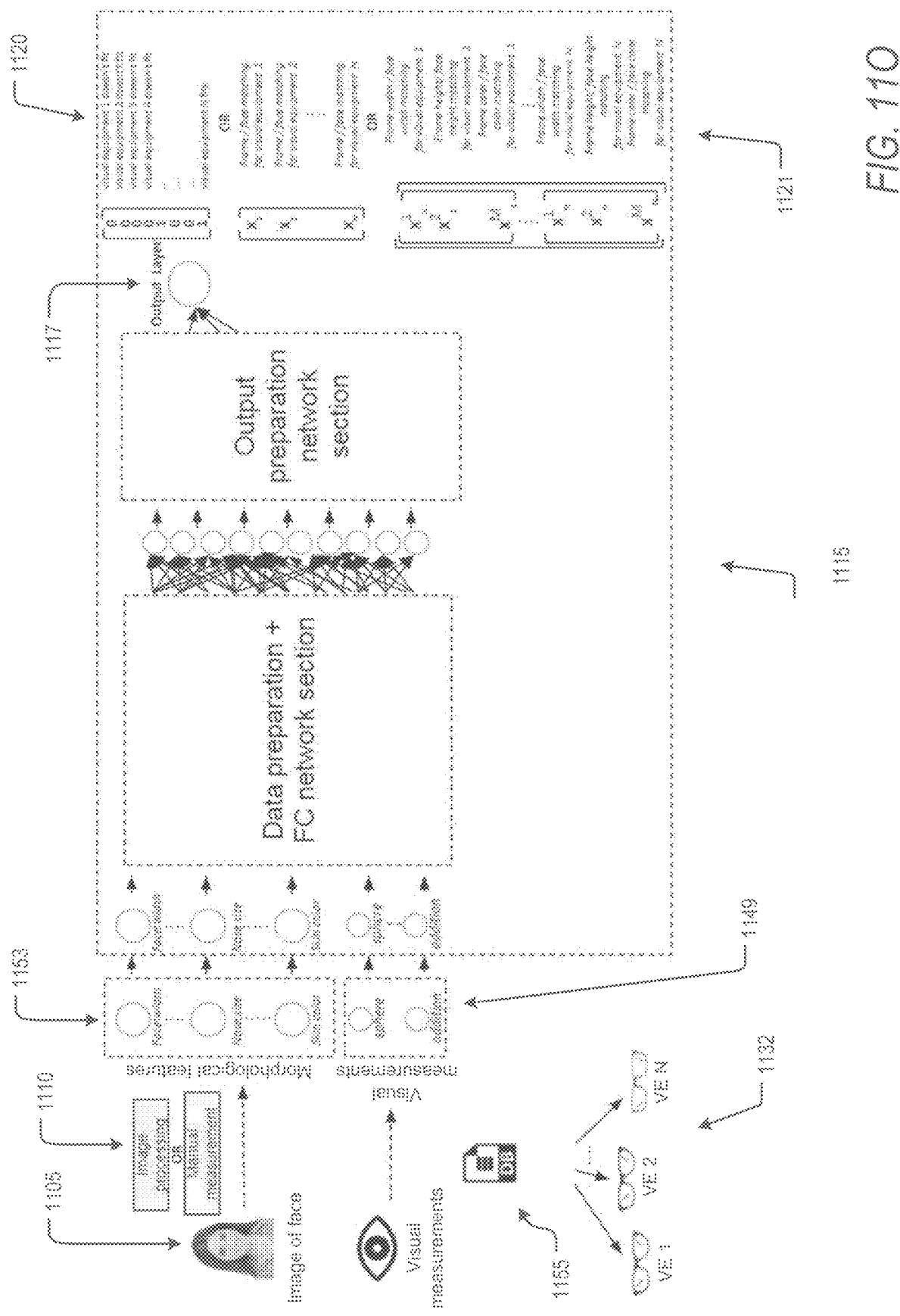
FIG. 11O is a schematic of a neural network of a machine learning-based visual equipment selection tool, wherein the inputs are morphological features and visual measurements, according to an exemplary embodiment of the present disclosure.

FIG. 11O reflects a schematic of an ML-VEST wherein at least one input 1105 comprises an image of a face. In such a process, reflective of Case (11), the at least one input 1105 can be passed through a neural network 1115 having an architecture that permits the at least one input 1105 to be evaluated against each visual equipment of a subset of images of visual equipments 1132. In an embodiment, the at least one input 1105 can be passed to an input preparation process 1110 prior to being delivered to the neural network 1115. To that end, the image of the face can be prepared via image processing and manual measurement in order to generate morphological features 1153. In addition to the above, the at least one input 1105 can include visual measurements 1149 corresponding to the image of the face.

Unlike previous embodiments, the subset of images of visual equipments 1132, acquired from a database 1155, are not provided to the neural network 1115 as an at least one input 1105. Instead, the neural network 1115 is applied to the at least one input 1105, the neural network 1115 being trained based upon, in part, the subset of images of visual equipments 1132. According to an embodiment, and in the context of training the neural network 1115, a pre-treatment of each image of visual equipment of the subset of images of visual equipments 1132 from the database 1155 is required.

For each visual equipment i of the subset of images of visual equipments 1132 from the database 1155, and in view of morphological features j derived for each image of a face, a statistical fit score can be calculated. The statistical fit score can include a percentage of labelers $p_{ji}$ who gave (1) the same binary score to the image of the visual equipment i respective to morphological features j (case binary score 0 or 1), (2) the same matching score respective to morphological features j in the subset of images of visual equipments 1132 from the database 1155 (case matching score between 0-N), or (3) the same matching score or had the same ranking by each item of a determined criteria list for the image of the visual equipment i respective to morphological features j in the subset of images of visual equipments 1132 from the database 1155 (case matching score between 0-N of each item). For each situation above, the following vectors associated with the percentage $p_{ji}$ for given morphological features j can be obtained. One vector can be a vector of N binary values {0,1}, each binary value corresponding to fit of the morphological features j of the image of the face with an image i of the subset of N images of visual equipments 1132. A second vector can be a vector of integer values between 0 and X, wherein each integer value corresponds to a matching score of an image i of the subset of N images of visual equipments 1132 to the image of the face. A third vector can be a vector of N lists l of M integer values between 0 and X, each integer value of each list l corresponding to a matching score of the image i of the subset of images of visual equipments 1132 relative to an image of a face for each rule of a set of M matching rules. Training, in view of the pre-treatment described above, can then begin. The at least one input to the training can be morphological features and the neural network can be configured as a combination neural network having convolutional layers and fully-connected layers. In addition, an activation function can be any kind of standard activation function associated with $p_{ji}$ weights, including Rectified Linear Units (ReLU). An associated vector containing the matching information can be referred to as a target vector. Neural network training can be done on the entire target vector or successively on a component of the target vector that specifically trains select neurons.

Returning now to FIG. 11O, the processed at least one input, with the visual measurements 1149, can be delivered to an input layer of the neural network 1115. An output layer 1117 of the neural network 1115 reflects a prediction of the neural network 1115 as to a fit metric 1120. The fit metric 1120 can be a matching score 1121 and can be one of the above-described vectors. Specifically, the matching score 1121 can be (1) a vector of N binary values {0,1}, each binary value corresponding to fit of the morphological features j of the image of the face with an image i of the subset of N images of visual equipments 1132, (2) a vector of integer values between 0 and X, wherein each integer value corresponds to a matching score 1121 of an image i of the subset of N images of visual equipments 1132 to the image of the face, or (3) a vector of N lists l of M integer values between 0 and X, each integer value of each list l corresponding to a matching score 1121 of the image i of the subset of N images of visual equipments 1132 relative to an image of a face for each rule of a set of M matching rules. In an embodiment, the matching score 1121 prediction can be generated by the neural network 1115 for each combination of the at least one input 1105 and the subset of images of visual equipments 1132 from the database 1155, the database 1155 including "VE 1", "VE 2", and successive images of visual equipments up to "VE N". In an embodiment, the database 1155 can be a preselected subset of images of visual equipments available at a retailer or a preselected subset of images of visual equipments previously determined to be appropriate for certain characteristics associated with a user.

Figure 11P:
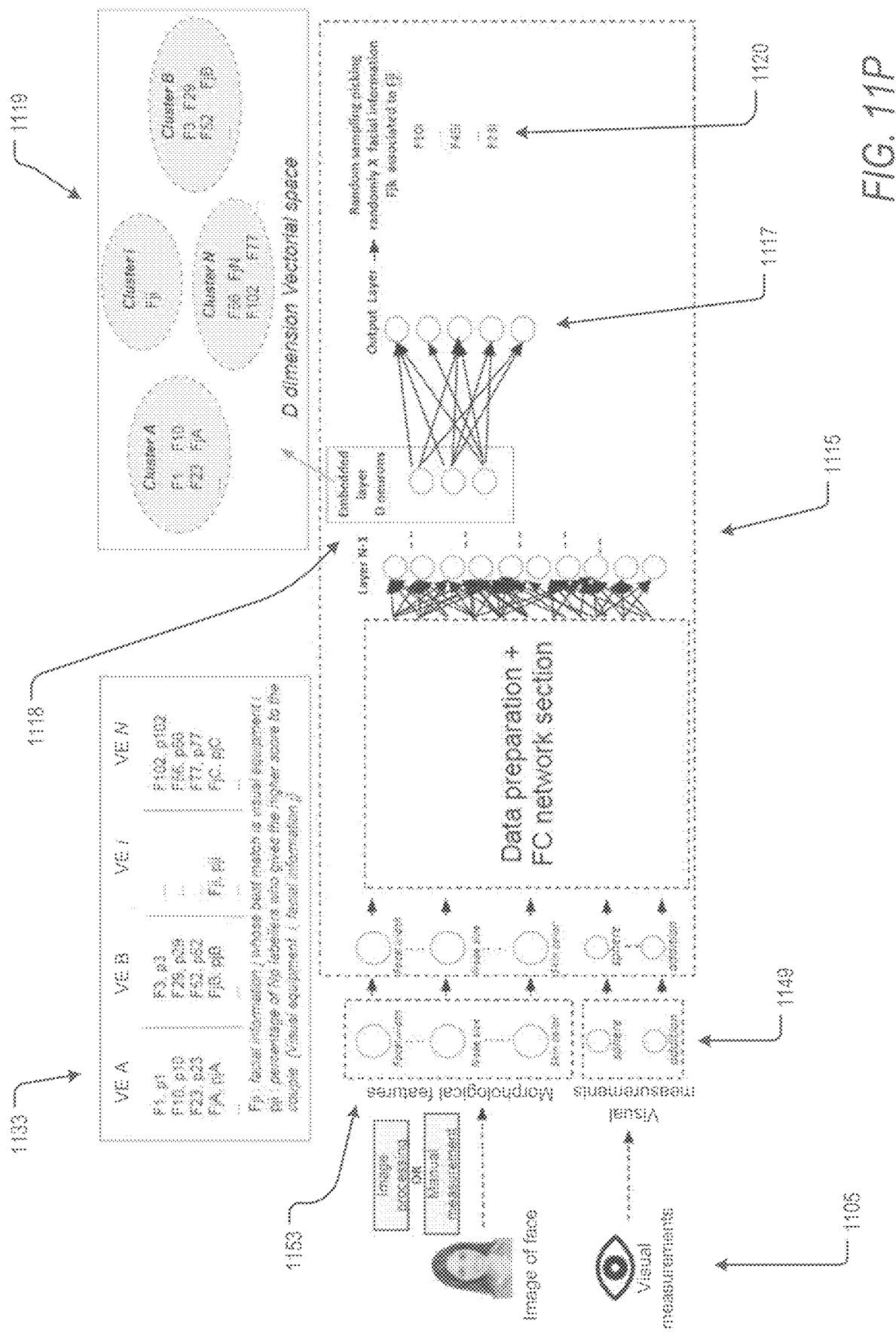
FIG. 11P is a schematic of a neural network of a machine learning-based visual equipment selection tool, wherein the inputs are morphological features and visual measurements, according to an exemplary embodiment of the present disclosure.

FIG. 11P reflects a schematic of an ML-VEST wherein at least one input 1105 comprises an image of a face. In such a process, reflective of Case (11), the at least one input 1105 can be passed through a neural network 1115 having an architecture that permits the at least one input 1105 to be evaluated against morphological features and corresponding visual equipment attributes associated with each visual equipment of a subset of images of visual equipments. In an embodiment, the at least one input 1105 can be passed to an input preparation process 1110 prior to being delivered to the neural network 1115. To that end, the image of the face can be prepared via image processing and manual measurement in order to generate morphological features 1153. In addition, the at least one input 1105 can include visual measurements 1149 corresponding to an image of a face.

Unlike previous embodiments, the visual equipment attributes, and corresponding morphological features, associated with each visual equipment of the subset of images of visual equipments are not provided to the neural network 1115 as an at least one input 1105. Instead, the neural network 1115 is applied to the at least one input 1105, the neural network 1115 being trained based upon, in part, the morphological features and corresponding visual equipment attributes associated with each visual equipment of the subset of images of visual equipments. According to an embodiment, and in the context of training the neural network 1115, a pre-treatment 1133 of each image of visual equipment of the subset of images of visual equipments from the database, in view of morphological features of images of faces, is required. The pre-treatment 1133 includes coordinate information defining $F_{ji}$, the morphological features j whose best match is visual equipment i, and $p_{ji}$, the percentage of Np labelers who give a highest score to a coordinate couple {visual equipment i, morphological features j}.

To this end, for each image of a visual equipment i of the subset of images of visual equipments, and in view of the morphological features of the image of the face, a statistical fit score can be calculated. The statistical fit score can include a percentage of labelers $p_{ji}$ (1) who associate the visual equipment i to morphological features j (binary scoring of 1), (2) who gave the same matching score or had the same ranking for the visual equipment i of the subset of images of visual equipments respective to the morphological features j of the image of the face (case matching score between 0-N), or (3) who gave the same matching score or had the same ranking by each item of a determined criteria list for the visual equipment i of the subset of images of visual equipments respective to the facial information j (case matching score between 0-N of each item). For simplicity, it can be assumed that the incomplete datasets are ignored and only cases where a labeler gave a matching score (between 0-N) of each visual equipment i from the subset of images of visual equipments respective to morphological features j. Moreover, for each entry of morphological features j, only the visual equipment attributes with the highest score for each labeler are preserved. In view of the above, a matrix that associates each visual equipment i of the subset of images of visual equipments with all morphological features $F_{ji}$ can be obtained. The morphological features $F_{ji}$ can include the best match by a percentage $p_{ji}$ of labelers.

Training, in view of the pre-treatment described above, can then begin. The at least one input to the training can be morphological features and visual measurements and the neural network can be configured as a combination neural network having convolutional layers and fully-connected layers. The fully-connected layers are configured for an embedding. An embedded layer 1118, a fully-connected layer of D neurons, contains vectorial representation of morphological features in the vectorial space regarding each visual equipment i, determined during pre-treatment. Contained within the embedded layer 1118, each cluster i of the vectorial space of D dimension 1119 represents a visual equipment and each morphological feature can be represented by a D-vector coordinate.

During training, random sampling can be implemented so as to randomly select a specific number of couples of morphological features, the coupled of morphological features being defined as $\{F_{ki}, F_{li}\}$. As an exemplary couple, $F_{ki}$ and $F_{li}$ are determined to be a good match respect to the visual equipment i having respective percentage $p_{ki}$ and $p_{li}$. Backpropagation can then be considered so as to minimize the difference between the two activation functions $f(F_{ki}, p_{ki})$ and $f(F_{li}, p_{li})$ where $f$ is the activation function. As an exemplary couple, $F_{ki}$ and $F_{li}$ are determined to be a bad match respect to the visual equipment i having respective percentage $p_{ki}$ and $p_{li}$. Backpropagation can then be considered so as to maximize the difference between the two activation functions $f(F_{ki}, p_{ki})$ and $f(F_{li}, p_{li})$ where $f$ is the activation function.

Returning now to FIG. 11P, an output layer 1117 of the neural network 1115 reflects a prediction of the neural network 1115 as to a fit metric 1120. The fit metric 1120 can be a coordinate of morphological features $F_{ij}$ in the dimension vectorial space 1119. Post treatment of the coordinate of morphological features $F_{ij}$ can include (1) calculating the barycenter of each cluster i in the D-dimension vectorial space 1119 and (2) calculating the distance between the output coordinates and the barycenter of each cluster i, thereby generating a vector containing a ranking of a visual equipment (barycenter of each cluster i) from the closest to the output coordinate to the furthest. In an embodiment, the prediction of the coordinate of morphological features $F_{ij}$ can be generated by the neural network 1115 for the at least one input 1105 in view of the morphological features and corresponding visual equipment attributes of the subset of images of visual equipments from the database. In an embodiment, the database can be a preselected subset of images of visual equipments available at a retailer or a preselected subset of images of visual equipments previously determined to be appropriate for certain characteristics associated with a user.

Figure 11Q:
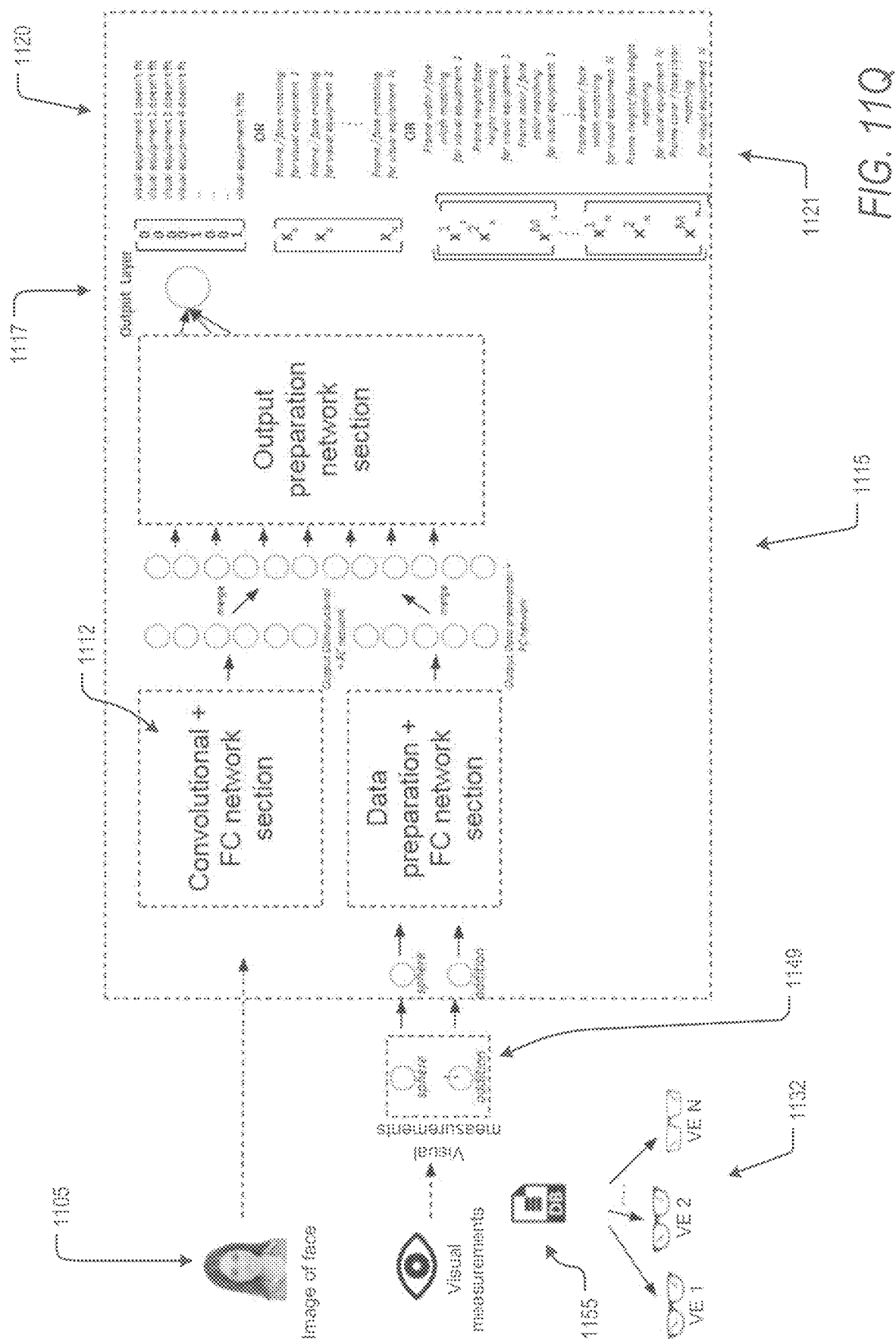
FIG. 11Q is a schematic of a neural network of a machine learning-based visual equipment selection tool, wherein the inputs are facial images and visual measurements, according to an exemplary embodiment of the present disclosure.
Figure 11R:
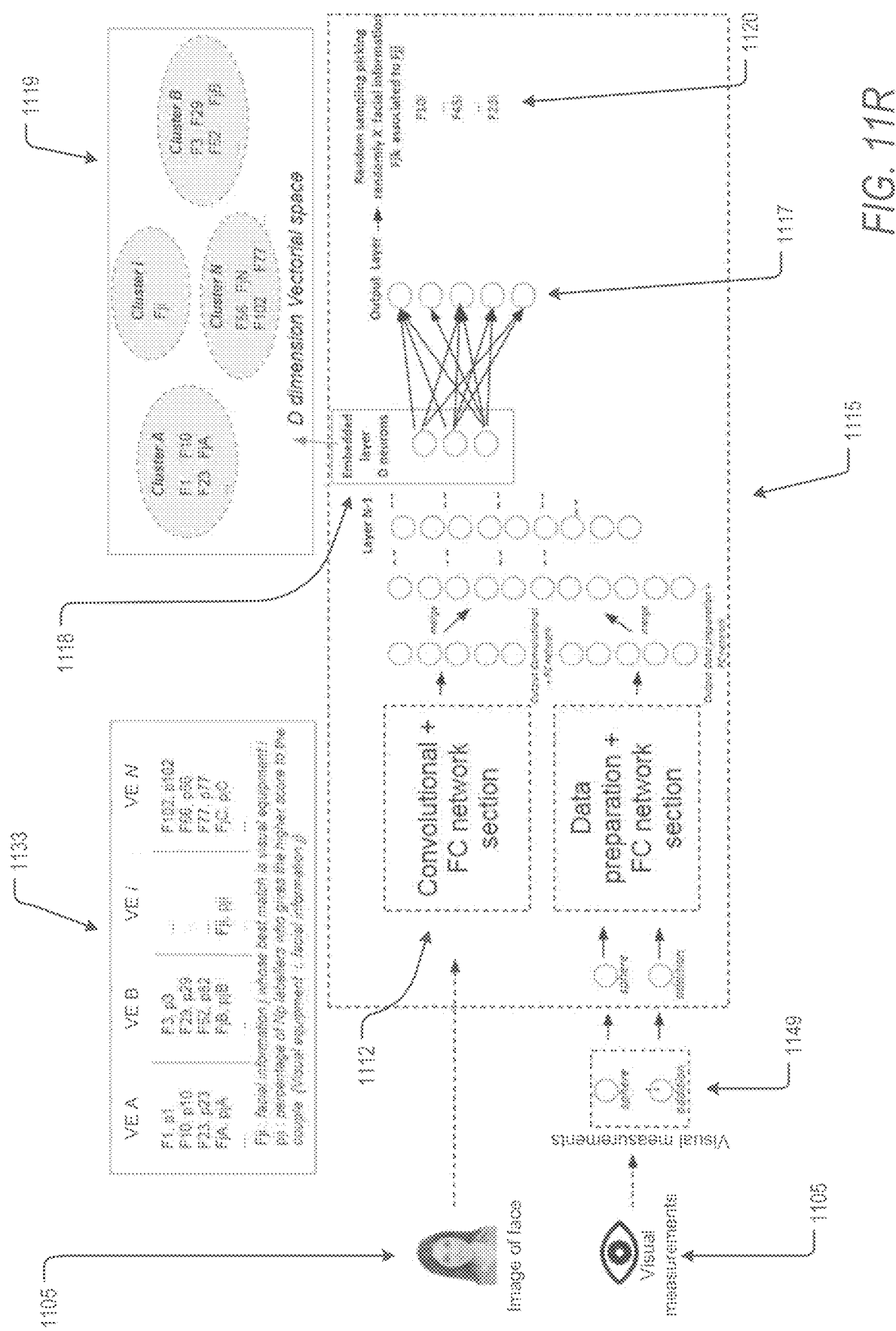
FIG. 11R is a schematic of a neural network of a machine learning-based visual equipment selection tool, wherein the inputs are facial images and visual measurements, according to an exemplary embodiment of the present disclosure.

FIG. 11Q reflects a schematic of an ML-VEST wherein at least one input 1105 comprises an image of a face. In such a process, reflective of Case (12), the at least one input 1105 can be passed through a neural network 1115 having an architecture that permits the at least one input 1105 to be evaluated against each visual equipment of a subset of images of visual equipments 1132. In an embodiment, the at least one input 1105 can be passed directly to a neural network 1115, wherein a convolution is performed. The convolution can be performed by, for example, a convolutional neural network 1112 applied to the at least one input 1105, including image of the face, in order to perform feature extraction and prepare the image of the face for input to an input layer of the neural network 1115. In addition, the at least one input 1105 can include visual measurements 1149 corresponding to an image of a face.

Unlike previous embodiments, a subset of images of visual equipments 1132, acquired from a database 1155, are not provided to the neural network 1115 as an at least one input 1105. Instead, the neural network 1115 is applied to the at least one input 1105, the neural network 1115 being trained based upon, in part, the subset of images of visual equipments 1132. According to an embodiment, and in the context of training the neural network 1115, a pre-treatment of each image of visual equipment of the subset of images of visual equipments 1132 from the database 1155 is required.

For each visual equipment i of the subset of images of visual equipments 1132 from the database 1155, and in view of morphological features j derived for each image of a face, a statistical fit score can be calculated. The statistical fit score can include a percentage of labelers $p_{ji}$ who gave (1) the same binary score to the image of the visual equipment i respective to morphological features j (case binary score 0 or 1), (2) the same matching score respective to morphological features j in the subset of images of visual equipments 1132 from the database 1155 (case matching score between 0-N), or (3) the same matching score or had the same ranking by each item of a determined criteria list for the image of the visual equipment i respective to morphological features j in the subset of images of visual equipments 1132 from the database 1155 (case matching score between 0-N of each item). For each situation above, the following vectors associated with the percentage $p_{ji}$ for given morphological features j can be obtained. One vector can be a vector of N binary values {0,1}, each binary value corresponding to fit of the morphological features j of the image of the face with an image i of the subset of N images of visual equipments 1132. A second vector can be a vector of integer values between 0 and X, wherein each integer value corresponds to a matching score of an image i of the subset of N images of visual equipments 1132 to the image of the face. A third vector can be a vector of N lists l of M integer values between 0 and X, each integer value of each list l corresponding to a matching score of the image i of the subset of images of visual equipments 1132 relative to an image of a face for each rule of a set of M matching rules. Training, in view of the pre-treatment described above, can then begin. The at least one input to the training can be morphological features and the neural network can be configured as a combination neural network having convolutional layers and fully-connected layers. In addition, an activation function can be any kind of standard activation function associated with $p_{ji}$ weights, including Rectified Linear Units (ReLU). An associated vector containing the matching information can be referred to as a target vector. Neural network training can be done on the entire target vector or successively on a component of the target vector that specifically trains select neurons.

Returning now to FIG. 11Q, an output layer 1117 of the neural network 1115 reflects a prediction of the neural network 1115 as to a fit metric 1120. The fit metric 1120 can be a matching score 1121 and can be one of the above-described vectors. Specifically, the matching score 1121 can be (1) a vector of N binary values {0,1}, each binary value corresponding to fit of the morphological features j of the image of the face with an image i of the subset of N images of visual equipments 1132, (2) a vector of integer values between 0 and X, wherein each integer value corresponds to a matching score 1121 of an image i of the subset of N images of visual equipments 1132 to the image of the face, or (3) a vector of N lists l of M integer values between 0 and X, each integer value of each list l corresponding to a matching score 1121 of the image i of the subset of N images of visual equipments 1132 relative to an image of a face for each rule of a set of M matching rules. In an embodiment, the matching score 1121 prediction can be generated by the neural network 1115 for each combination of the at least one input 1105 and the subset of images of visual equipments 1132 from the database 1155, the database 1155 including "VE 1", "VE 2", and successive images of visual equipments up to "VE N". In an embodiment, the database 1155 can be a preselected subset of images of visual equipments available at a retailer or a preselected subset of images of visual equipments previously determined to be appropriate for certain characteristics associated with a user.

FIG. 11R reflects a schematic of an ML-VEST wherein at least one input 1105 comprises an image of a face. In such a process, reflective of Case (12), the at least one input 1105 can be passed through a neural network 1115 having an architecture that permits the at least one input 1105 to be evaluated against morphological features and corresponding visual equipment attributes associated with each visual equipment of a subset of images of visual equipments. In an embodiment, the at least one input 1105 can be passed directly to a neural network 1115, wherein a convolution is performed. The convolution can be performed by, for example, a convolutional neural network 1112 applied to the at least one input 1105, including an image of the face, in order to perform feature extraction and prepare the image of the face for input to an input layer of the neural network 1115. In addition, the at least one input 1105 can include visual measurements 1149 corresponding to an image of a face.

Unlike previous embodiments, the visual equipment attributes, and corresponding morphological features, associated with each visual equipment of the subset of images of visual equipments are not provided to the neural network 1115 as an at least one input 1105. Instead, the neural network 1115 is applied to the at least one input 1105, the neural network 1115 being trained based upon, in part, the morphological features and corresponding visual equipment attributes associated with each visual equipment of the subset of images of visual equipments. According to an embodiment, and in the context of training the neural network 1115, a pre-treatment 1133 of each image of visual equipment of the subset of images of visual equipments from the database, in view morphological features of images of faces, is required. The pre-treatment 1133 includes coordinate information defining $F_{ji}$, the facial images j whose best match is visual equipment i, and $p_{ji}$, the percentage of Np labelers who give a highest score to a coordinate couple {visual equipment i, facial images j}.

To this end, for each image of a visual equipment i of the subset of images of visual equipments, and in view of the facial images 1105 of the image of the face, a statistical fit score can be calculated. The statistical fit score can include a percentage of labelers $p_{ji}$ (1) who associate the visual equipment i to facial images j (binary scoring of 1), (2) who gave the same matching score or had the same ranking for the visual equipment i of the subset of images of visual equipments respective to the facial images j of the image of the face (case matching score between 0-N), or (3) who gave the same matching score or had the same ranking by each item of a determined criteria list for the visual equipment i of the subset of images of visual equipments respective to the facial images j (case matching score between 0-N of each item). For simplicity, it can be assumed that the incomplete datasets are ignored and only cases where a labeler gave a matching score (between 0-N) of each visual equipment i from the subset of images of visual equipments respective to facial images j. Moreover, for each entry of facial images j, only the visual equipment attributes with the highest score for each labeler are preserved. In view of the above, a matrix that associates each visual equipment i of the subset of images of visual equipments with all facial images $F_{ji}$ can be obtained. The facial images $F_{ji}$ can include the best match by a percentage $p_{ji}$ of labelers.

Training, in view of the pre-treatment described above, can then begin. The at least one input to the training can be morphological features and visual measurements and the neural network can be configured as a combination neural network having convolutional layers and fully-connected layers. The fully-connected layers are configured for an embedding. An embedded layer 1118, a fully-connected layer of D neurons, contains vectorial representation of facial images in the vectorial space regarding each visual equipment i, determined during pre-treatment. Contained within the embedded layer 1118, each cluster i of the vectorial space of D dimension 1119 represents a visual equipment and each facial image can be represented by a D-vector coordinate.

During training, random sampling can be implemented so as to randomly select a specific number of couples of facial images, the couples of facial images being defined as $\{F_{ki}, F_{li}\}$. As an exemplary couple, $F_{ki}$ and $F_{li}$ are determined to be a good match respect to the visual equipment i having respective percentage $p_{ki}$ and $p_{li}$. Backpropagation can then be considered so as to minimize the difference between the two activation functions $f(F_{ki}, p_{ki})$ and $f(F_{li}, p_{li})$ where $f$ is the activation function. As an exemplary couple, $F_{ki}$ and $F_{li}$ are determined to be a bad match respect to the visual equipment i having respective percentage $p_{ki}$ and $p_{li}$. Backpropagation can then be considered so as to maximize the difference between the two activation functions $f(F_{ki}, p_{ki})$ and $f(F_{li}, p_{li})$ where $f$ is the activation function.

Returning now to FIG. 11R, an output layer 1117 of the neural network 1115 reflects a prediction of the neural network 1115 as to a fit metric 1120. The fit metric 1120 can be a coordinate of facial images $F_{ij}$ in the dimension vectorial space 1119. Post-treatment of the coordinate of facial images $F_{ij}$ can include (1) calculating the barycenter of each cluster i in the D-dimension vectorial space 1119 and (2) calculating the distance between the output coordinates and the barycenter of each cluster i, thereby generating a vector containing a ranking of a visual equipment (barycenter of each cluster i) from the closest to the output coordinate to the furthest. In an embodiment, the prediction of the coordinate of facial images $F_{ij}$ can be generated by the neural network 1115 for each of the at least one input 1105 in view of the morphological features and corresponding visual equipment attributes of the subset of images of visual equipments from the database. In an embodiment, the database can be a preselected subset of images of visual equipments available at a retailer or a preselected subset of images of visual equipments previously determined to be appropriate for certain characteristics associated with a user.

Figure 12A:
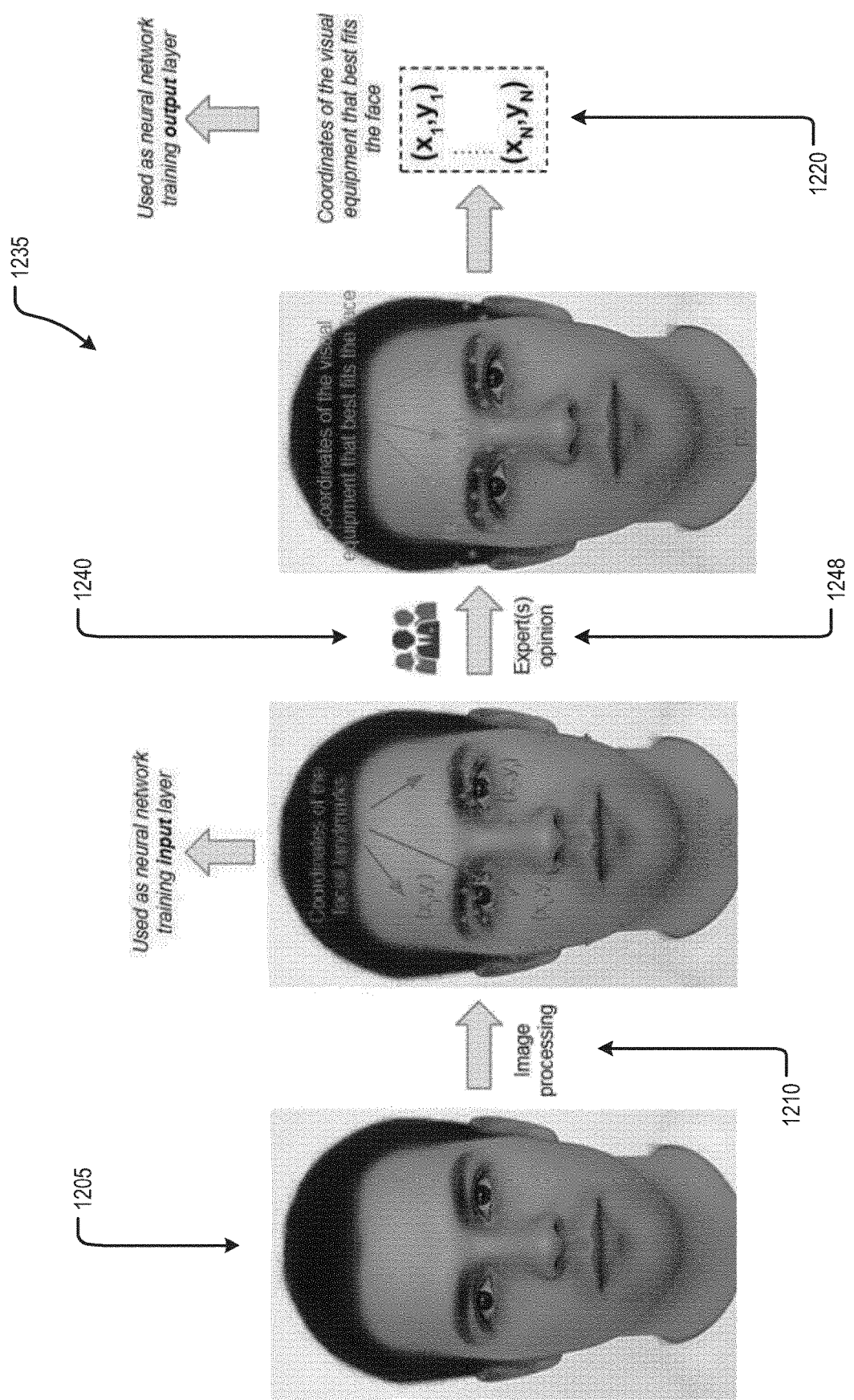
FIG. 12A is a schematic illustrating preparation of training database for a neural network training process, according to an exemplary embodiment of the present disclosure.

According to an embodiment of the present disclosure, a neural network of the ML-VEST can be configured to determine a fit metric of a user that is reflective of ideal coordinates of a visual equipment. To this end, FIG. 12A reflects a labeling process for use therein, wherein the structure of the above-described ML-VEST is substantially similar. First, an input image 1205 can be received. The input image 1205 can be delivered to an image preparation process 1210 whereby coordinates of facial landmarks are determined. These facial landmarks can be determined by, first, calibrating the image to allow for metric distancing, second, detecting landmarks of the image of the face of the person via classic image processing or deep learning techniques in order to extract metric coordinates of these landmarks, and, third, normalize these extracted coordinates relative to an anatomical reference point (e.g., the lowest point of the chin). These normalized, extracted coordinates can be delivered as an input layer to a training process 1235 of a neural network. As discussed above, this same image preparation process 1210 can be followed during implementation of the ML-VEST. The processed input image can then be passed to a labeling process 1240, wherein groups of labelers and, in particular, a category of expert labelers 1248, label the processed input image. In an example, the category of expert labelers can be eye care professionals, assisted by an expert in 3D modeling, model the image of the face of the picture such that an ideal visual equipment is generated according to the morphological features of the face of the person of the image. In an example, the model can constitute the metric coordinates corresponding to internal and external contour landmarks of the ideal visual equipment. As before, these internal and external contour landmarks of the ideal visual equipment can be normalized to an anatomical reference point (e.g., the lowest point of the chin) and can be used as outputs 1220 of the neural network. In other words, the above described landmarks of the ideal visual equipment 1120 serve as training data during training and define the output layer of the neural network during implementation of the ML-VEST. As before, it can be appreciated that the training process 1235 can be repeated for each of a plurality of image of faces of people within a training database.

The above-described labeling scheme of the labeling process can be implemented within the ML-VEST. Specifically, the implementation may proceed as illustrated in FIG. 12B.

Figure 12B:
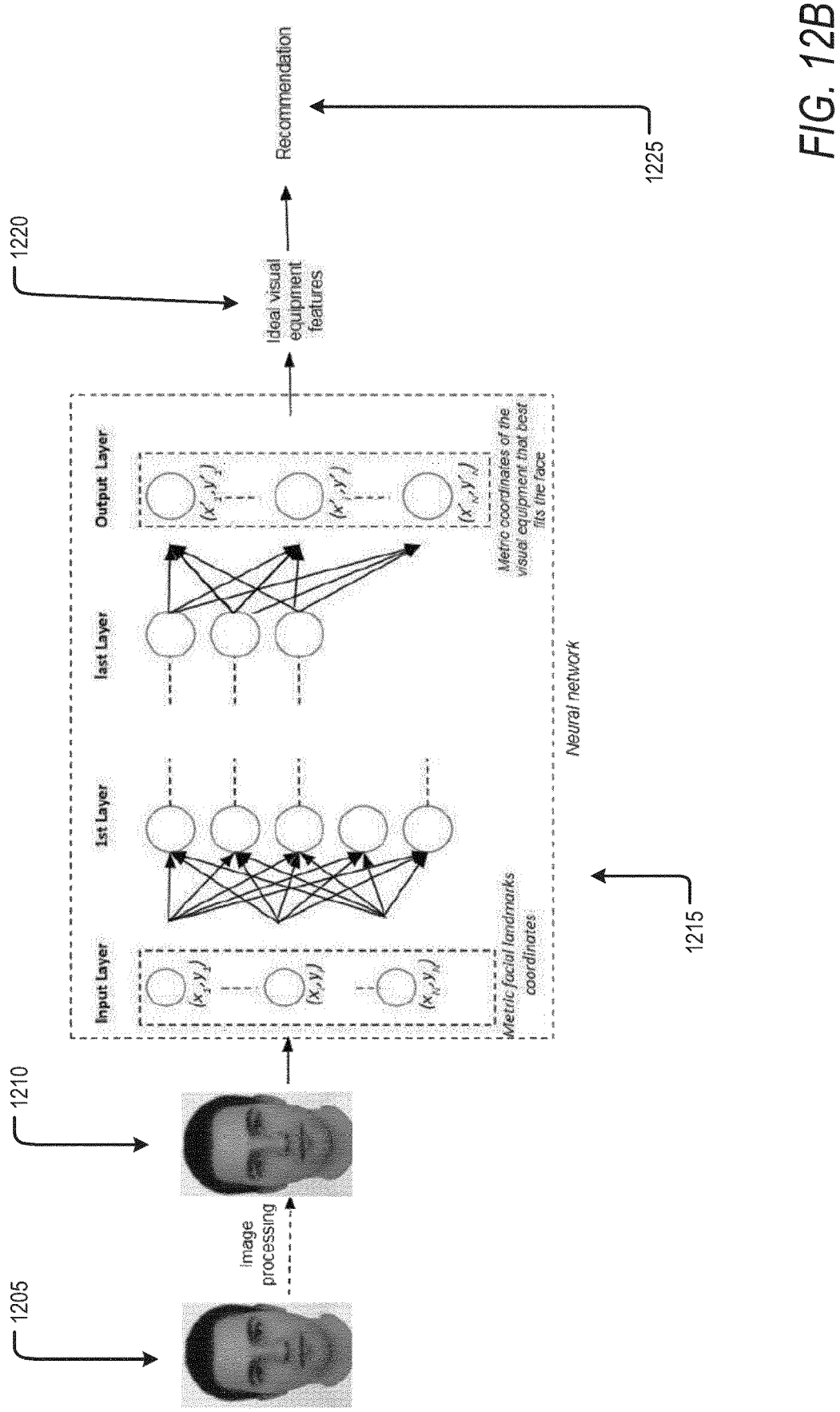
FIG. 12B is a schematic of a neural network of a training process of a machine learning-based visual equipment selection tool, wherein the inputs are metric facial landmark coordinates.

With reference to FIG. 12B, an input image 1205 can be passed to an image preparation process 1210 prior to being input to a neural network 1215. The input image 1205 may comprise an image of a face of a person. The image preparation process 1210 may comprise, according to an embodiment, image processing to derive morphological features and landmarks of the image of the face of the person. The processed input images can be delivered to the input layer of the neural network 1215, where the neural network 1215 is applied thereto. As indicated by the group of labelers, the output layer reflects a prediction of the neural network 1215 as to a label. This prediction, or fit metric 1220, reflects coordinates of an ideal visual equipment as generated by the neural network 1215 for the face of the person of the image. During implementation of the trained neural network of FIG. 12A within FIG. 12B and the ML-VEST, writ large, the outputted ideal visual equipment coordinates can be compared with coordinates of a plurality of visual equipments within a database, the most highly correlated one thereof being selected as the fitted visual equipment for the user.

FIG. 13A through FIG. 13F illustrate exemplary implementations and components of a neural network of an ML-VEST of the present disclosure.

As review, several use cases of inputs to a neural network of the ML-VEST can be considered: (1) morphological features and visual equipment attributes acquired from an image of a face and an image of a visual equipment or from an image of a face wearing a visual equipment; (2) an image of a face and visual equipment attributes; (3) morphological features and visual equipment attributes; (4) an image of a face and an image of a visual equipment; (5) morphological features, visual equipment attributes, and visual measurements; (6) an image of a face, visual equipment attributes, and visual measurements; (7) morphological features, an image of a visual equipment, and visual measurements; (8) an image of a face, an image of a visual equipment, and visual measurements; (9) morphological features; (10) an image of a face; (11) morphological features and visual measurements; (12) an image of a face and visual measurements.

Figure 13A:
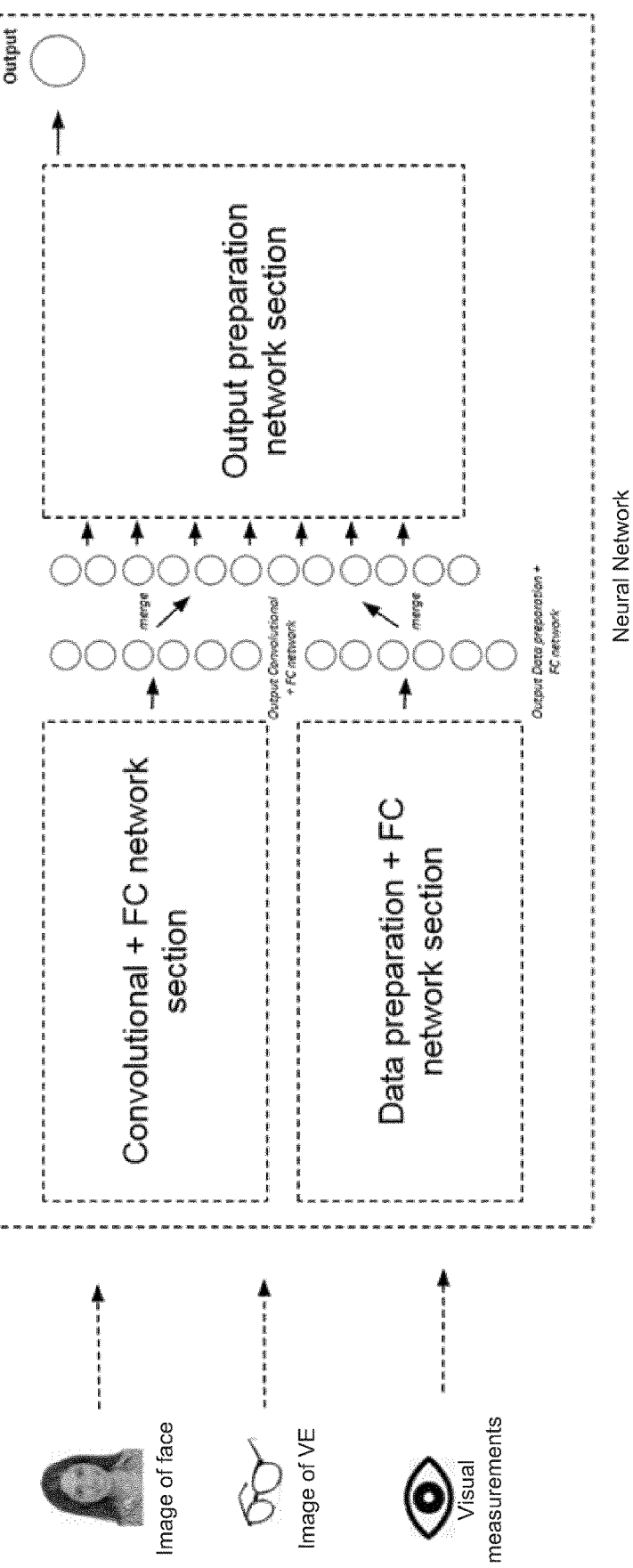
FIG. 13A is a generalized flow diagram of a neural network configured to handle heterogeneous input data, according to an exemplary embodiment of the present disclosure.
Figure 13B:
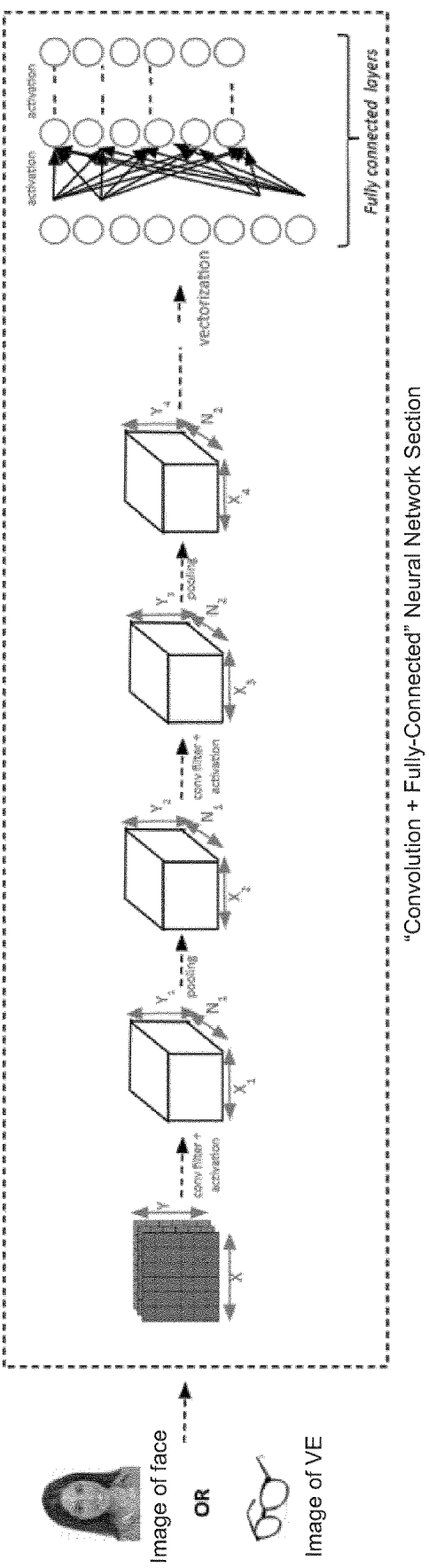
FIG. 13B is an aspect of a generalized flow diagram of a neural network configured to handle heterogeneous input data, according to an exemplary embodiment of the present disclosure.
Figure 13C:
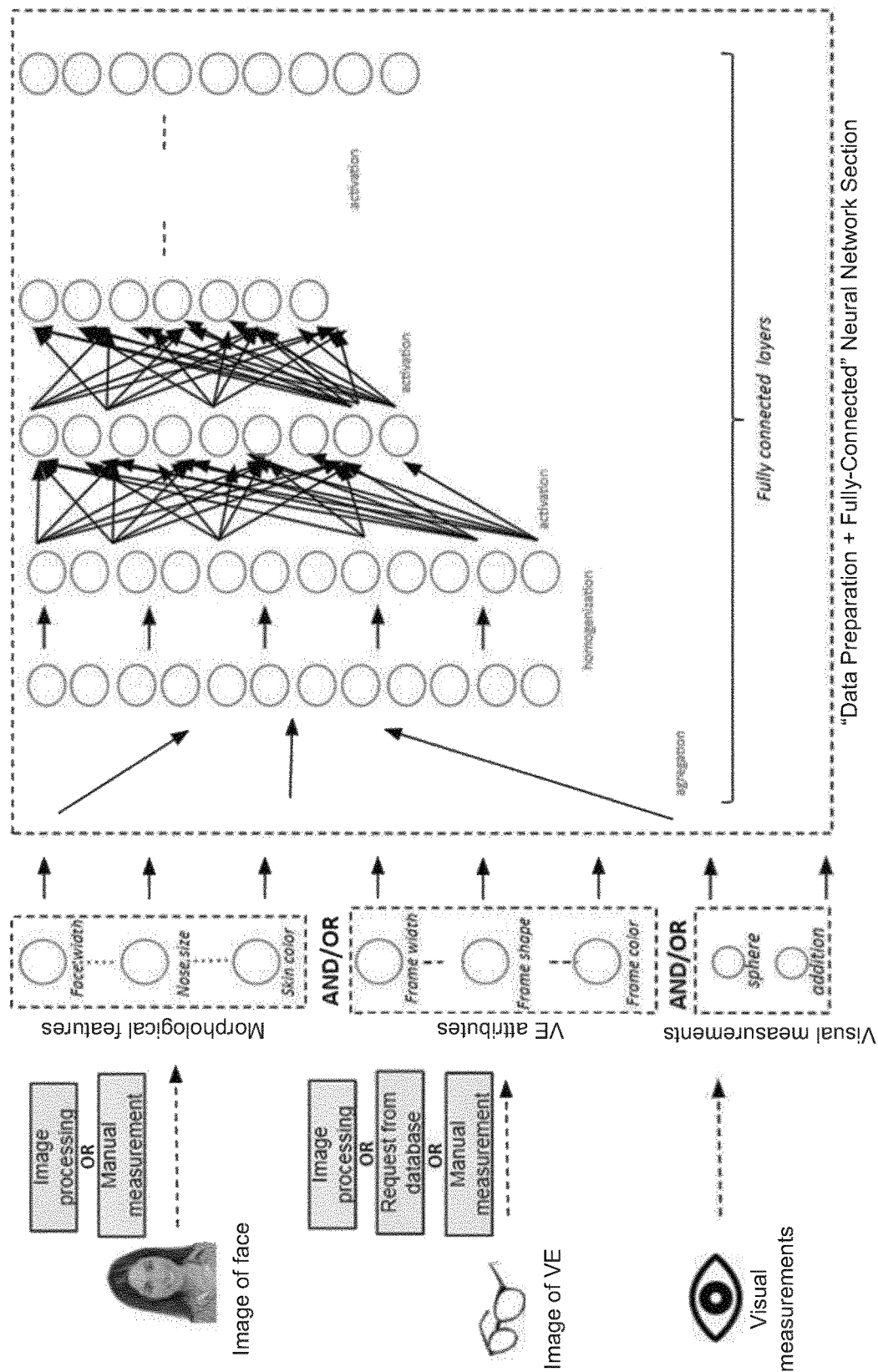
FIG. 13C is an aspect of a generalized flow diagram of a neural network configured to handle heterogeneous input data, according to an exemplary embodiment of the present disclosure.

For all cases excepting Case (1), Case (4), Case (9), and Case (10), two heterogeneous input streams must be incorporated. In order to process an image of a face and an image of a visual equipment, a convolutional+fully-connected neural network section can be used, as shown in FIG. 13A and detailed in FIG. 13B. To this end, the neural network employs a succession of convolutional layers, each layer being composed of a convolutional filter with varying size, padding, stride, and depth, followed by an activation layer (e.g., ReLU, Leaky ReLU), or by a pooling filter (e.g., max pooling, average pooling). The last convolutional layer can then be vectorized and each real number of the obtained vector can be processed through fully-connected layers, wherein an activation function can be selected from a group including ReLU, Leaky ReLU, sigmoid, TanH, and the like.

At this point, a subset of the nodes of the neural network remain to be processed prior to a final output. A "Data Preparation+Fully-Connected" neural network section, shown in FIG. 13C, can be used to process data that includes real numbers and enumerations of strings representing, for instance, morphological features, visual equipment attributes, and visual measurements. First, the data can be aggregated to form a vector of heterogeneous data. The vectors can then be homogenized to obtain only real numbers. To this end, enumeration can be replaced by an integer number corresponding to the number of the item within the enumeration. For example, the color "yellow" can be replaced by "2" because "yellow" is the number "2" item in the enumerations of available colors that includes "blank", "yellow", "orange", "red", and the like. Each character can be replaced by the alphabetical number of the item. Next, each real number of the vector obtained through fully-connected layers can be processed, the processing being driven by an activation function selected from a group including ReLU, leaky ReLU, sigmoid, and TanH, among others.

Figure 13D:
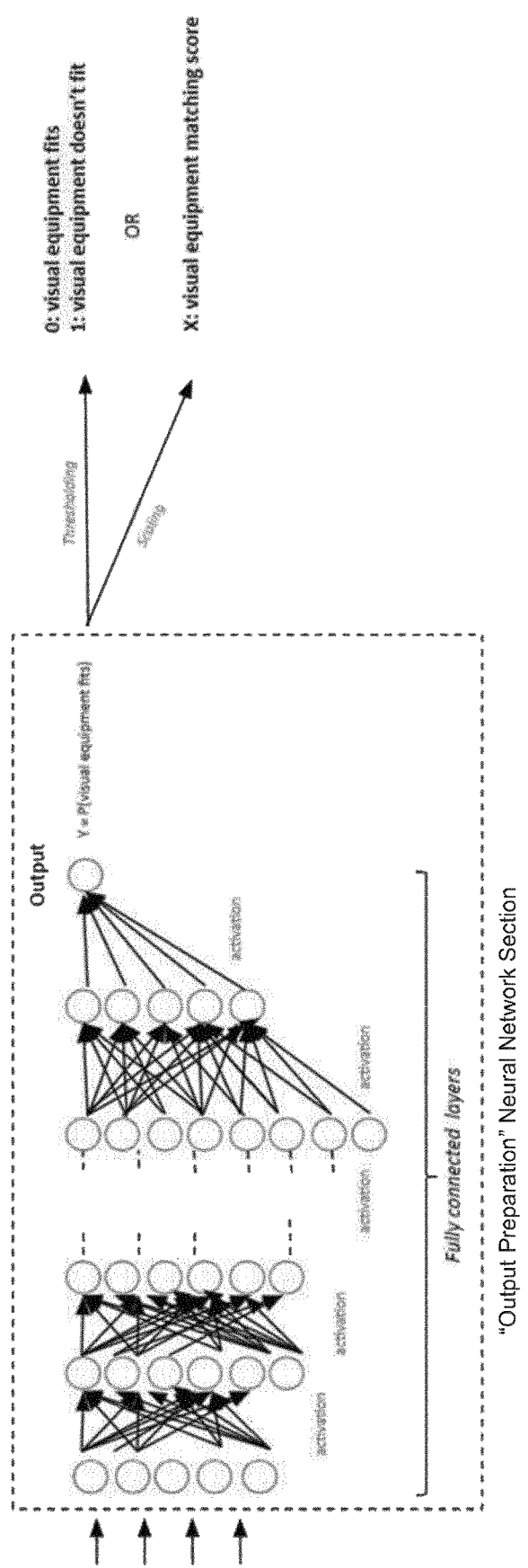
FIG. 13D is an aspect of a generalized flow diagram of a neural network configured to handle heterogeneous input data, according to an exemplary embodiment of the present disclosure.

Following homogenization, unprocessed nodes may still be present. In order to combine the outputs of both the "Convolutional+Fully-Connected" network section and the "Data Preparation+Fully-Connected" network section, (1) the output vectors of each network section must be merged to generate a unique vector and (2) the unique vector must be processed through the "Output Preparation" network section, as shown in FIG. 13D. The "Output Preparation" network section can consist of a succession of fully-connected layers for which the activation function is one selected from a group including ReLU, Leaky ReLU, sigmoid, TanH, and the like. The number and the size of these fully-connected layers can be based on the desired output. For instance, if the output is unique, as is possible for Case (1) through Case (8), then the final fully-connected layer may consist of a single node that represents the probability (real number between 0 and 1) that the visual equipment fits the image of the face given as input. In such a case, the probability can be defined as either (1) thresholded (e.g., threshold=0.5) if the desired output is a (matching) binary value or scaled to fit a predefined scoring range if the desired output is a (matching) score (e.g., if score is between 0 and 10, the probability will be multiplied by 10)

Figure 13E:
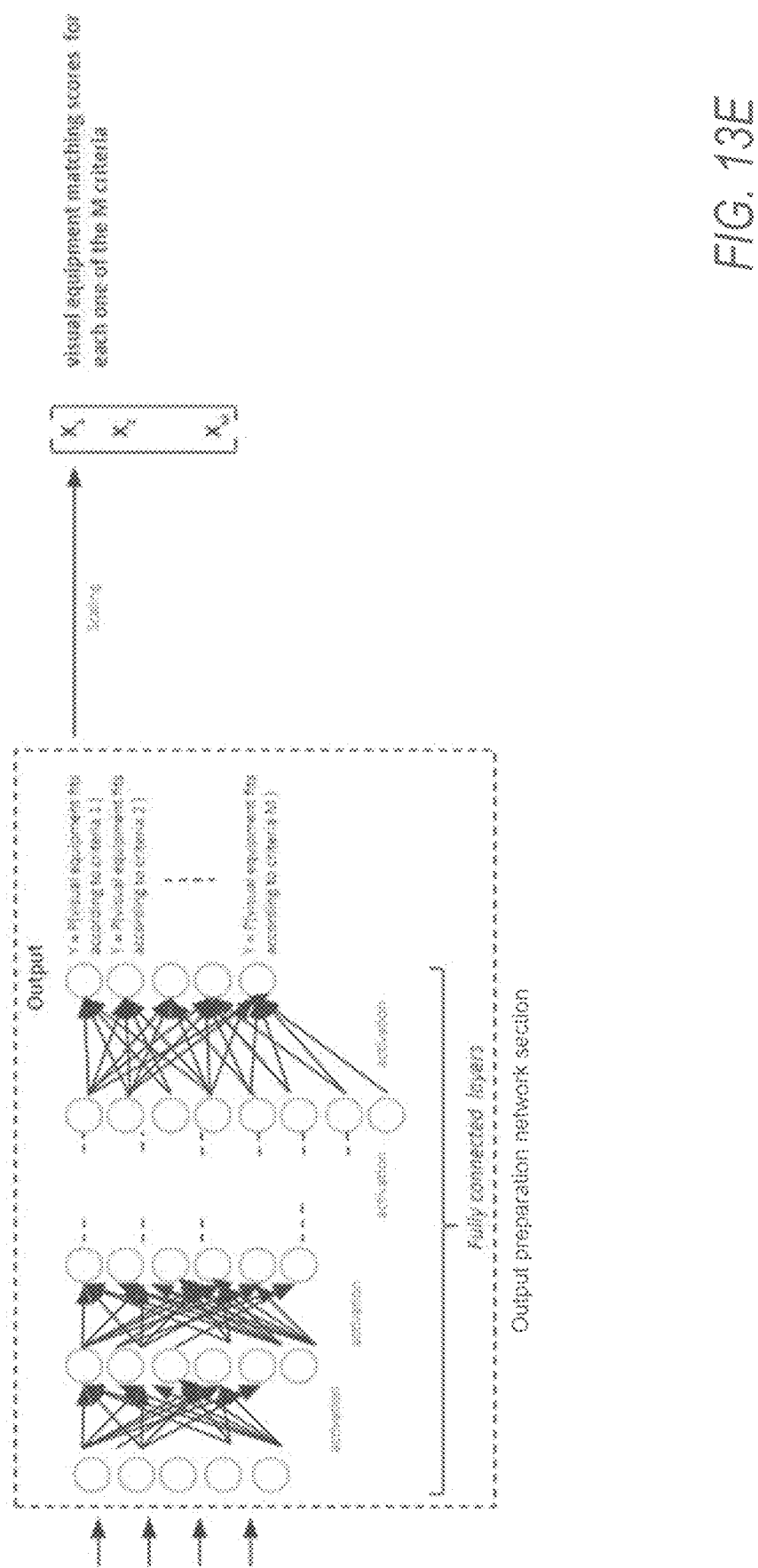
FIG. 13E is an aspect of a generalized flow diagram of a neural network configured to handle heterogeneous input data, according to an exemplary embodiment of the present disclosure.
Figure 13F:
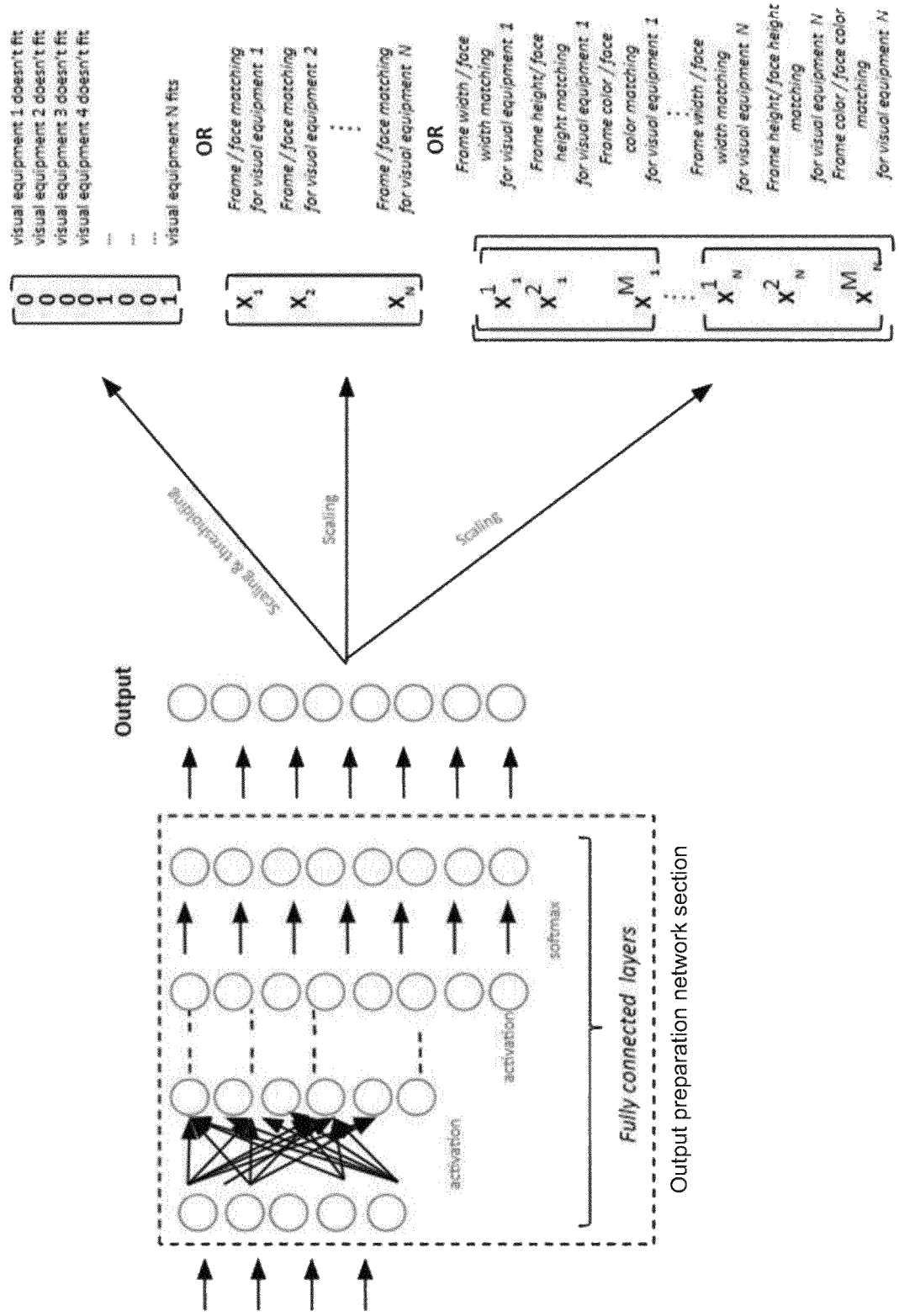
FIG. 13F is an aspect of a generalized flow diagram of a neural network configured to handle heterogeneous input data, according to an exemplary embodiment of the present disclosure.

As shown in FIG. 13E, the output may be more than one node. If the output is multiple but each output concerns the same (and unique) visual equipment, as is possible for Case (1) through Case (8) when each output value is a matching score linked to a specific criteria), then there may be as many nodes in the final fully-connected layer as there are criteria to score, with each node representing a probability (real number between 0 and 1) that the visual equipment fits the image of the face given as input with respect to criterion i. Each probability may then be scaled to fit a predefined scoring range if the desired output is a (matching) score (e.g if score is between 0 and 10, the probability will be multiplied by 10). If the output is multiple but each output may concern several visual equipments, as is possible for Case (9) to Case (12) and as shown in FIG. 13F, then there may be as many nodes in the final fully-connected layer as there are criteria to score, multiplied by the number of visual equipments to score, with each node representing a probability (real number between 0 and 1) that the visual equipment fits the image of the face given as input with respect to criterion i. In such a case, each probability is can either be (1) thresholded (e.g., threshold=0.5) if the desired outputs are (matching) binary values or (2) scaled to fit a predefined scoring range if the desired outputs are (matching) scores (e.g., if score is between 0 and 10, the probability will be multiplied by 10).

Regarding Case (1), as there are only processed features of an image of a face and an image of a visual equipment as inputs, there may be at least one "Data Preparation+Fully Connected" neural network section, similar to that which was described above, and the output of the "Data Preparation+Fully-Connected" neural network section may be processed as above in order to reach the desired output.

Regarding Case (4), as there are both images of faces and images of visual equipments as inputs, there may be at least two "Convolutional+Fully-Connected" neural network sections, one for each image, wherein the outputs of the two network sections can be combined in the same manner as described above in order to reach a desired output.

Regarding exemplary vector embodiments of Case (9) (FIG. 11K) and Case (10) (FIG. 11M), as there is only an image of a face as input, there may be at least one "Convolutional+Fully-Connected" neural network section.

Regarding exemplary coordinate-based embodiments of Case (10) (FIG. 11N) and Case (12) (FIG. 11R), as there is an image of a face as input alongside visual measurements, there may be at least one "Convolutional+Fully-Connected" neural network section, the fully-connected layers containing an embedding.

Figure 14:
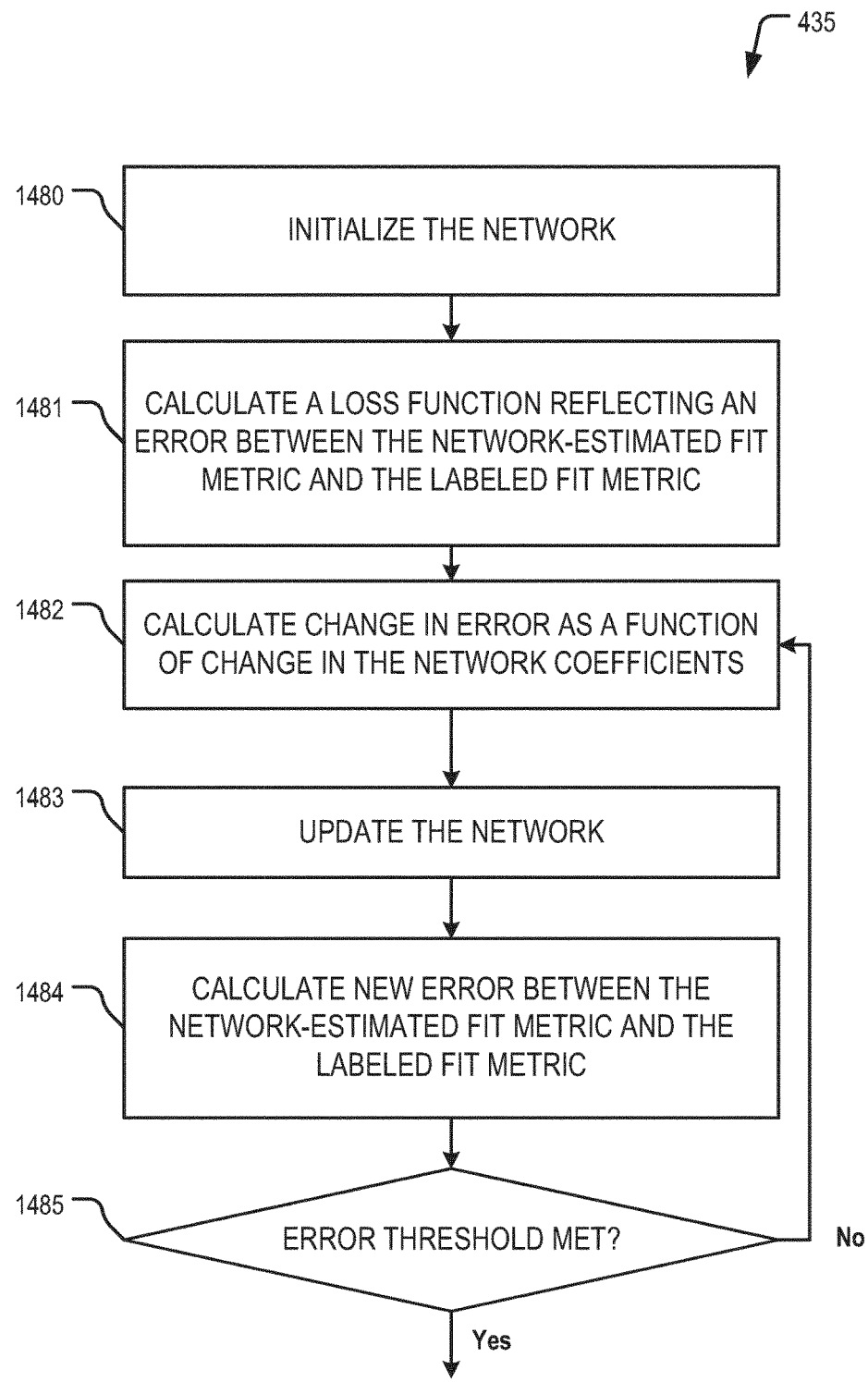
FIG. 14 is a flow diagram of training a neural network of a machine learning-based visual equipment selection tool, according to an exemplary embodiment of the present disclosure.

FIG. 14 is a non-limiting example of an implementation of training process 435 for training the neural network using the training data. As described above, the training data can comprise a plurality of labeled input images, or data, from one or more sources including, for example, a training database connected via either wired or wireless connection.

In operation 1480 of process 435, an initial guess is generated for the coefficients of the neural network. For example, the initial guess can be based on a priori knowledge of the data being collected and relevant indicators therein. Additionally, the initial guess can be based on one of the LeCun initialization, an Xavier initialization, and a Kaiming initialization.

Operation 1481 of process 435 provides a non-limiting example of an optimization method for training the neural network. In operation 1481 of process 435, an error is calculated (e.g., using a loss function or a cost function) to represent a measure of the difference (e.g., a distance measure) between the labeled data (i.e., ground truth) and the output data of the neural network as applied in a current iteration of the neural network. The error can be calculated using any known cost function or distance measure between the training data. Further, in certain implementations the error/loss function can be calculated using one or more of a hinge loss and a cross-entropy loss. In an example, the loss function can be defined as the mean square error between the output of the neural network ($S_{NN}$) and the labeled ground truth data ($S_{AGT}$), or $$\frac{1}{n}\sum_{k=1}^{n} \|S_{AGT} - S_{NN}\|^2$$

where n is the number for the training object. This loss can be minimized using optimization methods including, among others, stochastic gradient descent.

Additionally, the loss function can be combined with a regularization approach to avoid overfitting the network to the particular instances represented in the training data. Regularization can help to prevent overfitting in machine learning problems. If trained too long, and assuming the model has enough representational power, the network will learn the noise specific to that dataset, which is referred to as overfitting. In case of overfitting, the neural network becomes a poor generalization, and the variance will be large because the noise varies between datasets. The minimum total error occurs when the sums of bias and variance are minimal. Accordingly, it is desirable to reach a local minimum that explains the data in the simplest possible way to maximize the likelihood that the trained network represents a general solution, rather than a solution particular to the noise in the training data. This goal can be achieved by, for example, early stopping, weight regularization, lasso regularization, ridge regularization, or elastic net regularization.

In certain implements the neural network is trained using backpropagation. Backpropagation can be used for training neural networks and is used in conjunction with gradient descent optimization methods. During a forward pass, the algorithm computes the network's predictions based on the current parameters $\Theta$. These predictions are then input into the loss function, by which they are compared to the corresponding ground truth labels (i.e., labeled data). During the backward pass, the model computes the gradient of the loss function with respect to the current parameters, after which the parameters are updated by taking a step size of a predefined size in the direction of minimized loss (e.g., in accelerated methods, such that the Nesterov momentum method and various adaptive methods, the step size can be selected to more quickly converge to optimize the loss function.)

The optimization method by which the backpropagation is performed can use one or more of gradient descent, batch gradient descent, stochastic gradient descent, and mini-batch stochastic gradient descent. Additionally, the optimization method can be accelerated using one or more momentum update techniques in the optimization approach that results in faster convergence rates of stochastic gradient descent in deep networks, including, e.g., Nesterov momentum technique or an adaptive method, such as Adagrad sub-gradient method, an Adadelta or RMSProp parameter update variation of the Adagrad method, and an Adam adaptive optimization technique. The optimization method can also apply a second order method by incorporating the Jacobian matrix into the update step.

The forward and backward passes can be performed incrementally through the respective layers of the network. In the forward pass, the execution starts by feeding the inputs through the first layer, thus creating the output activations for the subsequent layer. This process is repeated until the loss function at the last layer is reached. During the backward pass, the last layer computes the gradients with respect to its own learnable parameters (if any) and also with respect to its own input, which serves as the upstream derivatives for the previous layer. This process is repeated until the input layer is reached.

Returning to the non-limiting example shown in FIG. 14, operation 1482 of process 435 determines a change in the error as a function of the change in the network can be calculated (e.g., an error gradient) and this change in the error can be used to select a direction and step size for a subsequent change in the weights/coefficients of the neural network. Calculating the gradient of the error in this manner is consistent with certain implementations of a gradient descent optimization method. In certain other implementations, this operation can be omitted and/or substituted with another operation in accordance with another optimization algorithm (e.g., a non-gradient descent optimization algorithm like simulated annealing or a genetic algorithm), as would be understood by one of ordinary skill in the art.

In operation 1483 of process 435, a new set of coefficients are determined for the neural network. For example, the weights/coefficients can be updated using the change calculated in operation 1482, as in a gradient descent optimization method or an over-relaxation acceleration method.

In operation 1484 of process 435, a new error value is calculated using the updated weights/coefficients of the neural network.

In operation 1485 of process 435, predefined stopping criteria are used to determine whether the training of the network is complete. For example, the predefined stopping criteria can evaluate whether the new error and/or the total number of iterations performed exceed predefined values. For example, the stopping criteria can be satisfied if either the new error falls below a predefined threshold or if a maximum number of iterations are reached. When the stopping criteria are not satisfied the training process performed in process 435 will continue back to the start of the iterative loop by returning and repeating operation 1482 using the new weights and coefficients (the iterative loop includes operations 1482, 1483, 1484, and 1485). When the stopping criteria are satisfied, the training process performed in process 435 is completed.

Figure 15A:
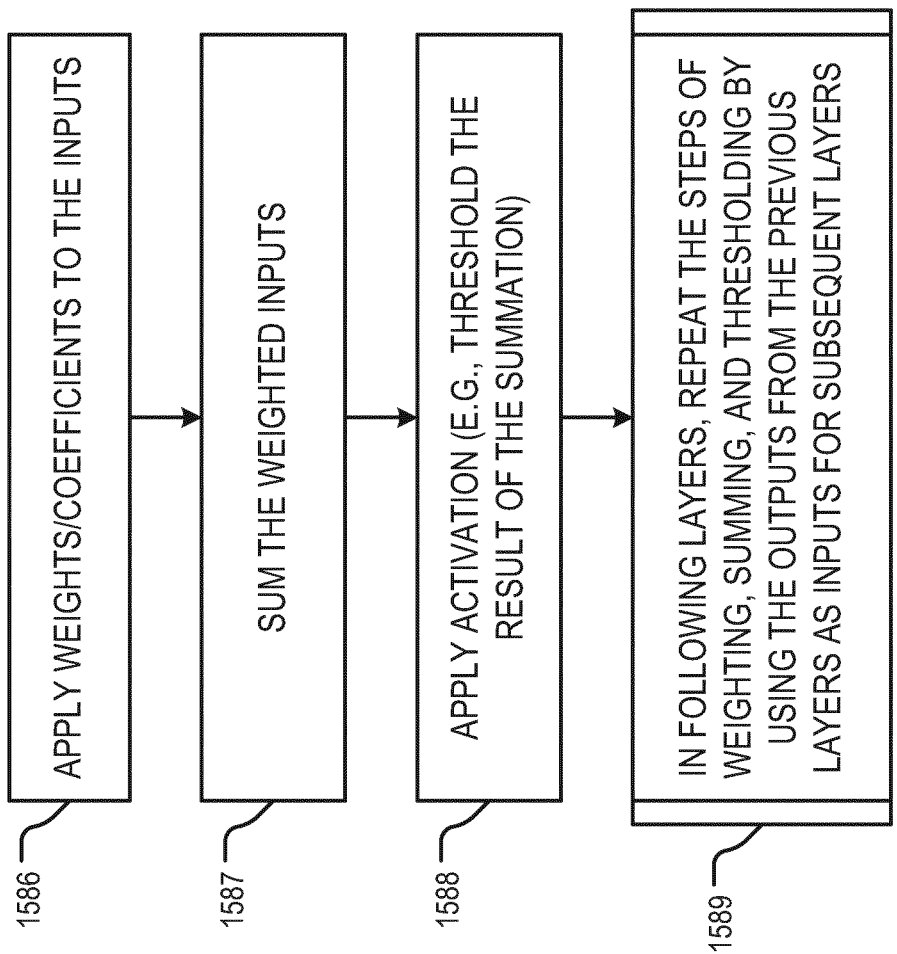
FIG. 15A is a generalized flow diagram of an implementation of an artificial neural network.

FIG. 15A shows flow diagrams of an implementations of process 435. FIG. 15A is general for any type of layer in a feedforward artificial neural network (ANN), including, for example, fully connected layers as shown in FIG. 11A-11E. The ANN of the present disclosure can include fully connected layers preceded by an image processing neural network for convolution, pooling, batch normalization, and activation, resulting in a flow diagram that is a combination of FIG. 15A and FIG. 15B, as would be understood by one of ordinary skill in the art. The implementation of process 435 shown in FIG. 15A also corresponds to applying the ANN of the present disclosure to the respective training data of the present disclosure.

In operation 1586, the weights/coefficients corresponding to the connections between neurons (i.e., nodes) are applied to the respective inputs corresponding to processed input image data.

In operation 1587, the weighted inputs are summed. When the only non-zero weights/coefficients connecting to a given neuron on the next layer are regionally localized in the processed input image data represented in the previous layer, the combination of operation 1586 and operation 1587 is essentially identical to performing a convolution operation.

In operation 1588, respective thresholds are applied to the weighted sums of the respective neurons.

In process 1589, the steps of weighting, summing, and thresholding are repeated for each of the subsequent layers.

Figure 15B:
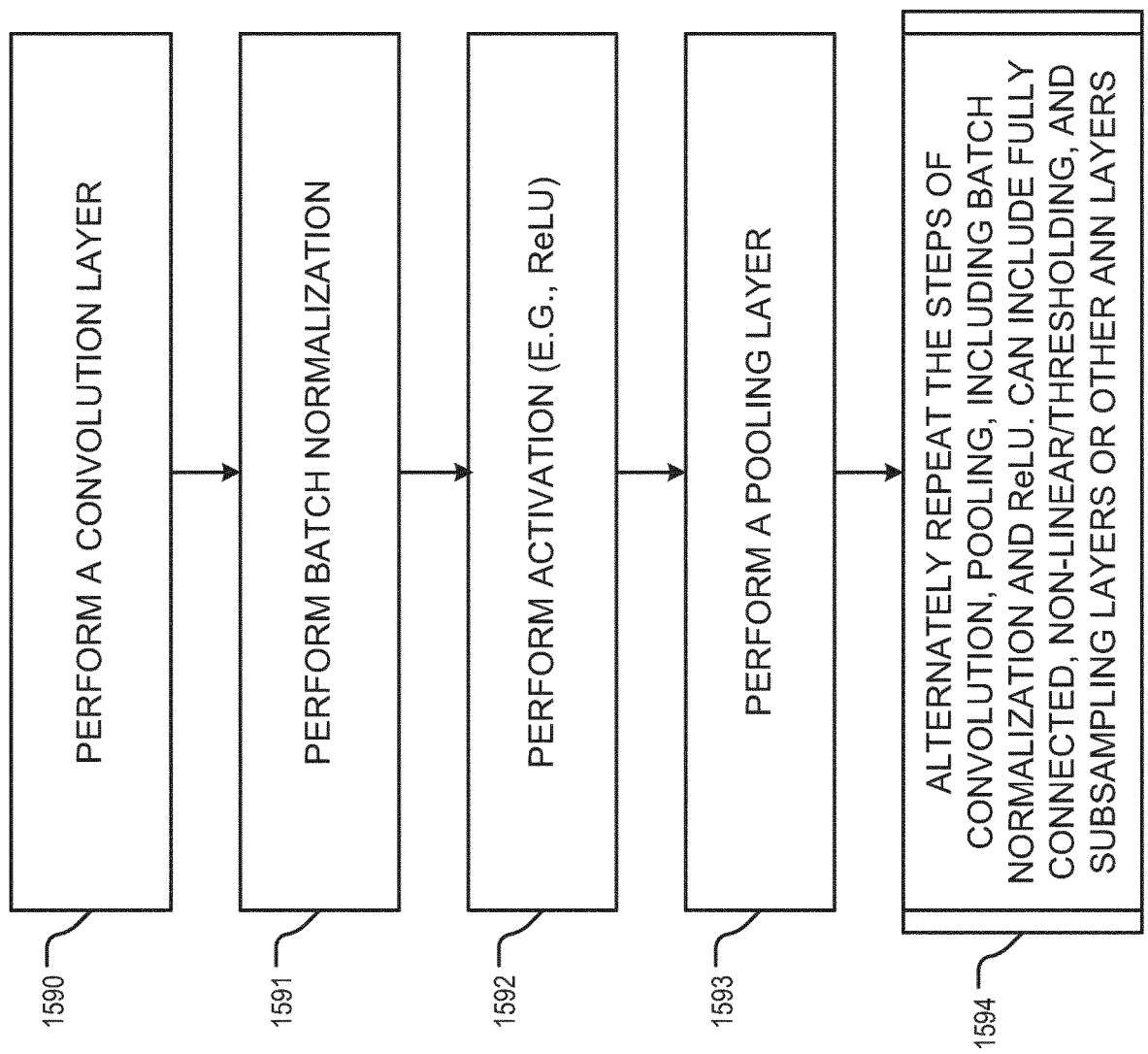
FIG. 15B is a flowchart of an implementation of a convolutional neural network, according to an exemplary embodiment of the present disclosure.

FIG. 15B shows a flow diagram of another implementation of process 435, wherein a convolutional neural network is applied during an image preparation step to prepare the input image for application of the ANN of the present disclosure, as discussed in FIG. 11C-11E. Accordingly, the implementation of process 435 shown in FIG. 15B corresponds to operating on the input image data at a hidden layer using a non-limiting implementation of a convolutional neural network.

In operation 1590, the calculations for a convolution layer are performed as discussed in the foregoing and in accordance with the understanding of convolution layers by one of ordinary skill in the art.

In operation 1591, following convolution, batch normalization can be performed to control for variation in the output of the previous layer, as would be understood by one of ordinary skill in the art.

In operation 1592, following batch normalization, activation is performed according to the foregoing description of activation and in accordance with the understanding of activation by one of ordinary skill in the art. In an example, the activation function is a rectified activation function or, for example, a ReLU, as discussed above.

In another implementation, the ReLU layer of operation 1592 may be performed prior to the batch normalization layer of operation 1591.

In operation 1593, the outputs from the convolution layer, following batch normalization and activation, are the inputs into a pooling layer that is performed according to the foregoing description of pooling layers and in accordance with the understanding of pooling layers of one of ordinary skill in the art.

In process 1594, the steps of a convolution layer, pooling layer, batch normalization layer, and ReLU layer can be repeated in whole or in part for a predefined number of layers. Following (or intermixed with) the above-described layers, the output from the ReLU layer can be fed to a predefined number of ANN layers that are performed according to the description provided for the ANN layers in FIG. 9A. The final output will be a processed input image characteristic as described earlier.

With regard to convolutional neural network architecture, generally, convolutional layers are placed close to the input layer, whereas fully connected layers, which perform the high-level reasoning, are placed further down the architecture towards the loss function. Pooling layers can be inserted after convolutions and provide a reduction in the spatial extent of the filters, and thus the amount of learnable parameters. Batch normalization layers regulate gradient distractions to outliers and accelerate the learning process. Activation functions are also incorporated into various layers to introduce nonlinearity and enable the network to learn complex predictive relationships. The activation function can be a saturating activation function (e.g., a sigmoid or hyperbolic tangent activation function) or rectified activation function (e.g., ReLU discussed above).

Figure 16:
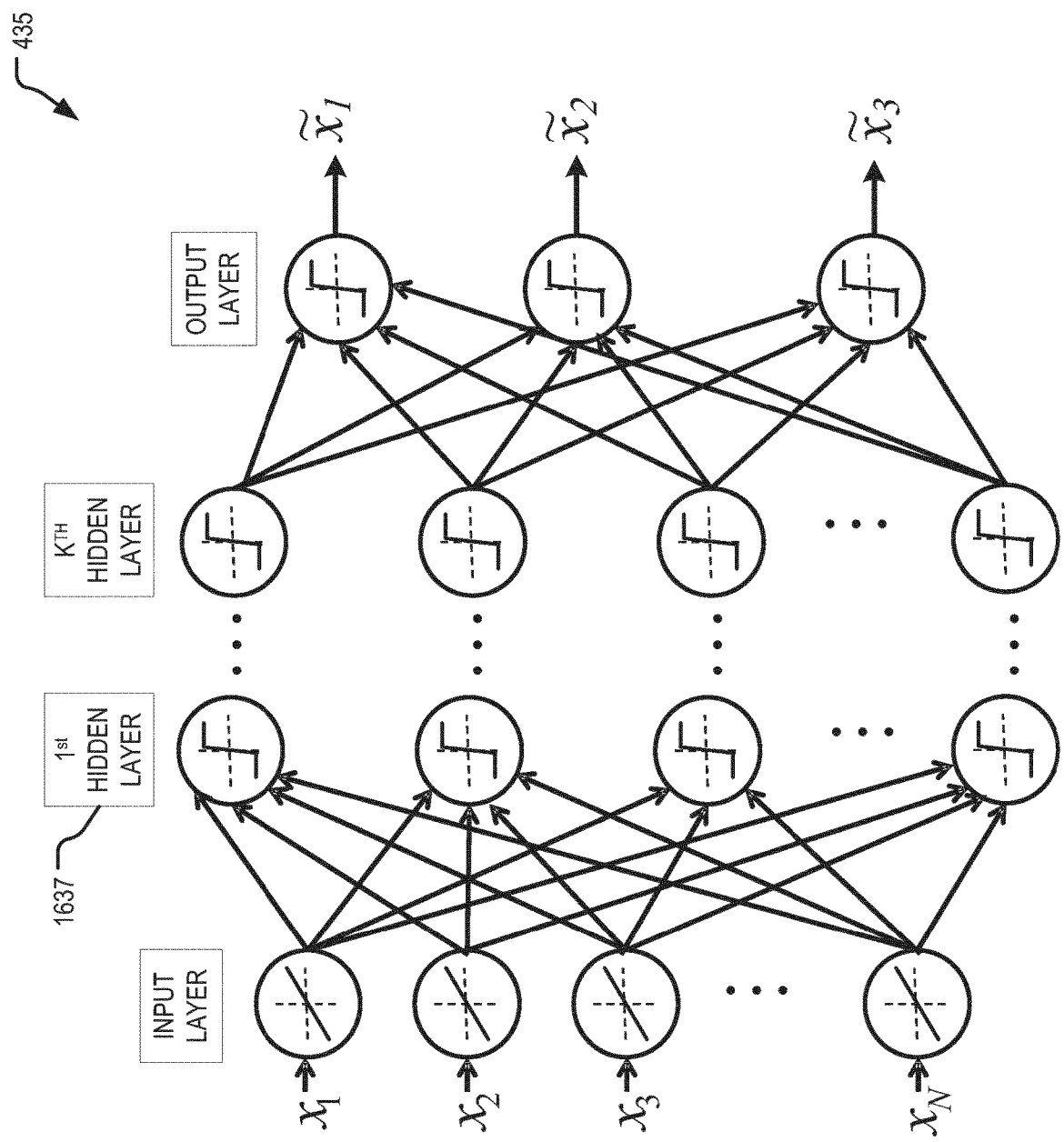
FIG. 16 is an example of a feed forward artificial neural network.

FIG. 16 shows an example of the inter-connections between layers in an ANN such as the one described in the present disclosure. The ANN can include fully connected, and, in view of FIG. 15B, convolutional, pooling, batch normalization, and activation layers, all of which are explained above and below. In an embodiment, the convolutional neural network layers can be embedded within the ANN. Alternatively, the convolutional neural network can be arranged before the ANN, with the output layer of the convolutional neural network defining, in part, an input layer of the ANN. The arrangement of the convolutional neural network relative to the ANN is important in as much as the convolutional neural network provides, in part, processed input images to the input layer of the ANN.

Referring still to FIG. 16, FIG. 16 shows an example of a general ANN having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture such as the number of nodes and/or their connectivity. The nodes in an ANN can be referred to as neurons (or as neuronal nodes), and the neurons can have inter-connections between the different layers of the ANN system. The simplest ANN has three layers and is called an autoencoder. The CNN of the present disclosure can have more than three layers of neurons and have as many output neurons $\hat{x}_N$ as input neurons, wherein N is the number of data entries in the processed input image data. The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function m(x) is defined as a composition of other functions $n_i(x)$, which can be further defined as a composition of other functions. This can be conveniently represented as a network structure, with arrows depicting the dependencies between variables, as shown in FIG. 16. For example, the ANN can use a nonlinear weighted sum, wherein $m(x)=K(\Sigma_i w_i n_i(x))$ and where K (commonly referred to as the activation function) is some predefined function, such as the hyperbolic tangent.

In FIG. 16, the neurons (i.e., nodes) are depicted by circles around a threshold function. For the non-limiting example shown in FIG. 16, the inputs are depicted as circles around a linear function and the arrows indicate directed communications between neurons. In certain implementations, the ANN is a feedforward network.

The ANN of the present disclosure operates to achieve a specific task, by searching within the class of functions F to learn, using a set of observations, to find $m^* \in F$, which solves the specific task in some optimal sense (e.g., meets the stopping criteria used in operation 1485 of process 435 discussed above). For example, in certain implementations, this can be achieved by defining a cost function C:F→m such that, for the optimal solution $m^*$, $C(m^*) \leq C(m) \forall m \in F$ (i.e., no solution has a cost less than the cost of the optimal solution). The cost function C is a measure of how far away a particular solution is from an optimal solution to the problem to be solved (e.g., the error). Learning algorithms iteratively search through the solution space to find a function that has the smallest possible cost. In certain implementations, the cost is minimized over a sample of the data (i.e., the training data).

Figure 17:
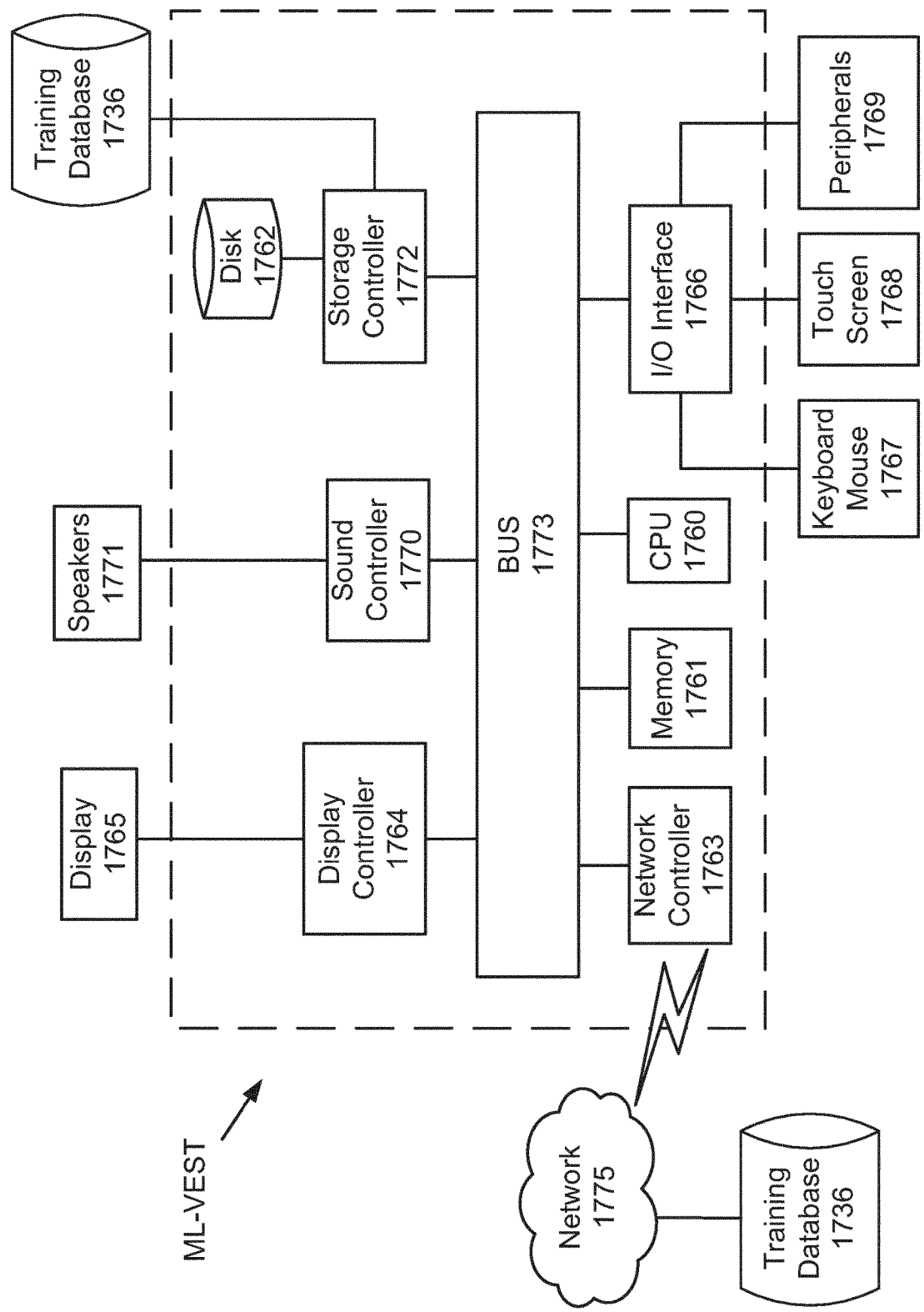
FIG. 17 is hardware configuration of a machine learning-based visual equipment selection tool, according to an exemplary embodiment of the present disclosure.

With reference now to FIG. 17, FIG. 17 is a hardware description of a ML-VEST, according to an exemplary embodiment of the present disclosure.

In FIG. 17, the ML-VEST includes a CPU 1760 which performs the processes described above. The ML-VEST may be a general-purpose computer or a particular, special-purpose machine. In one embodiment, the ML-VEST becomes a particular, special-purpose machine when the processor 1760 is programmed to perform visual equipment selection (and in particular, any of the processes discussed with reference to the above disclosure).

Alternatively, or additionally, the CPU 1760 may be implemented on an FPGA, ASIC, PLD or using discrete logic circuits, as one of ordinary skill in the art would recognize. Further, CPU 1760 may be implemented as multiple processors cooperatively working in parallel to perform the instructions of the inventive processes described above.

The ML-VEST also includes a network controller 1763, such as an Intel Ethernet PRO network interface card, for interfacing with network 1775. As can be appreciated, the network 1775 can be a public network, such as the Internet, or a private network such as an LAN or WAN network, or any combination thereof and can also include PSTN or ISDN sub-networks. The network 1775 can also be wired, such as an Ethernet network, or can be wireless such as a cellular network including EDGE, 3G and 4G wireless cellular systems. The wireless network can also be WiFi, Bluetooth, or any other wireless form of communication that is known.

During training process 435, input training images can be acquired from a training database 1736 connected wirelessly to the ML-VEST via the network 1775 or via a hardwired connection to the ML-VEST through a storage controller 1772. In an embodiment, the training database 1736 is a visual equipment database.

The ML-VEST further includes a display controller 1764, such as a graphics card or graphics adaptor for interfacing with display 1765, such as a monitor. A general purpose I/O interface 1766 interfaces with a keyboard and/or mouse 1767 as well as a touch screen panel 1768 on or separate from display 1765. General purpose I/O interface also connects to a variety of peripherals 1769 including printers and scanners.

A sound controller 1770 is also provided in the ML-VEST to interface with speakers/microphone 1771 thereby providing sounds and/or music.

The general purpose storage controller 1772 connects the storage medium disk 1762 with communication bus 1773, which may be an ISA, EISA, VESA, PCI, or similar, for interconnecting all of the components of the ML-VEST. A description of the general features and functionality of the display 1765, keyboard and/or mouse 1767, as well as the display controller 1764, storage controller 1772, network controller 1763, sound controller 1770, and general purpose I/O interface 1766 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) An apparatus for determining a fitted visual equipment, comprising processing circuitry configured to receive at least one input, the at least one input including an image of a face of a person, apply a neural network to the at least one input, the neural network generating at least one fit metric of the at least one input, and determine, based upon the at least one fit metric generated by the neural network, the fitted visual equipment, wherein the at least one fit metric corresponds to a correlative synchronization between the face of the person and a visual equipment.

(2) The apparatus according to (1), wherein the at least one input includes an image of a visual equipment.

(3) The apparatus according to either (1) or (2), wherein the at least one input includes the image of the face of the person, wherein the person is wearing a visual equipment.

(4) The apparatus according to any of (1) to (3), wherein the at least one input is a processed at least one input, the processed at least one input including morphological features determined from the image of the face of the person.

(5) The apparatus according to any of (1) to (4), wherein the at least one input is a processed at least one input, the processed at least one input including visual equipment attributes determined from the image of the visual equipment.

(6) The apparatus according to any of (1) to (5), wherein the at least one input includes visual measurements of the person, the visual measurements indicating a visual acuity of the person.

(7) The apparatus according to any of (1) to (6), wherein the processing circuitry is further configured to train the neural network on a training database, wherein the training database includes a corpus of training images, the corpus of training images including images of faces of people and images of visual equipments, each combination of an image of the images of the faces of the people and an image of the images of the visual equipments being associated in the training database with at least one training fit metric assigned by a group of labelers.

(8) The apparatus according to any of (1) to (7), wherein the corpus of training images includes images of people wearing visual equipment, each image of the images of people wearing visual equipment being associated in the training database with at least one training fit metrics assigned by the group of labelers.

(9) The apparatus according to any of (1) to (8), wherein the neural network includes an implicit input, the implicit input being a predefined set of visual equipments, the at least one fit metric generated by the neural network being at least one matching score of the at least one input and each one of the predefined set of visual equipments.

(10) The apparatus according to any of (1) to (9), wherein, in order to determine the fitted visual equipment, the processing circuitry is further configured to select the at least one matching score that is a maximum, the maximum at least one matching score being one of the predetermined set of visual equipments that best matches the face of the person of the at least one input.

(11) The apparatus according to any of (1) to (10), wherein the maximum at least one matching score is selected from a vector including the at least one matching score, each of the at least one matching score in the vector corresponding to one of the predetermined set of visual equipments, the at least one matching score being based on a percentage of labelers of a group of labelers that assigned a same value of the at least one matching score.

(12) The apparatus according to any of (1) to (11), wherein, in order to determine the fitted visual equipment, the processing circuitry is further configured to calculate a coordinate corresponding to the at least one input, calculate barycenters of clusters associated with each one of the predefined set of visual equipments, calculate a distance between the coordinate and each barycenter of the clusters, the distances being ranked in a vector, and select a cluster of the clusters that minimizes the distance between the coordinate and each barycenter of the clusters.

(13) The apparatus according to any of (1) to (12), wherein the clusters associated with each one of the predefined set of visual equipments includes matching coordinates, corresponding to an at least one training input, that maximize an at least one training matching score during training of the neural network, the at least one training input including morphological features of the face of the person.

(14) A method for determining a fitted visual equipment, comprising receiving, by processing circuitry, at least one input, the at least one input including an image of a face of a person, applying, by the processing circuitry, a neural network to the at least one input, the neural network generating at least one fit metric of the at least one input, and determining, by the processing circuitry, based upon the at least one fit metric generated by the neural network, the fitted visual equipment, wherein the at least one fit metric corresponds to a correlative synchronization between the face of the person and a visual equipment.

(15) A non-transitory computer-readable storage medium storing computer-readable instructions that, when executed by a computer, cause the computer to perform a method for determining a fitted visual equipment, comprising receiving at least one input, the at least one input including an image of a face of a person, applying a neural network to the at least one input, the neural network generating at least one fit metric of the at least one input, and determining, based upon the at least one fit metric generated by the neural network, the fitted visual equipment, wherein the at least one fit metric corresponds to a correlation synchronization between the face of the person and a visual equipment.

(16) The apparatus according to any of (1) to (13), wherein the at least one training fit metric includes a fractional evaluation of fit of a visual equipment with a face of a person.

(17) The apparatus according to any of (1) to (13) and (16), wherein the group of labelers include ophthalmologists.

(18) The apparatus according to any of (1) to (13) and (16) to (17), wherein, in order to determine the fitted visual equipment, the processing circuitry is further configured to compare the at least one fit metric to a pre-determined threshold.

(19) The method according to (14), wherein the at least one input includes an image of a visual equipment.

(20) The method according to either (14) or (19), wherein the at least one input includes the image of the face of the person, wherein the person is wearing a visual equipment.

(21) The method according to any of (14) and (19) to (20), wherein the at least one input is a processed at least one input, the processed at least one input including morphological features determined from the image of the face of the person.

(22) The method according to any of (14) and (19) to (21), wherein the at least one input is a processed at least one input, the processed at least one input including visual equipment attributes determined from the image of the visual equipment.

(23) The method according to any of (14) and (19) to (22), wherein the at least one input includes visual measurements of the person, the visual measurements indicating a visual acuity of the person.

(24) The method according to any of (14) and (19) to (23), further comprising training, by the processing circuitry, the neural network on a training database, wherein the training database includes a corpus of training images, the corpus of training images including images of faces of people and images of visual equipments, each combination of an image of the images of the faces of the people and an image of the images of the visual equipments being associated in the training database with at least one training fit metric assigned by a group of labelers.

(25) The method according to any of (14) and (19) to (24), wherein the corpus of training images includes images of people wearing visual equipment, each image of the images of people wearing visual equipment being associated in the training database with at least one training fit metrics assigned by the group of labelers.

(26) The method according to any of (14) and (19) to (25), wherein the neural network includes an implicit input, the implicit input being a predefined set of visual equipments, the at least one fit metric generated by the neural network being at least one matching score of the at least one input and each one of the predefined set of visual equipments.

(27) The method according to any of (14) and (19) to (26), further comprising, in order to determine the fitted visual equipment, selecting, by the processing circuitry, the at least one matching score that is a maximum, the maximum at least one matching score being one of the predetermined set of visual equipments that best matches the face of the person of the at least one input.

(28) The method according to any of (14) and (19) to (27), wherein the maximum at least one matching score is selected from a vector including the at least one matching score, each of the at least one matching score in the vector corresponding to one of the predetermined set of visual equipments, the at least one matching score being based on a percentage of labelers of a group of labelers that assigned a same value of the at least one matching score.

(29) The method according to any of (14) and (19) to (28), further comprising, in order to determine the fitted visual equipment, calculating, by the processing circuitry, a coordinate corresponding to the at least one input, calculating, by the processing circuitry, barycenters of clusters associated with each one of the predefined set of visual equipments, calculating, by the processing circuitry, a distance between the coordinate and each barycenter of the clusters, the distances being ranked in a vector, and selecting, by the processing circuitry, a cluster of the clusters that minimizes the distance between the coordinate and each barycenter of the clusters.

(30) The method according to any of (14) and (19) to (29), wherein the clusters associated with each one of the predefined set of visual equipments includes matching coordinates, corresponding to an at least one training input, that maximize an at least one training matching score during training of the neural network, the at least one training input including morphological features of the face of the person.

(31) The method according to any of (14) and (19) to (30), wherein the at least one training fit metric includes a fractional evaluation of fit of a visual equipment with a face of a person.

(32) The method according to any of (14) and (19) to (31), wherein the group of labelers include ophthalmologists.

(33) The method according to any of (14) and (19) to (32), further comprising, in order to determine the fitted visual equipment, comparing, by the processing circuitry, the at least one fit metric to a pre-determined threshold.

(34) The method according to (15), wherein the at least one input includes an image of a visual equipment.

(35) The method according to either (15) or (34), wherein the at least one input includes the image of the face of the person, wherein the person is wearing a visual equipment.

(36) The method according to any of (15) and (34) to (35), wherein the at least one input is a processed at least one input, the processed at least one input including morphological features determined from the image of the face of the person.

(37) The method according to any of (15) and (34) to (36), wherein the at least one input is a processed at least one input, the processed at least one input including visual equipment attributes determined from the image of the visual equipment.

(38) The method according to any of (15) and (34) to (37), wherein the at least one input includes visual measurements of the person, the visual measurements indicating a visual acuity of the person.

(39) The method according to any of (15) and (34) to (38), further comprising training the neural network on a training database, wherein the training database includes a corpus of training images, the corpus of training images including images of faces of people and images of visual equipments, each combination of an image of the images of the faces of the people and an image of the images of the visual equipments being associated in the training database with at least one training fit metric assigned by a group of labelers.

(40) The method according to any of (15) and (34) to (39), wherein the corpus of training images includes images of people wearing visual equipment, each image of the images of people wearing visual equipment being associated in the training database with at least one training fit metrics assigned by the group of labelers.
(41) The method according to any of (15) and (34) to (40), wherein the neural network includes an implicit input, the implicit input being a predefined set of visual equipments, the at least one fit metric generated by the neural network being at least one matching score of the at least one input and each one of the predefined set of visual equipments.
(42) The method according to any of (15) and (34) to (41), further comprising, in order to determine the fitted visual equipment, selecting the at least one matching score that is a maximum, the maximum at least one matching score being one of the predetermined set of visual equipments that best matches the face of the person of the at least one input.
(43) The method according to any of (15) and (34) to (42), wherein the maximum at least one matching score is selected from a vector including the at least one matching score, each of the at least one matching score in the vector corresponding to one of the predetermined set of visual equipments, the at least one matching score being based on a percentage of labelers of a group of labelers that assigned a same value of the at least one matching score.
(44) The method according to any of (15) and (34) to (43), further comprising, in order to determine the fitted visual equipment, calculating a coordinate corresponding to the at least one input, calculating barycenters of clusters associated with each one of the predefined set of visual equipments, calculating a distance between the coordinate and each barycenter of the clusters, the distances being ranked in a vector, and selecting a cluster of the clusters that minimizes the distance between the coordinate and each barycenter of the clusters.
(45) The method according to any of (15) and (34) to (44), wherein the clusters associated with each one of the predefined set of visual equipments includes matching coordinates, corresponding to an at least one training input, that maximize an at least one training matching score during training of the neural network, the at least one training input including morphological features of the face of the person.
(46) The method according to any of (15) and (34) to (45), wherein the at least one training fit metric includes a fractional evaluation of fit of a visual equipment with a face of a person.
(47) The method according to any of (15) and (34) to (46), wherein the group of labelers include ophthalmologists.
(48) The method according to any of (15) and (34) to (47), further comprising, in order to determine the fitted visual equipment, comparing the at least one fit metric to a pre-determined threshold.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for determining a fitted visual equipment, the apparatus comprising:
processing circuitry configured to
receive at least one input including an image of a face of a person,
receive training data as to how to generate at least one fit metric of the at least one input, the training data comprising labels defining a score for each criterion of a predefined criterion list between morphological features of faces of people received from images of the faces of the people and visual equipment attributes of other visual equipment,
apply a neural network to the at least one input, the neural network generating the at least one fit metric of the at least one input using the received training data, and
determine, based upon the at least one fit metric generated by the neural network, the fitted visual equipment,
wherein the at least one fit metric corresponds to a correlative synchronization between morphological features of the face of the person and visual equipment attributes of a visual equipment.

2. The apparatus according to claim 1, wherein the at least one input includes an image of the visual equipment.

3. The apparatus according to claim 2, wherein the at least one input is a processed at least one input, the processed at least one input including the visual equipment attributes determined from the image of the visual equipment.

4. The apparatus according to claim 1, wherein the at least one input includes the image of the face of the person wearing a visual equipment.

5. The apparatus according to claim 1, wherein the at least one input is a processed at least one input, the processed at least one input including the morphological features determined from the image of the face of the person.

6. The apparatus according to claim 1, wherein the processing circuitry is further configured to
train the neural network on a training database including a corpus of training images that include images of faces of people and images of visual equipment, each combination of an image of the images of the faces of the people and an image of the images of the visual equipment being associated in the training database with at least one training fit metric assigned by a group of labelers.

7. The apparatus according to claim 6, wherein the corpus of training images includes images of people wearing the visual equipment, each image of the images of people wearing the visual equipment being associated in the training database with at least one training fit metric assigned by the group of labelers.

8. The apparatus according to claim 1, wherein the neural network includes at least one input that is a predefined set of visual equipment, the at least one fit metric generated by the neural network being at least one matching score of the at least one input and each one of the predefined set of visual equipment.

9. The apparatus according to claim 8, wherein, in order to determine the fitted visual equipment, the processing circuitry is further configured to
select the at least one matching score that is a maximum, the maximum at least one matching score being one of the predetermined set of visual equipment that best matches the face of the person of the at least one input.

10. The apparatus according to claim 9, wherein the maximum at least one matching score is selected from a vector including the at least one matching score, each of the at least one matching score in the vector corresponding to one of the predetermined set of visual equipment, the at least one matching score being based on a percentage of labelers of a group of labelers that assigned a same value of the at least one matching score.

11. The apparatus according to claim 10, wherein, in order to determine the fitted visual equipment, the processing circuitry is further configured to
calculate a coordinate corresponding to the at least one input,
calculate barycenters of clusters associated with each one of the predefined set of visual equipment,
calculate a distance between the coordinate and each barycenter of the clusters, the distances being ranked in a vector, and
select a cluster of the clusters that minimizes the distance between the coordinate and each barycenter of the clusters.

12. The apparatus according to claim 11, wherein the clusters associated with each one of the predefined set of visual equipment include matching coordinates, corresponding to an at least one training input, that maximize an at least one training matching score during training of the neural network, the at least one training input including morphological features of the face of the person.

13. The apparatus according to claim 1, wherein the labels are ground truth labels.

14. An apparatus for determining a fitted visual equipment, the apparatus comprising:
processing circuitry configured to
receive at least one input including an image of a face of a person,
receive training data as to how to generate at least one fit metric of the at least one input, the training data comprising labels defining a score for each criterion of a predefined criterion list between morphological features of faces of people received from images of the faces of the people and visual equipment attributes of other visual equipment,
apply a neural network to the at least one input, the neural network generating the at least one fit metric of the at: least one input using the received training data, and
determine, based upon the at least one fit metric generated by the neural network, the fitted visual equipment,
wherein the at least one fit metric corresponds to a correlative synchronization between the face of the person and a visual equipment, and
wherein the at least one input includes visual measurements of the person, the visual measurements indicating a visual acuity of the person.

15. A method for determining a fitted visual equipment, the method comprising:
receiving, by processing circuitry, at least one input including an image of a face of a person;
receiving training data as to how to generate at least one fit metric of the at least one input, the training data comprising labels defining a score for each criterion of a predefined criterion list between morphological features of faces of people received from images of the faces of the people and visual equipment attributes of other visual equipment,
applying, by the processing circuitry, a neural network to the at least one input, the neural network generating the at least one fit metric of the at least one input using the received training data; and
determining, by the processing circuitry, the fitted visual equipment, based upon the at least one: metric generated by the neural network, wherein the at least one fit metric corresponds to a correlative synchronization between morphological features of the face of the person and visual equipment attributes of a visual equipment.

16. The method according to claim 15, wherein the labels are ground truth labels.

17. A non-transitory computer-readable storage medium storing computer-readable instructions that, when executed by a computer, cause the computer to perform a method for determining a fitted visual equipment, the method comprising:
receiving at least one input including an image of a face of a person;
receiving training data as to how to generate at least one fit metric of the at least one input, the training data comprising labels defining a score for each criterion of a predefined criterion list between morphological features of faces of people received from images of the faces of the people and visual equipment attributes of other visual equipment,
applying a neural network to the at least one input, the neural network generating the at least one fit metric of the at least one input using the received training data; and
determining, based on the at least one fit metric generated by the neural network, the fitted visual equipment,
wherein the at least one fit metric corresponds to a correlative synchronization between morphological features of the face of the person and visual equipment attributes of a visual equipment.

18. The non-transitory computer-readable storage medium according to claim 17, wherein the labels are ground truth labels.

* * * * *